United States Patent
Gerrits et al.

(10) Patent No.: US 7,798,890 B2
(45) Date of Patent: Sep. 21, 2010

(54) CONVERTING A FLUCTUATING STREAM OF POULTRY INTO A UNIFORM STREAM OF POULTRY

(75) Inventors: Johannes Gerardus Maria Gerrits, Rijkevoort (NL); Wilhelmus Martinus Kusters, Liempde (NL); Adrianus Josephes Van Den Nieuwelaar, Gemert (NL)

(73) Assignee: Stork PMT B.V., Boxmeer (NL)

( * ) Notice: Subject to any disclaimer, the term of this patent is extended or adjusted under 35 U.S.C. 154(b) by 1056 days.

(21) Appl. No.: 10/541,219

(22) PCT Filed: Dec. 30, 2003

(86) PCT No.: PCT/NL03/00947

§ 371 (c)(1),
(2), (4) Date: Mar. 21, 2006

(87) PCT Pub. No.: WO2004/057969

PCT Pub. Date: Jul. 15, 2004

(65) Prior Publication Data

US 2006/0217051 A1    Sep. 28, 2006

(30) Foreign Application Priority Data

Dec. 31, 2002 (NL) ................................. 1022289
Jul. 4, 2003 (NL) ................................. 1023820

(51) Int. Cl.
  *A22B 1/00*  (2006.01)
(52) U.S. Cl. ........................................ 452/53
(58) Field of Classification Search .................. 452/52, 452/53, 177–184
See application file for complete search history.

(56) References Cited

U.S. PATENT DOCUMENTS

| 3,797,460 A | 3/1974 | Blankenship |
| 5,269,721 A * | 12/1993 | Meyn ......................... 452/117 |
| 5,397,263 A | 3/1995 | Schumann et al. |

(Continued)

FOREIGN PATENT DOCUMENTS

BE    1 005 540 A    9/1993

(Continued)

*Primary Examiner*—Thomas Price
(74) *Attorney, Agent, or Firm*—Birch, Stewart, Kolasch & Birch, LLP

(57) ABSTRACT

In poultry slaughterhouses, birds arrive in batches. Birds are delivered in holders (2), are unloaded and are connected to carriers (14). The birds are then introduced into the slaughterhouse and slaughtered, after which further processing take place. The supply is variable over the course of time. However, the slaughtering is a continuous process. The present invention evens out the supply variability, so that a uniform stream of birds which is well matched to the continuous process in the slaughterhouse is obtained. A conveyor device (8, 9) having a controllable speed is positioned between the point at which the birds are unloaded from the holders and the point at which the birds are connected to a carrier. The speed of this conveyor device is controlled in such a manner that the number of birds which leaves the conveyor device is substantially uniform. It is also possible to control the speed of unloading. It is also possible for measurements to be performed at various points in the system and for these measurements to be fed back to the controllable conveyor device. In this way it is then possible to automatically generate a uniform stream of birds.

32 Claims, 35 Drawing Sheets

U.S. PATENT DOCUMENTS

| | | | |
|---|---|---|---|
| 5,711,410 A | 1/1998 | Cai et al. | |
| 6,026,947 A | 2/2000 | Persson | |
| 6,109,215 A * | 8/2000 | Jerome | 119/843 |
| 6,443,102 B1 * | 9/2002 | Schepers et al. | 119/843 |
| 6,983,678 B2 * | 1/2006 | Wattles et al. | 83/102 |

FOREIGN PATENT DOCUMENTS

| | | |
|---|---|---|
| EP | 0 145 077 A2 | 6/1985 |
| EP | 0 161 116 A2 | 11/1985 |
| EP | 0 441 633 A2 | 8/1991 |

* cited by examiner

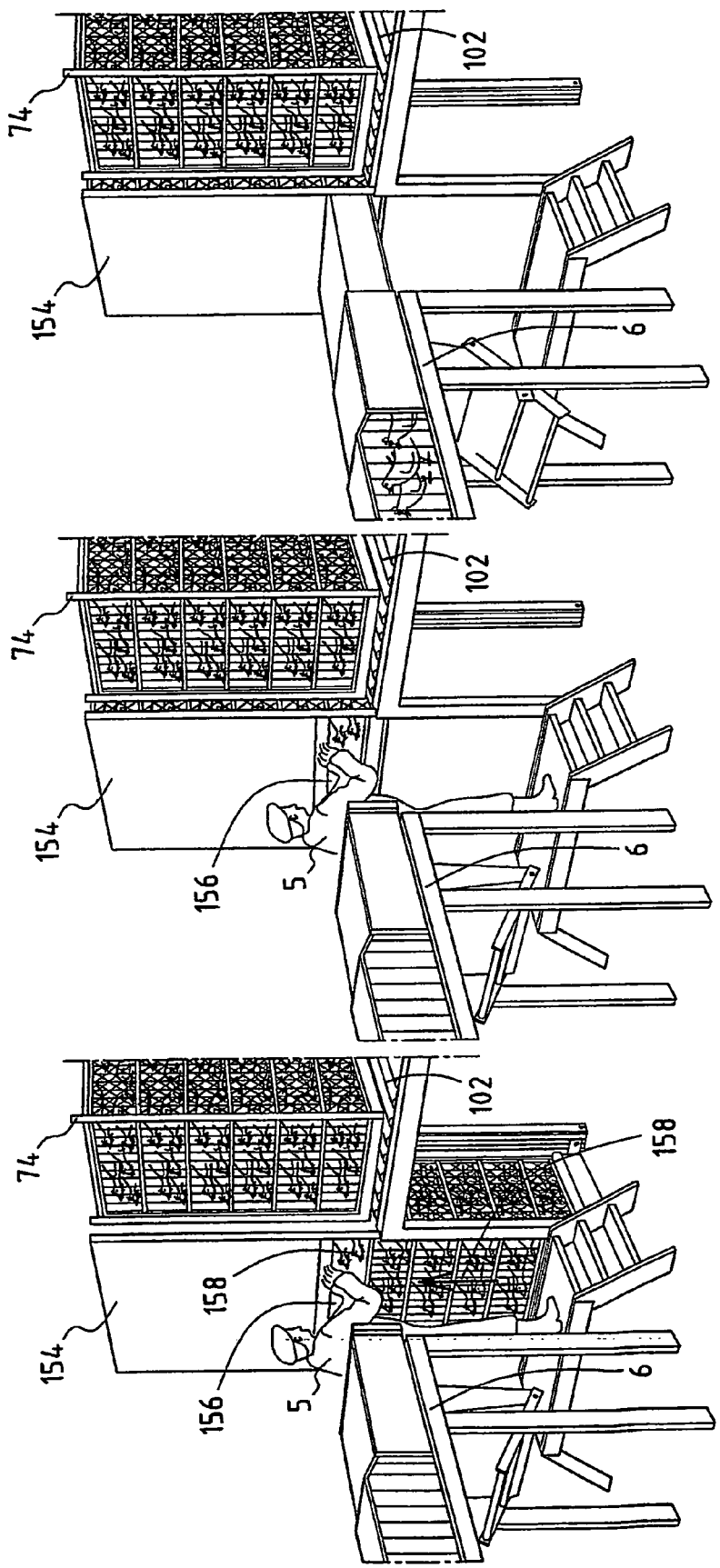

CONVERTING A FLUCTUATING STREAM OF POULTRY INTO A UNIFORM STREAM OF POULTRY

The present invention relates to a method for making a fluctuating stream of living poultry in a slaughter line substantially uniform, the slaughter line comprising an unloading station, a conveying station and a connecting station, wherein the poultry is delivered to the unloading station in at least one holder, wherein the poultry is unloaded from the at least one holder in the unloading station and is transferred to the conveying station, wherein the stream of poultry is formed, and wherein the conveying station comprises at least one conveyor device, wherein the stream of poultry is conveyed in the conveying station and is transferred to the connecting station, where the poultry is connected to carriers.

The invention also relates to a device for carrying out the method.

The words "making . . . substantially uniform" is to be understood as meaning not only making a stream of living poultry substantially uniform, but also reducing fluctuations in a stream of living poultry.

The words "living poultry" are to be understood as meaning poultry which is in a normal state of consciousness, but also poultry which has been stunned in a customary way in a slaughterhouse before, during or after unloading. Different levels of stunning are possible, and the stunning may be reversible or irreversible. The words "living poultry" are also to be understood as meaning poultry which is still covered with feathers and has not yet been plucked.

The words "stream of poultry" are to be understood as meaning a number of birds which passes a point in a slaughter line within a defined time unit. The term "time unit" is to be understood as meaning a period of time. The duration of the period of time under consideration may vary.

The words "fluctuations in the stream of poultry" are to be understood as meaning fluctuations in the number of birds which passes a given point in the slaughter line in successive units of time.

The word holder is to be understood as meaning all holders and packaging means which are suitable for transporting relatively large numbers of birds. These may include containers, crates, bins or baskets, or any other suitable holder.

The term unloading station is to be understood as meaning a location in a slaughterhouse where the living poultry which is supplied from external sources is unloaded from holders. The unloading from the holders may be carried out either manually or mechanically. In the case of a manual process, a person will use his arms and hands to unload the poultry from a holder or part of it, for example by pushing them. In the case of a mechanical process, a member, for example using a movable arm, a removal strip or a tilting mechanism for tilting the holder, will unload the poultry from the holder or part of it.

The term connecting station is to be understood as meaning a location at which the poultry is joined to a carrier. In practice, in poultry slaughterhouses, it is customary for the processing of poultry to take place while the birds are hanging from a hook by their legs. This allows for all the body parts of the bird to be readily accessible, and allows the bird to adopt a predetermined position. However, other ways of connecting a bird to a carrier are also possible.

In poultry slaughterhouse practice, it is customary for birds to be supplied in holders. These holders are unloaded in an unloading station of the poultry slaughterhouse, forming a stream of poultry. One known drawback which has arisen in practice is that the stream of poultry which is formed during unloading fluctuates considerably over the course of time. The number of birds which is unloaded per time unit is not constant, but rather fluctuates between a minimum value and a maximum value, which may be relatively far apart. This phenomenon has serious drawbacks. The causes and drawbacks of a fluctuating stream of poultry being formed are discussed below.

The holders usually have a plurality of compartments stacked on top of one another, with a plurality of birds inside each compartment. Each holder may comprise one or more stacks of compartments, in which case, for example, a configuration of two stacks, each stack comprising three, four or seven compartments is used in practice.

If the unloading of a holder comprising two stacks of compartments is a manual process, in practice two people (or unloaders) are required, with each person taking charge of one stack.

In practice, two holders are sometimes unloaded simultaneously in this way, giving rise to the situation whereby four people are required to unload the holders.

In practice, a holder is usually unloaded from the top downwards. In order to enable this to be carried out, the holder is moved downwards into a lowermost position before being unloaded, so that the top compartment is at a suitable working height for the unloader. The unloader will then remove the poultry from the compartment. The holder is then moved upwards by one compartment height, so that the next compartment moves to the right working height for the unloader. The unloader then removes the poultry from this compartment. All the compartments are emptied by continuing in this way. Obviously, it is also possible for a holder to be unloaded from the bottom upwards or in a different compartment sequence. The unloading of different (groups of) compartments may also take place in different unloading stations.

After the emptying of a holder has been completed, each empty holder is replaced with a full holder.

Both while a holder is being moved upwards and while a holder is being changed, there are periods in which no poultry can be unloaded from the holder. In addition, during the emptying of a compartment the unloading speed (the number of birds which leaves the holder per time unit) is considerably higher at the start than at the end. This is because the unloader can unload the first bird very easily, since it will be close to his body. The more birds have been unloaded from a compartment, the further away from the unloader the birds are situated and the deeper the unloader has to reach into the holder or a compartment of the holder in order to be able to unload a bird. In some cases, the last birds in a compartment have to be unloaded by the unloader using a tool, such as a hook or other tool for driving out the bird.

If a tilting device is used, the unloading has a similar variable profile. When the holder starts to tilt, a few birds per time unit will leave the holder or one or more compartments thereof before the entire holder has been opened. As the holder tilts further, more birds leave the holder per time unit. Then, the number of birds which comes out of the holder per time unit drops again, since the holder is emptying out.

In the same way as if a manual unloading process is used, with a tilting device the unloading speed will be equal to zero while a holder is being changed.

When a bird is unloaded, it is generally checked whether the bird is alive. This can be carried out manually by the unloader. The check may also be carried out by means of an infrared sensor which measures the temperature or presence of the bird. The bird may be dead on arrival (DOA). It is important that birds which are dead on arrival are removed and are not processed. This removal can be carried out by the unloader but may also be carried out mechanically.

If one or more birds are removed, the supply of birds will temporarily drop.

The unloading of the birds from the holders, for the various reasons described above, is not a continuous process and involves periods in which birds are unloaded continuously and periods in which not a single bird is unloaded, for example when a holder is being changed. The stream of birds which is formed during unloading is therefore also not continuous, but rather fluctuates over the course of time.

For the following reasons, it is desirable for the fluctuating stream of poultry to be converted into a substantially uniform stream of poultry. The poultry is generally passed to a stunning station in order to be stunned at a defined point in a processing process in the slaughterhouse before being connected to a carrier. This stunning may, for example, take place before the poultry is unloaded from the holder, in which case it is necessary to satisfy the condition that the birds are unconscious when they are being connected to the carriers and for a certain period of time thereafter. Generally, however, the birds are stunned in the section between the unloading station and the connecting station, for example just upstream of the connecting station. It is known that in the case of stunned poultry with feathers the birds have the tendency to become caught up and snagged with one another. Consequently, in current practice the handling of a stream of stunned birds with feathers, as well as the reduction in the fluctuations in a stream of poultry, present problems.

The connecting station generally comprises a conveyor, to which carriers, such as hooks, are attached at regular intervals. The conveyor moves regularly and an empty carrier, to which a bird can be connected, moves past at regular time intervals. It is preferable for a bird to be connected to each carrier and not to leave any carriers unused. The birds are then conveyed further into the slaughterhouse.

In a subsequent step, the birds are passed to a cutting station, where the neck of the poultry is cut. This leads to exsanguination of the birds. After exsanguination, the birds are conveyed further into the slaughterhouse in order to be processed further.

The connecting station and the stunning station are preferably operated continuously. This facilitates operational management and improves efficiency.

If the non-continuous stream of poultry from the unloading station were then to be delivered to the connecting station as it is with the aid of the at least one conveyor device, there would be periods in which few birds arrive at the connecting station and periods in which a large number of birds arrive at the connecting station.

One problem with apparatuses of this nature is therefore that shortages or excesses may arise in the supply of poultry for connection to the carriers. The cause of these shortages or excesses is the fluctuating unloading process. The fluctuations in the stream of poultry have progressed from the unloading station into the connecting station.

If there is a shortage of birds, the situation will arise in the connecting station whereby it is impossible for a bird to be connected to an empty carrier moving therein. This means that an empty carrier enters the slaughterhouse, resulting in the adverse situation whereby no useful work can be carried out on a bird or part of it for this carrier in all the subsequent apparatuses in the slaughterhouse.

This has the drawback of inefficiency and a higher cost price of the end product. Furthermore, this can lead to problems if apparatuses are unsuitable for an empty carrier to pass through them.

On the other hand, if more birds are delivered to the attachment station within a certain time than the number of empty carriers that becomes available within the same time, it is not possible for all the birds which have been delivered to be connected to a carrier. The result of this is that birds have to wait at the connecting station until an empty carrier is available.

One drawback of this is that during the time that a bird is waiting, a previous stunning treatment may wear off, so that the bird regains consciousness again.

The operation of connecting a bird to the carrier is a manual process which requires physical effort. A bird which is regaining consciousness again can move, making it more difficult to connect the bird to the carrier as well as increasing the effort required. However, an increase in effort is undesired, since this can make the work too difficult.

Moreover, for ethical reasons it is undesirable for the stunning to wear off prematurely, since the subsequent cutting of the neck is then carried out on a bird which is no longer stunned.

In addition, a bird may die while it is waiting. The quality of the product may decrease as a result of the bird dying prematurely in the process.

Another problem of fluctuations in a stream of birds coming from the unloading station is the fluctuating loading of a stunning station which the birds are to pass through.

There is no real way of stabilizing the supply in the stunning station, since a fixed residence time in the stunning station is prescribed for each bird. A longer residence time may kill the bird, while a shorter residence time may lead to incomplete stunning or stunning which does not last for long enough. This means that fluctuations in the supply to the stunning station are passed on substantially unchanged to the connecting station. It is therefore undesirable for the stunning station to be provided with a fluctuating supply if the exit of the stunning station directly adjoins the connecting station, since fluctuations in the supply to the stunning station will also lead to fluctuations in the supply to the connecting station.

For these and other reasons, it is desirable to reduce fluctuations in the stream of living poultry.

According to the invention, one or more of the above problems and other problems are solved by a method for reducing fluctuations in a stream of living poultry which fluctuates over the course of time in a slaughter line comprising an unloading station, a conveying station and a connecting station, wherein the poultry is delivered to the unloading station in at least one holder, wherein the poultry is unloaded from the at least one holder in the unloading station and is transferred to the conveying station, wherein the stream of poultry is formed, and wherein the conveying station comprises at least one conveyor device, wherein the stream of poultry is conveyed in the conveying station and is transferred to the connecting station, where the poultry is connected to carriers, which method is characterized in that the number of birds which is transferred per time unit to the conveying station by the unloading station or to the connecting station by the conveying station is controlled in order to reduce fluctuations in the stream of poultry.

This method offers the advantage that the fluctuations in the stream of poultry are substantially reduced and that a more uniform stream of poultry is transferred to the connecting station, so that the above-described problems associated with fluctuations are alleviated or eliminated. The stream of poultry is preferably converted into a substantially uniform stream of poultry. In a preferred embodiment of the invention, the stream of poultry is conveyed at a conveying speed by the at least one conveyor device to the connecting station, the conveying speed of the at least one conveyor device being controlled in order to reduce fluctuations in the stream of poultry.

This method allows the instant at which a bird which is being conveyed by the conveyor device leaves the conveyor device to be controlled. If the speed of the conveyor means is reduced, the moment at which a bird leaves the conveyor device is delayed. If the speed is increased, the instant at which a bird leaves the conveyor device is brought forward. By varying the speed of the conveyor device in a suitable way like this, it is possible to advantageously make the stream of birds which leaves the conveyor device (more) uniform.

The invention also encompasses a method wherein the said stream of poultry is successively conveyed by a number of separate conveyor devices which are connected in series, and wherein the number of birds which is transferred from a conveyor device to a subsequent conveyor device per time unit is controlled in order to reduce fluctuations in the stream of poultry. By controlling the conveying speed of a conveyor device, it is possible to define the moment at which a bird is transferred by a conveyor device to a subsequent conveyor device, with the result that the transfer of birds to the subsequent conveyor device can take place substantially uniformly.

This embodiment offers the advantage that the fluctuations in the stream of poultry can be reduced further with each conveyor device which is connected in series. The conveying speed of the conveyor devices is in this case the speed at which the poultry is transported, and is expressed in distance per time unit. It will be possible to reduce the fluctuations with each conveyor device connected in series in the direction of flow. The conveying speed of each of the conveyor devices can be controlled as a function of the conveying speed of the other conveyor devices. However, it is also possible for the conveying speed of each of the conveyor devices to be controlled independently of that of the other conveyor devices.

In another aspect, the conveying station comprises a number of conveyor devices for a number of streams of poultry, wherein the poultry is unloaded from a number of holders, wherein each stream of poultry is transported at a conveying speed by at least one associated conveyor device, and wherein the conveying speed of each of the conveyor devices is controlled in order to reduce fluctuations in the stream of poultry.

According to this aspect of the invention, a number of conveyor devices are arranged in parallel. This arrangement offers the advantage that control measures can be performed at a plurality of locations simultaneously, so that fluctuations in the stream of poultry can be greatly reduced or eliminated altogether.

In a further preferred embodiment of the invention, the said streams are combined before they arrive at the connecting station.

This results in the formation of a stream of poultry which is already suitable for supplying to the connecting station.

In yet a further aspect of the invention, the conveyor devices are controlled in order to make the respective streams of poultry substantially uniform during a first time unit and to make them substantially zero during a second time unit, so that a number of intermittent streams of poultry are formed. Then, the intermittent streams of poultry are combined, resulting in a substantially uniform stream of poultry. This can be achieved by means of the respective second units of time, wherein the stream of poultry is substantially zero, being spread out over the course of time with respect to one another.

In a further advantageous embodiment of the invention, a number of birds is unloaded from a holder per time unit, the said number of birds per time unit being controlled in order to reduce fluctuations in the stream of poultry. The number of birds which is unloaded from a holder per time unit is in this case controlled in order to reduce fluctuations in the stream of poultry even during the unloading operation.

In this context, the number of birds per time unit is to be understood as meaning the number of birds which passes a defined point per time unit. This point may, for example, be the exit of the holder, but may also be a point at a different location, such as the connecting station.

As has already been indicated above, it is also possible for birds to be unloaded from a plurality of holders simultaneously. In this case, the speed at which the birds are unloaded from the various holders can be controlled, independently of or as a function of the speed with which the birds are unloaded from the other holders. This form of control makes it possible to very effectively reduce the fluctuations in the stream of poultry.

In a further advantageous embodiment of the invention, the poultry is stunned before arriving in the connecting station. The advantageous result of this method is that the poultry is stunned on arrival at the connecting station, so that it can be connected to carriers in an easy, ergonomically favourable way.

The operation of connecting poultry to carriers is generally a manual process, which involves a considerable amount of effort on the part of the person connecting the poultry to the carrier. If a bird is not stunned, it can move or flap around while it is being hung from the carrier. This increases the effort required by the person carrying out the work, which is undesirable. It is therefore advantageous for the bird to be left in a stunned state when it is being connected to the carrier.

In an advantageous embodiment of the invention, the poultry is temporarily stored in at least one first buffer store downstream of the unloading station and upstream of the connecting station.

The positioning of a buffer store between the unloading station and the connecting station provides a further possible way of attenuating fluctuations in the stream of poultry in the buffer store. It is advantageously possible for a number of birds which is released from the said at least one first buffer store per time unit to be controlled in order to reduce fluctuations in the stream of poultry. The number of birds which leave the at least one buffer store can be controllable in such a manner that this number can be kept relatively constant per time unit, or at least can be kept substantially equal to the number required in the connecting station per time unit.

In another aspect of the invention, at least one bird which arrives at the connecting station is temporarily stored in a second buffer store in order to be connected to a carrier when a carrier becomes available.

It is possible that too many birds arrive at the connecting station within a defined time period for it to be possible for them to be connected to a carrier. In that case, it is advantageous for birds which cannot be connected to a carrier to be temporarily stored for a defined time period, so that when carriers are available again these birds can still be connected to a carrier. The waiting time for these birds should not be too long if the birds are stunned, in order to prevent the stunning from having worn off at the time at which the bird is connected to a carrier.

In a particularly advantageous method according to the invention, at least one parameter is measured from a group of parameters which comprises: a total weight of the number of birds in the holder, a weight of at least one individual bird in the holder, a number of birds which is present in the holder, a number of birds which is unloaded from the holder per time unit, a temperature of a bird, a total weight of the number of birds on the conveyor device, a weight of at least one individual bird on the at least one conveyor device, a duration of time between a bird leaving the unloading station and arriving at the connecting station, a conveying speed of the at least one conveyor device, a waiting time for a bird at the connecting station, a number of birds which is delivered to the connecting station per time unit, a number of birds which is delivered to the connecting station within a defined time without a carrier being available for them, a number of carriers which leaves the connecting station per time unit, a number of carriers which leaves the connecting station per time unit without a bird being connected to them, a number of birds which is present at the connecting station in order to be connected to a carrier, a number of carriers which approaches the connecting station per time unit, a number of birds which is present on the conveyor device, a number of birds which passes a predetermined point in the slaughter line per time unit, forming at least one measured value, the at least one measured value being used to control the number of birds which is transferred to the conveying station by the unloading station or to the connecting station by the conveying station per time unit.

Measuring the said parameters at various locations in the system and using the measured values to control the system results in a number of possible options for further reducing fluctuations in the stream of poultry. In this context, it is possible to make use of feedback and feedforward. It is also possible to make use of controllers which are known from measurement and control engineering, such as for example PID controllers, fuzzy logic and neural networks.

The measurements can also be performed before the birds arrive at the poultry slaughterhouse. A large number of combinations is possible in this way without departing from the scope of the invention.

Another advantageous embodiment of the invention is formed by a method wherein the poultry is temporarily stored in at least one first buffer store downstream of the unloading station and upstream of the connecting station, and wherein at least one parameter is measured from a group of parameters which comprises: a number of birds which is temporarily stored, and a change in the number of birds which is temporarily stored, forming at least one measured value, the at least one measured value being used to control the number of birds which is transferred to the conveying station by the unloading station or to the connecting station by the conveying station per time unit.

The number of birds which is present in the buffer store or a change in the number of birds which is present in the buffer store offers a reliable way of controlling the system. The fluctuations in the stream of poultry can be effectively reduced with the aid of measurements carried out at the buffer store.

In another aspect, the invention comprises a method wherein a number of parameters is measured, and wherein a number of criteria are linked to the measured parameters, each criterion being assigned a predetermined priority, and a method of control being defined in advance for each criterion, the number of birds which is transferred to the conveying station by the unloading station or to the connecting station by the conveying station per time unit being controlled on the basis of a criterion which is satisfied, and wherein in the case that a plurality of criteria are satisfied, the priority of the criterion is used for determining which criterion to use for the control. In this way, it is possible for a plurality of criteria to be used simultaneously for control purposes. For example, the conveying speed of a conveyor device can be controlled on the basis of a measured first parameter with a defined priority, but another measured parameter with a higher priority than the first parameter is used to control the conveying speed of the same conveyor device as soon as the measured value for this other parameter reaches a defined limit value.

In an advantageous embodiment of the invention, at least one of the said measured values is used to control the conveying speed of the at least one conveyor device.

By controlling the conveying speed of the conveyor device on the basis of the measured value from the measurements, it is possible to make the number of birds which is delivered by the conveyor device more uniform.

In another advantageous aspect of the invention, at least one of the said parameters is measured, the at least one measured value being used to control the number of birds which is unloaded from the at least one holder per time unit.

In this way it is possible, for example, to measure a number of birds which is transferred to the connecting station by the conveying station per time unit and to use the measured value from this measurement to control the unloading. If too many birds are transferred to the connecting station, the number of birds which is unloaded per time unit can be reduced, and if too few birds are transferred to the connecting station, the number of birds which is unloaded per time unit can be increased. It is in this way possible to reduce fluctuations. A person skilled in the art will recognize that numerous further combinations of measurement and control steps are also possible without departing from the basic idea and scope of the present invention.

In another advantageous embodiment of the invention, at least one of the said measured values is used to control the number of birds which is released from the at least one first buffer store per time unit.

In this way, the buffer store can be used actively to reduce the fluctuations in the stream of poultry.

In another aspect, the invention comprises a method wherein a number of conveyor devices are arranged in a series, the number of birds which is transferred from a first conveyor device to a subsequent conveyor device per time unit being controlled on the basis of a parameter which is selected from the group which comprises: a number of birds which is present on the subsequent conveyor device; and a number of birds which is present on a conveyor device located upstream of the first conveyor device. If the speed of a conveyor device is controlled on the basis of a number of birds located on another conveyor device upstream of the controlled conveyor device, it is possible to use the control to anticipate an impending fluctuation in the stream of poultry. If the speed of a conveyor device is controlled on the basis of a number of birds which is located on another conveyor device downstream of the controlled conveyor device, it is possible to use the control to react to a fluctuation which has already occurred in the stream of poultry and to follow this fluctuation with a correction. This may, for example, involve enabling a higher number of birds per time unit to follow a drop in the number of birds per time unit, or enabling a lower number of birds per time unit to follow a rise in the number of birds which has passed a defined point per time unit.

In yet another aspect, the invention comprises a method wherein the number of birds which is transferred from a conveyor device to a subsequent conveyor device per time unit is controlled on the basis of the number of birds which is located in a predetermined section of a conveyor device. Determining how many birds are located only in a specific section of a conveyor device allows more accurate control. The duration of time which it takes for birds which are present in this defined section to, for example, be transferred to a subsequent conveyor device is shorter than the duration of time which it takes for birds which are present on the conveyor device as a whole to be transferred to a subsequent conveyor device. By carrying out control on the basis of a short duration of time, it is possible, within a given period, to decide more frequently whether control intervention is required, for example whether the speed of a conveyor belt needs to be changed. This leads to more accurate control.

In a particularly advantageous aspect of the invention, two or more of the said measured values are compared with one another, the result of the comparison being used to control the number of birds which is transferred to the conveying station by the unloading station or to the connecting station by the conveying station per time unit.

In this context it is possible, for example, for the same parameter(s) to be measured a plurality of times and for the different measured values to be compared with one another. However, it is also possible to measure different parameters and to compare the values from these measurements with one another. This allows more accurate control of the system.

In another aspect of the invention, a measured value for the number of birds which passes a defined point in the slaughter line per time unit is compared with a measured value for the number of birds or carriers which leaves the connecting station per time unit.

In this way, it is possible to adjust the control of the system in such a manner that the supply of birds is always equal to the removal of birds or carriers from the connecting station.

In another advantageous embodiment of the invention, the number of birds which arrives at the connecting station per time unit is compared with the number of birds which leaves the connecting station per time unit.

By comparing these two parameters with one another, it is possible to prevent major shortfalls or excesses of birds from occurring at the connecting station.

A further preferred embodiment of the invention is a method wherein the number of birds which passes a defined point in the slaughter line upstream of the connecting station per time unit is compared with a number of carriers which passes a defined point in the connecting station per time unit. Comparing these two parameters provides a good insight into the possibility of a shortfall or excess of birds occurring at the connecting station.

In another aspect of the invention, there is a predetermined time unit between the instant at which a measurement is carried out and the instant at which a measured value derived from this measurement is used.

In this way, it is possible to take account of certain delay times which occur for example when poultry is being conveyed over a certain distance.

In another advantageous aspect of the invention, at least one said measured value is compared with a predetermined limit value for this parameter in order to control the number of birds which is transferred to the conveying station by the unloading station or to the connecting station by the conveying station per time unit.

In this way it is possible to make use of limit values or set values and to compare measured values therewith. By using the result of the comparison for control purposes, it is possible to obtain a result which corresponds to the limit value or set value.

In a particularly advantageous embodiment of the invention, the poultry is unloaded from the at least one holder by hand, by at least one unloader at an unloading speed.

The term "unloading speed" is to be understood as meaning the number of birds which is unloaded from the holder within a defined time unit.

Enabling the birds to be unloaded by hand allows simple adjustment of the unloading speed to a desired level. If the unloader receives information relating to the speed at which the poultry is to be unloaded and if this information is visually conveyed to him, the unloader can devote himself entirely to unloading the poultry, while at the same time the unloading speed remains controllable.

In another embodiment of the invention, the poultry is unloaded mechanically from the at least one holder. This can be achieved, for example, by means of a mechanical unloading device which pushes the poultry out of the at least one holder. This may also be implemented, for example, by an unloading device being moved into the holder, wherein the birds are directed onto the unloading device, and the unloading device conveying the birds out of the at least one holder. This embodiment makes the unloading process highly controllable.

In another aspect of the invention, an unloading device is advantageously introduced into a holder, wherein the unloading device moves the poultry out of the holder. A person skilled in the art will readily recognize that it is possible, for example, to introduce a conveyor belt into the holder in the vicinity of the legs of the poultry, with the top side of the conveyor belt being moved in a direction out of the holder. The birds will move onto the conveyor belt and will be conveyed out of the holder. In a particularly advantageous embodiment, the unloading device is moved into the holder above the poultry which is to be unloaded, with the underside of the conveyor belt being moved in a direction out of the holder. In this way, the birds are forced out of the holder and it is possible to prevent the birds from sticking their heads into the top side of the holder or digging into the holder in order to avoid having to leave it. A person skilled in the art will recognize that it is also possible for this form of unloading to be used independently outside the context of the present invention.

In another embodiment, a movable shield is advantageously arranged at the unloading station, and wherein a number of compartments of a holder which comprises a plurality of compartments is opened, and wherein the shield holds the poultry inside one or more opened compartments. This has the advantageous result that all compartments of the holder can be opened at once without the birds being able to leave these compartments in an uncontrolled way.

In another advantageous embodiment of the present invention, in the unloading station birds are connected to carriers in a number of connecting lines. A connecting line is in this case a location to which empty carriers and birds are supplied and where the birds are connected to these empty carriers. By using a plurality of connecting lines in the connecting station, it is possible for the number of birds which can be connected to a carrier per time unit to be higher than in the case wherein only one connecting line is used.

In another aspect of the invention, the bird, as it is being conveyed, is positioned by orientation means arranged in the vicinity of the at least one conveyor device, is positioned in such a manner that the breastbone of the bird is positioned in a predetermined orientation with respect to a conveying direction.

The result of this is that at the connecting station the birds are in a substantially identical, predetermined orientation, so that, for example, the legs of the birds are readily accessible for the people who are connecting the birds to the carriers. This reduces the work needed to connect the birds to the carriers. If the orientation of the breastbone of the bird is substantially perpendicular to the conveying direction, it is possible for the legs of the bird to face directly towards the person who is connecting the bird to the carrier. This orientation advantageously minimizes the effort required to connect the birds to the carriers.

In a further aspect of the invention, the number of birds which is transferred to the conveying station by the unloading station or to the connecting station by the conveying station per time unit is adjusted using minor changes or substantially continuously.

Accurate control of the stream of poultry can be obtained by controlling the stream of poultry using minor changes or substantially continuously.

In another aspect, the invention comprises a method wherein in the unloading station a number of birds is unloaded from a holder in a first period of time, with the stream of poultry being controlled in order for the number of birds to be transferred to the connecting station in a second period of time, the second period of time being of a different length from the first period of time. When the end of a series of holders containing a certain type of bird is reached, for example in the event of a change in the type of bird which is being processed by the slaughter line, the unloading station will not be fully occupied with holders which contain a first type of bird. Consequently, for a certain period of time a lower number of birds per time unit will be unloaded than if the unloading station were to be used completely for unloading the first type of bird. Consequently, a certain time later there will be a drop in the number of birds which is transferred to the connecting station per time unit. This drop is substantially prevented by the stream of birds of the first type being transferred to the connecting station within a shorter period of time.

The same problem arises if the full capacity of the unloading station is not used at the start of a series of holders of one type of birds or when the slaughter line is being started up. In this case too, a lower number of birds per time unit will be unloaded for a certain period than is the case some time later, when the unloading station is fully occupied. The unloading station will therefore need a run-up time before it reaches a full unloading speed. To prevent a run-up time of this nature for the transfer of birds to the connecting station, it is possible for a number of birds which is unloaded within a certain period of time to be transferred to the connecting station within a shorter period of time. This means that the same number of birds per time unit is still transferred to the connecting station as if full capacity were being unloaded at the unloading station. This is preferably brought about by temporarily storing the first birds from a series for a certain period of time, so that the period of time during which the number of birds is transferred is compressed.

The invention also relates to a device for converting a stream of living poultry which fluctuates over the course of time into a stream of living poultry which is substantially uniform over the course of time in a slaughter line, the device comprising at least the following stations: an unloading station for unloading the poultry from at least one holder, a connecting station for connecting the poultry to carriers, a conveying station for conveying the poultry as a stream of poultry from the unloading station to the connecting station, the conveying station comprising at least one conveyor device, which device is characterized in that it comprises at least one control device which is constructed to control the number of birds which is transferred from the unloading station to the conveying station or from the conveying station to the connecting station per time unit, in order to reduce fluctuations in the stream of poultry.

This device can be used to convert a fluctuating stream of poultry which is supplied to a poultry slaughterhouse into a substantially uniform stream of poultry, so that the stream of poultry can be passed further into the slaughter line in a suitable way.

In an advantageous embodiment, the poultry, in the unloading station, is unloaded from the at least one holder by at least one unloading device.

The advantage of using an unloading device is that a high degree of operational reliability is achieved during the unloading of the poultry, avoiding any human intervention.

In another, advantageous embodiment, the control device is linked to the at least one unloading device in order to control a number of birds which is unloaded from the at least one holder per time unit. In this way, it is possible to advantageously control the unloading of birds from the holders in order to reduce fluctuations in the stream of poultry.

In an advantageous embodiment, a number of unloading devices are arranged in parallel in the device. This increases the unloading capacity and the flexibility of the unloading process.

In a particularly advantageous embodiment, the at least one conveyor device is constructed to convey the poultry at a conveying speed, the control device being linked to the at least one conveyor device and being constructed to control the conveying speed of the at least one conveyor device in order to reduce fluctuations in the stream of poultry.

By controlling the conveying speed of the conveyor device, it is possible to control the moment at which a bird is delivered by the conveyor device, so that the fluctuations in the stream of poultry are reduced on the downstream side of the conveyor device.

In an advantageous embodiment of the device, the conveying station comprises a number of conveyor devices arranged in parallel. If these conveyor devices arranged in parallel can be controlled independently or as a function of one another, the conveying process can be controlled successfully and it is possible to effectively reduce variations in the stream of poultry.

A particularly advantageous embodiment is offered by a device wherein a number of conveyor devices convey the poultry from the unloading station to a collection-conveyor device, and wherein the collection-conveyor device conveys the poultry with a speed to the connecting station. The collection-conveyor device collects the individual streams of poultry and transfers them to a connecting station in a suitable way, so that the connecting station can easily process the stream of poultry.

It is particularly advantageous if the control device is constructed to control the number of birds which is transferred from the at least one conveyor device to the collection-conveyor device per time unit, in order to reduce fluctuations in the stream of poultry. This enables the stream of poultry on the collection-conveyor device to be more uniform than the stream of poultry which are formed during the unloading of the holders.

If the conveying station comprises a number of conveyor devices connected in series, it is possible for the transfer from an upstream conveyor device to a downstream conveyor device to be controlled in such a manner that the fluctuations in the stream of poultry are reduced.

An advantageous embodiment is offered by a device wherein at least one first buffer storage member for the temporary storage of poultry is arranged downstream of the unloading station and upstream of the connecting station. A buffer storage member can absorb temporary peaks or drops in the supply of poultry and can in this way reduce the fluctuations in the stream of poultry.

If the control device is linked to the at least one buffer storage member in order to control a number of birds which is released from the at least one first buffer storage member per time unit, it is possible to effectively make the stream of poultry downstream of the at least one buffer store (more) uniform.

In another embodiment of the device, a stunning station is arranged upstream of the connecting station. The result of this is that the birds are stunned on arrival at the connecting station and for a certain time thereafter, so that it is relatively easy to connect the birds to the carriers in the connecting station.

A further advantage is offered if a second buffer storage member, for temporarily storing birds which have been delivered to the connecting station and for which no carrier is available, is positioned in the connecting station. This makes it possible to achieve the advantageous situation whereby if more birds are delivered to the connecting station than there are carriers available for a certain period of time, these birds can be temporarily stored, and when carriers become available again they can be released by the second buffer storage member in order to be connected to the carriers.

In another preferred embodiment, the unloading station comprises at least one sensor which measures at least one parameter relating to the unloading, which parameter is preferably selected from a group of parameters which comprises: a number of birds which is unloaded from the holder per time unit, a weight of a total number of birds in the holder, a weight of at least one individual bird in the holder, a number of birds present in the holder, and a temperature of a bird, resulting in at least one measured value, the at least one measured value being fed to the control device in order to control the number of birds which is transferred from the unloading station to the conveying station or from the conveying station to the connecting station per time unit, in order to reduce fluctuations in the stream of poultry.

By measuring parameters and using these parameters for control purposes, it is possible to record fluctuations in the stream of poultry and to reduce these fluctuations by means of the control device.

In a further advantageous embodiment, the invention relates to a device wherein the conveying station comprises at least one sensor which is constructed to measure at least one parameter relating to the conveying, which parameter is preferably selected from a group of parameters which comprises: a number of birds which passes a defined point on the conveyor device per time unit, a weight of the total number of birds on the at least one conveyor device, a weight of at least one individual bird on the at least one conveyor device, a duration of time between a bird leaving the unloading station and arriving at the connecting station, a conveying speed of a stream of poultry, and a number of birds which is present on the conveying member, resulting in at least one measured value, the at least one measured value being fed to the control device in order to control the number of birds which is transferred from the unloading station to the conveying station or from the conveying station to the connecting station per time unit, in order to reduce fluctuations in the stream of poultry.

By recording one or more parameters which relate to the conveying process and feeding these parameters to the control device, it is possible to achieve better and more effective control of the overall system, which leads to a substantially uniform stream of poultry.

Another embodiment of the invention relates to a device wherein the connecting station comprises at least one sensor which is constructed to measure at least one parameter relating to the connecting of the birds to the carrier, which at least one parameter is preferably selected from a group of parameters which comprises: a waiting time for a bird at the connecting station, a number of birds waiting at the connecting station, a number of birds which is delivered to the connecting station per time unit, a number of carriers which leaves the connecting station per time unit, a number of carriers which leaves the connecting station per time unit without a bird having been connected to them, a number of birds which is delivered to the connecting station per time unit without a carrier being available for them, a number of birds present at the connecting station for connection to a carrier, and a number of carriers which is approaching the connecting station per time unit, resulting in at least one measured value, the at least one measured value being fed to the control device in order to control the number of birds which is transferred from the unloading station to the conveying station or from the conveying station to the connecting station per time unit, in order to reduce fluctuations in the stream of poultry.

By measuring one or more parameters which relate to the connection of the birds to the carrier, it is possible to achieve accurate control of the entire system and to effectively reduce fluctuations in the stream of poultry.

In a further advantageous embodiment of the invention, the said at least one sensor is linked to the control device, the control device being linked to the at least one unloading device, and the said measured values being fed to the control device in order to control the at least one unloading device.

If the said measured values are fed to the control device, it is possible for the unloading of the birds to be used in an effective way to reduce fluctuations in the stream of poultry.

In another aspect, the invention relates to a device wherein the said at least one sensor is linked to the control device, and wherein the control device is linked to the at least one first buffer storage member, and wherein the said measured values are fed to the control device in order to control the at least one first buffer storage member.

This embodiment allows the buffer storage member to be controlled in such a manner that the number of birds which is released from the first buffer storage member is determined by the measured values which have been determined in the measurements carried out by the at least one sensor. In this way, the fluctuations in the stream of poultry on the downstream side of the buffer storage member will be of reduced extent compared to on the upstream side thereof.

In an advantageous embodiment of the invention, the at least one conveyor device is a conveyor belt. A conveyor belt is a very suitable conveyor medium for poultry, since birds can be located and conveyed on the conveyor belt without having to be connected to it.

In a preferred embodiment, the unloading station comprises a tilting device for tilting the at least one holder, wherein the poultry leaves the holder under the influence of the force of gravity. Using the force of gravity for unloading purposes provides a simple and operationally reliable way of unloading the birds from the holder. If the control device is constructed to control the tilting of the tilting device, it is possible for possible fluctuations in the stream of poultry during unloading to be reduced by controlling the degree of tilting of the holder.

If the at least one unloading device comprises an arm which can move into the at least one holder, it is possible for the unloading process to be carried out automatically without the holder having to be moved for unloading purposes. This limits possible stress to the birds during unloading. In this embodiment too, the unloading device can be configured to be controlled by the control device.

In another aspect, the said at least one sensor is preferably selected from a group which comprises: a pivotable body, a measuring instrument for measuring a weight, a measuring instrument for measuring infrared radiation, and an optical measuring instrument. A sensor of this type can be used to measure a stream of poultry in terms of number per period of time in an operationally reliable way. In a further preferred embodiment, the at least one conveyor device extends over a defined distance, the at least one conveyor device having an upstream side and a downstream side, and the at least one sensor being arranged on the downstream side of the at least one conveyor device. If a sensor is arranged on the downstream side of the at least one conveyor device, it is possible to measure a stream of poultry just before it is delivered by the conveyor device. This promotes good control of the system.

The arm advantageously comprises a first conveyor belt. A conveyor belt allows birds to be unloaded from the holder in a very efficient, operationally reliable way.

Particularly favourable results are obtained if the unloading device comprises a second conveyor belt, which can be moved into a position above the poultry which is to be unloaded, the said second conveyor belt being constructed to move the poultry out of the holder. This means that there is no need for a conveyor belt to be pushed under the birds, and it is also possible to prevent the birds from sticking their heads into a top side of the holder or digging themselves in between an underside and a top side of the holder.

In a particular embodiment the conveyor belt of the unloading device comprises projections for advancing the poultry. The projections project downwards from the conveyor belt and unload the birds from the holder by moving them towards an opening of the holder. This allows the birds to be unloaded efficiently from the holder without a conveyor belt having to be pushed under the birds.

If the projections are flaps, the birds are unloaded particularly easily.

In another aspect of the invention, the connecting station comprises a number of connecting lines. In this context, a connecting line is a location to which empty carriers and birds are supplied and where the birds are connected to the empty carriers. This makes it possible to achieve a higher capacity in the connecting station.

In a further advantageous aspect, a conveyor in part follows two different paths, a first path running past a connecting line while a second path does not run along a connecting line, and the conveyor being constructed to enable carriers to follow the first or second path depending on a predetermined selection.

With this device it is possible, if birds are relatively large, such as for example turkeys, for some of the carriers to be diverted, so that not all the carriers move along the connecting line, but rather only some of them do so. If the carriers alternately follow the first path and the second path, the distance between the carriers at the connecting line is double the distance between them in a normal situation. This provides space for connecting larger birds to the carriers. For example, turkeys can be connected to carriers with a distance between the carriers which is more suitable for smaller animals, such as chickens. A person skilled in the art will note that the use of a plurality of connecting lines may also be employed independently.

The invention is explained in more detail in the text which follows with reference to the drawing which shows a number of embodiments which are given purely by way of non-limiting examples. In the drawing.

Figure 3A:
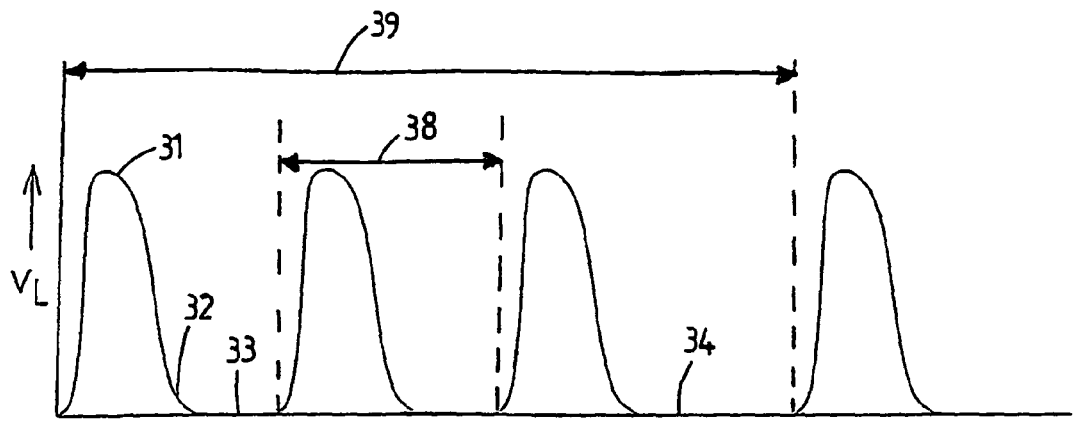
FIG. 3a shows a graph illustrating the stream of poultry over the course of time while a holder is being unloaded.
Figure 3B:
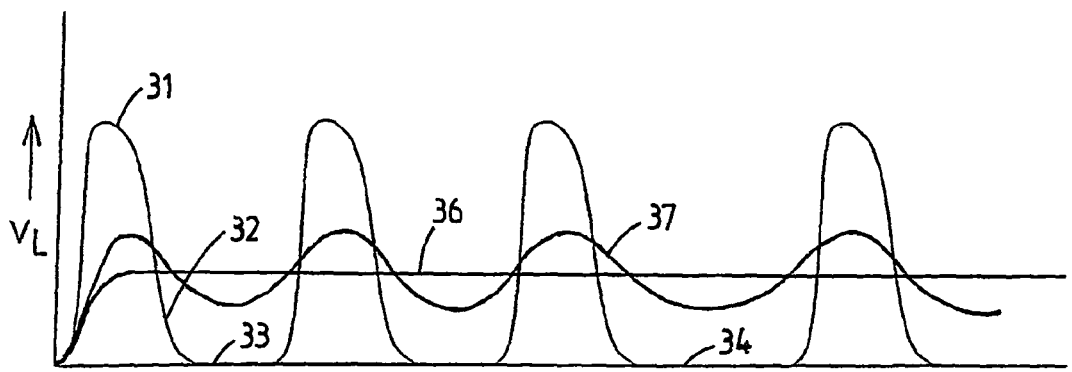
FIG. 3b shows a graph illustrating more uniform streams of poultry.
Figure 3C:
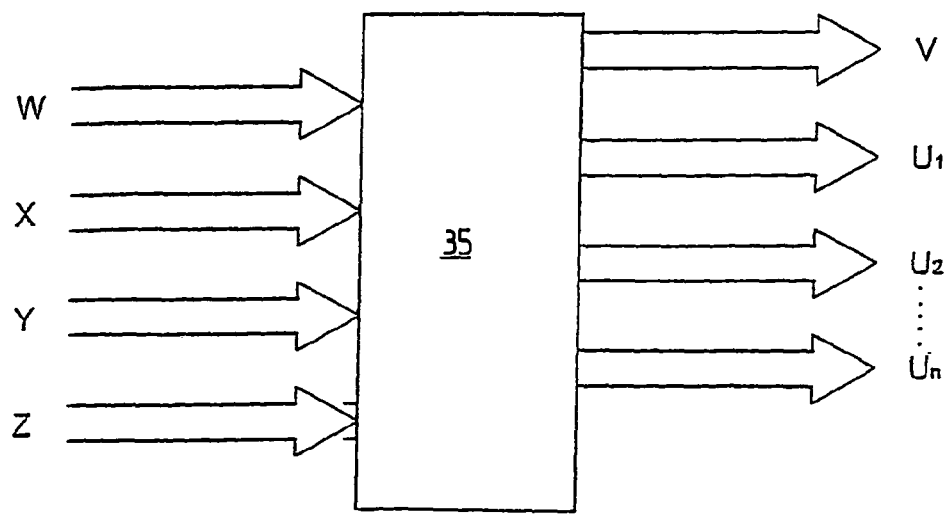
Figure 4:
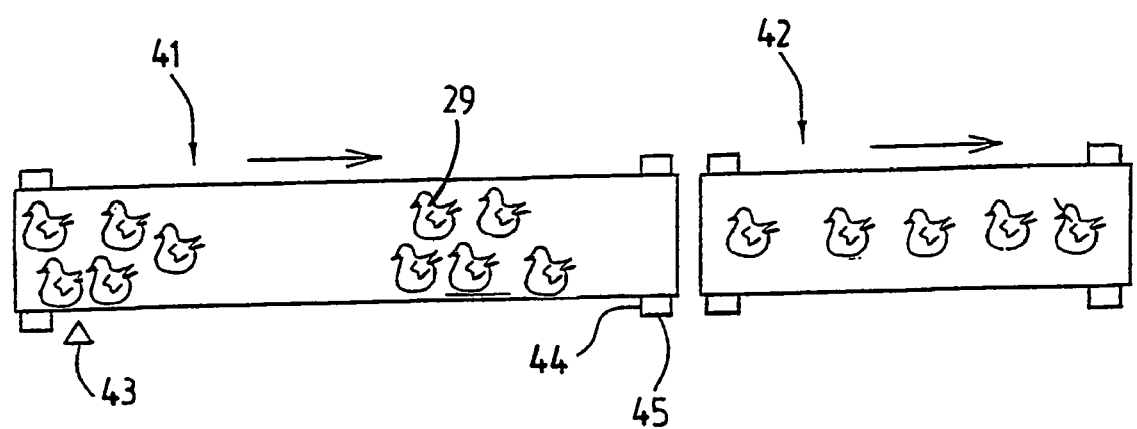
Figure 4A:
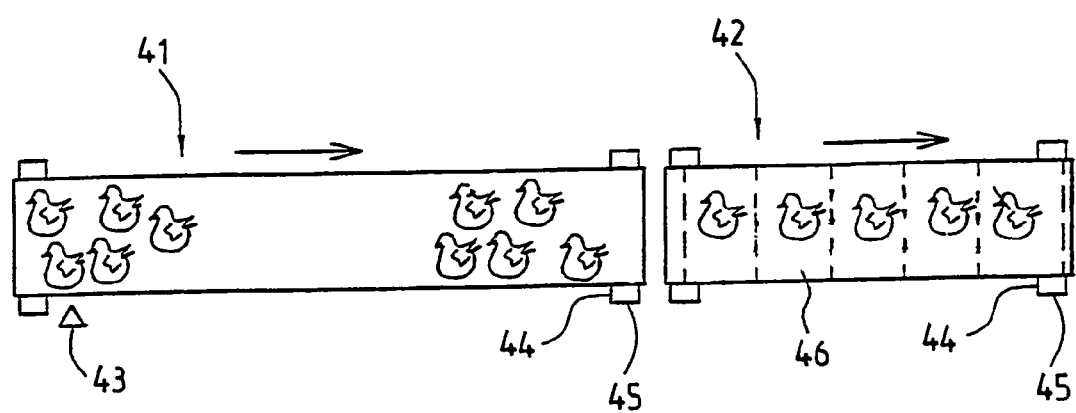
Figure 4B:
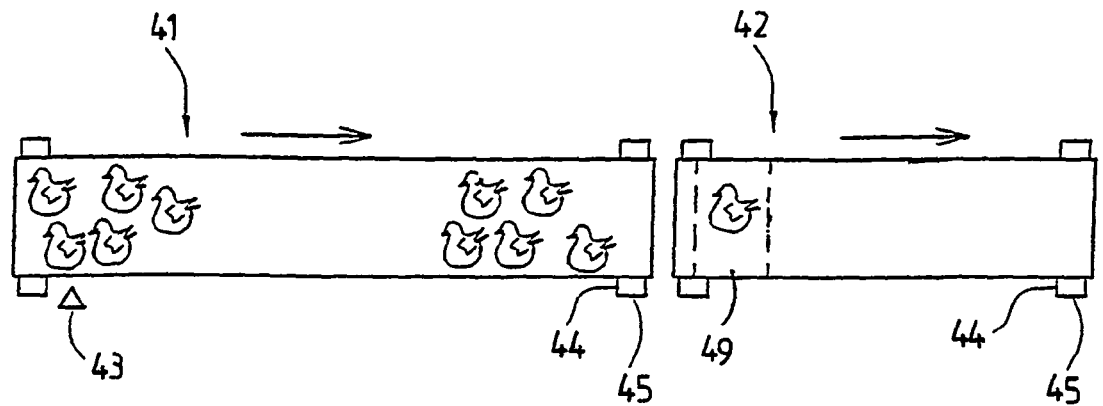
Figure 4C:
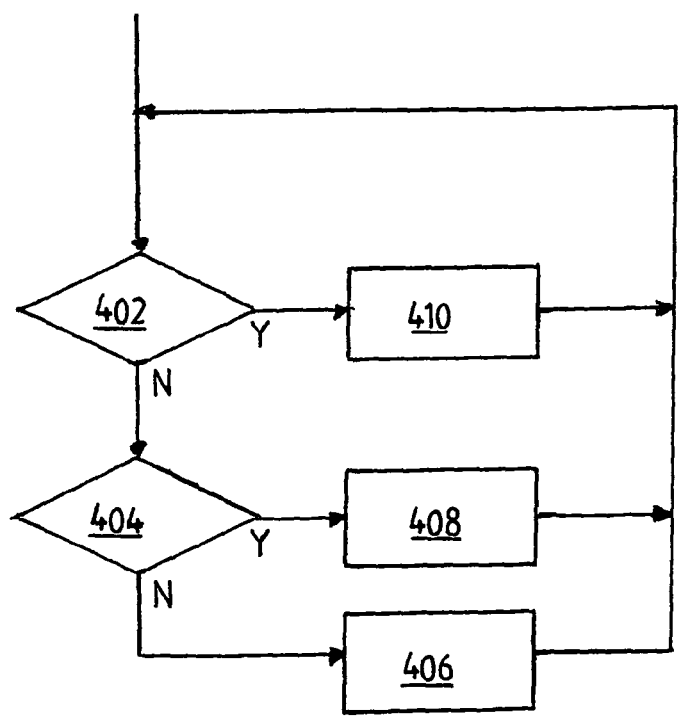
Figure 4D:
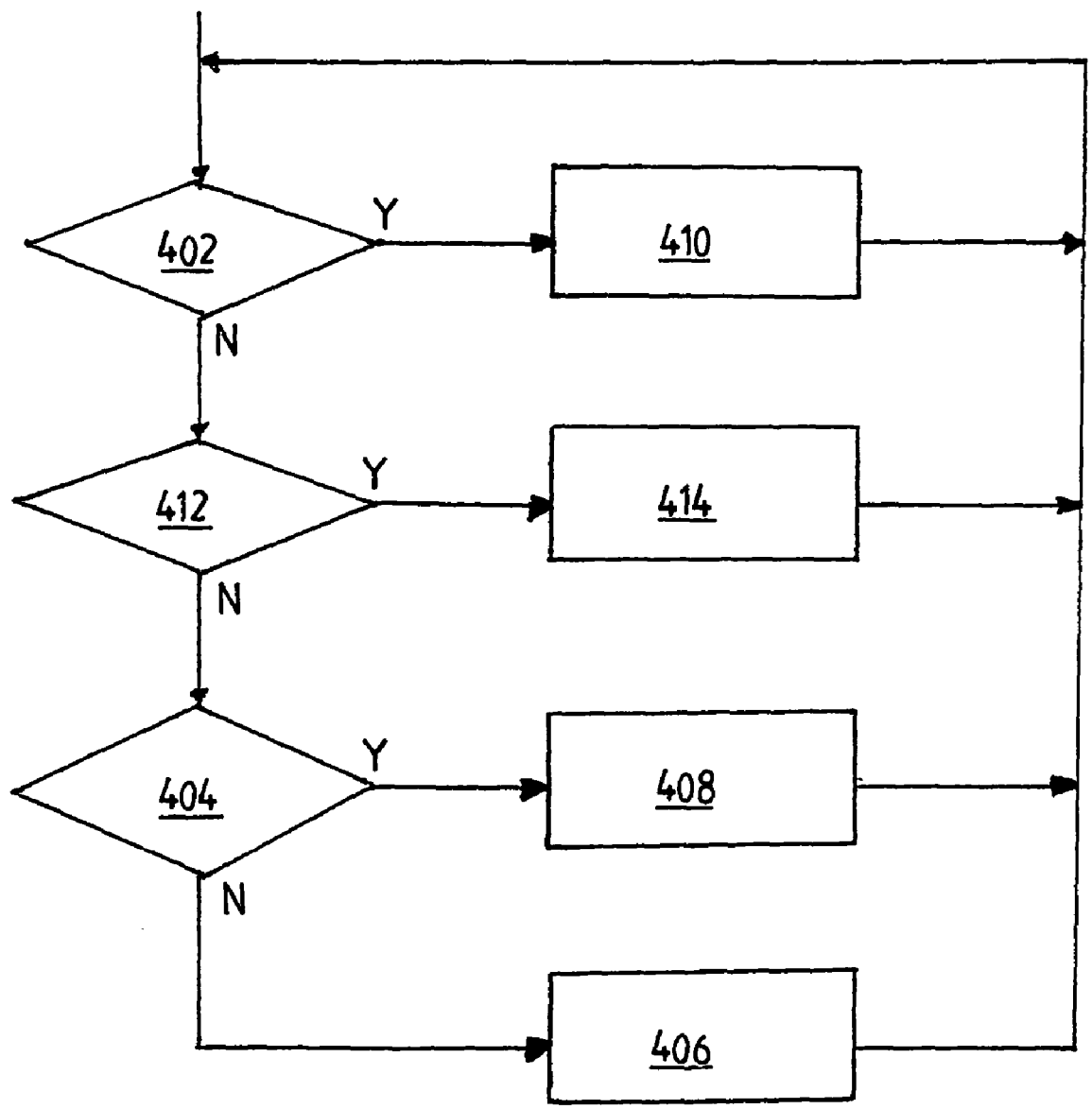
Figure 4E:
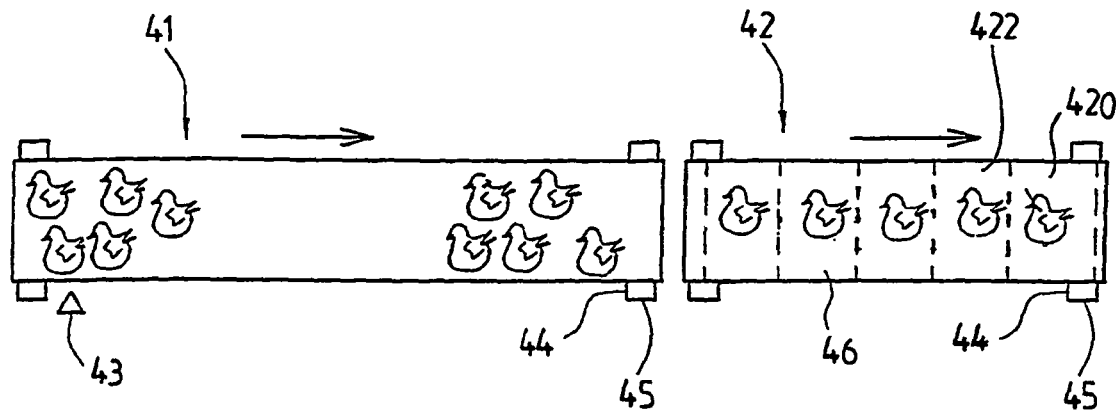
Figure 4F:
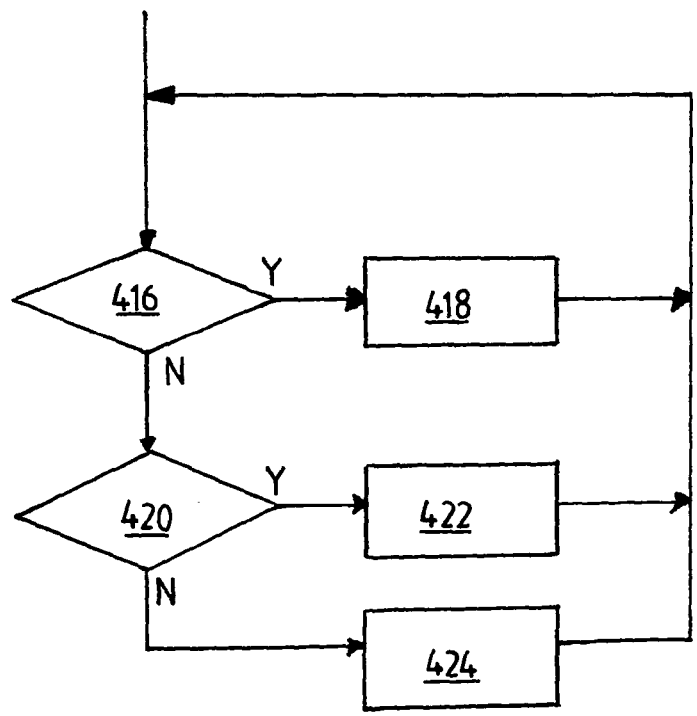
Figure 5A:
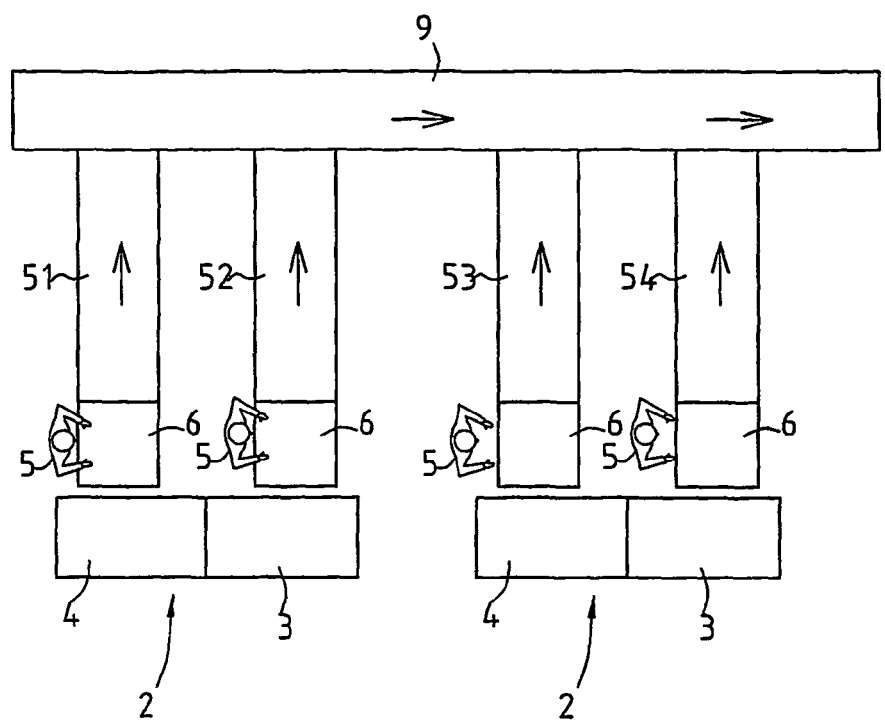
Figure 5B:
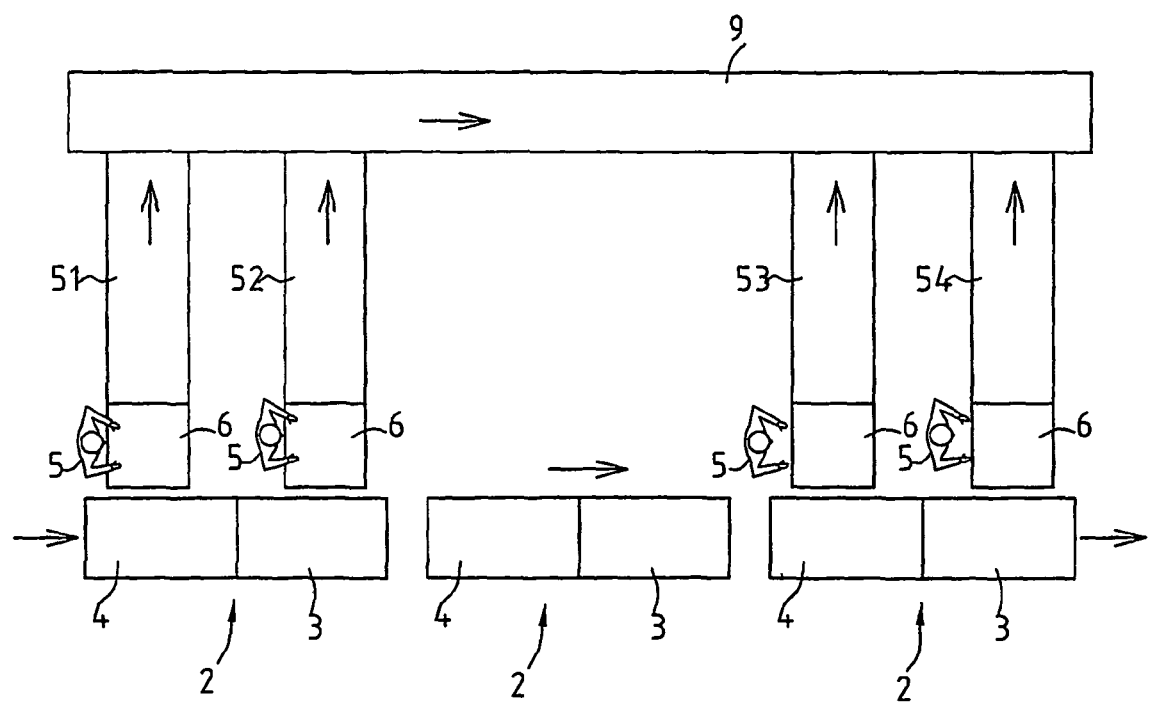
Figure 6:
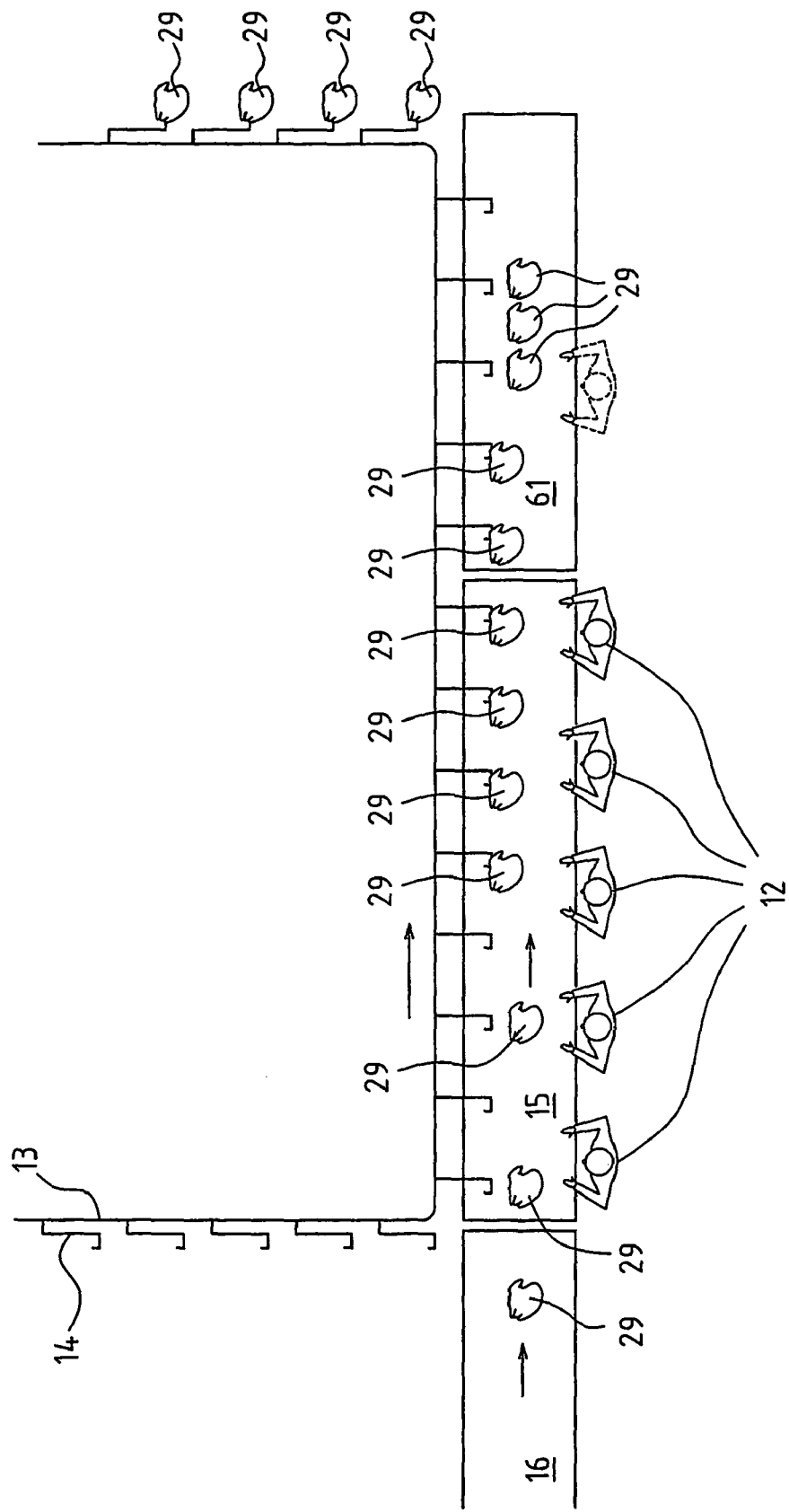
Figure 6A:
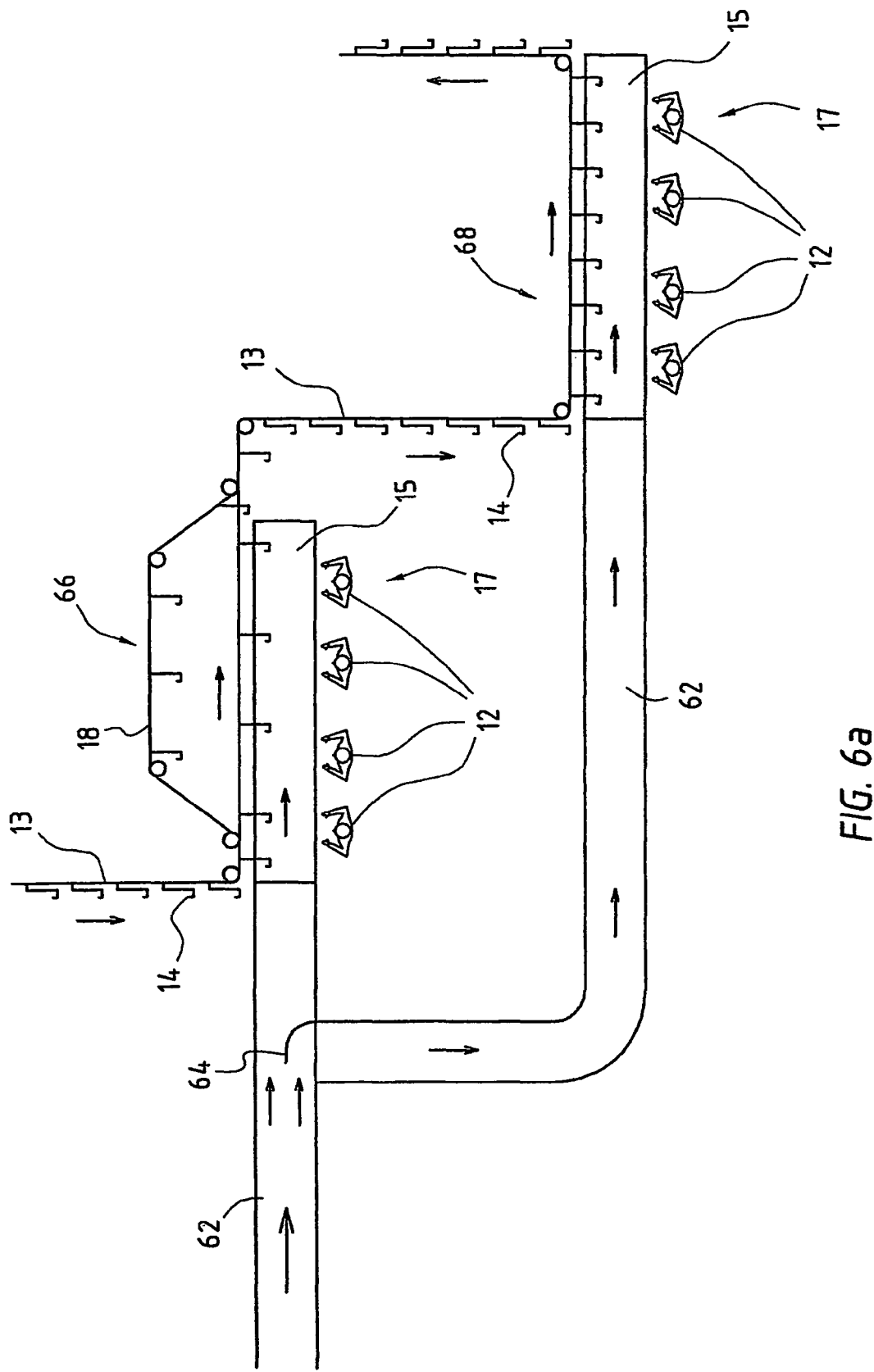
Figure 7A:
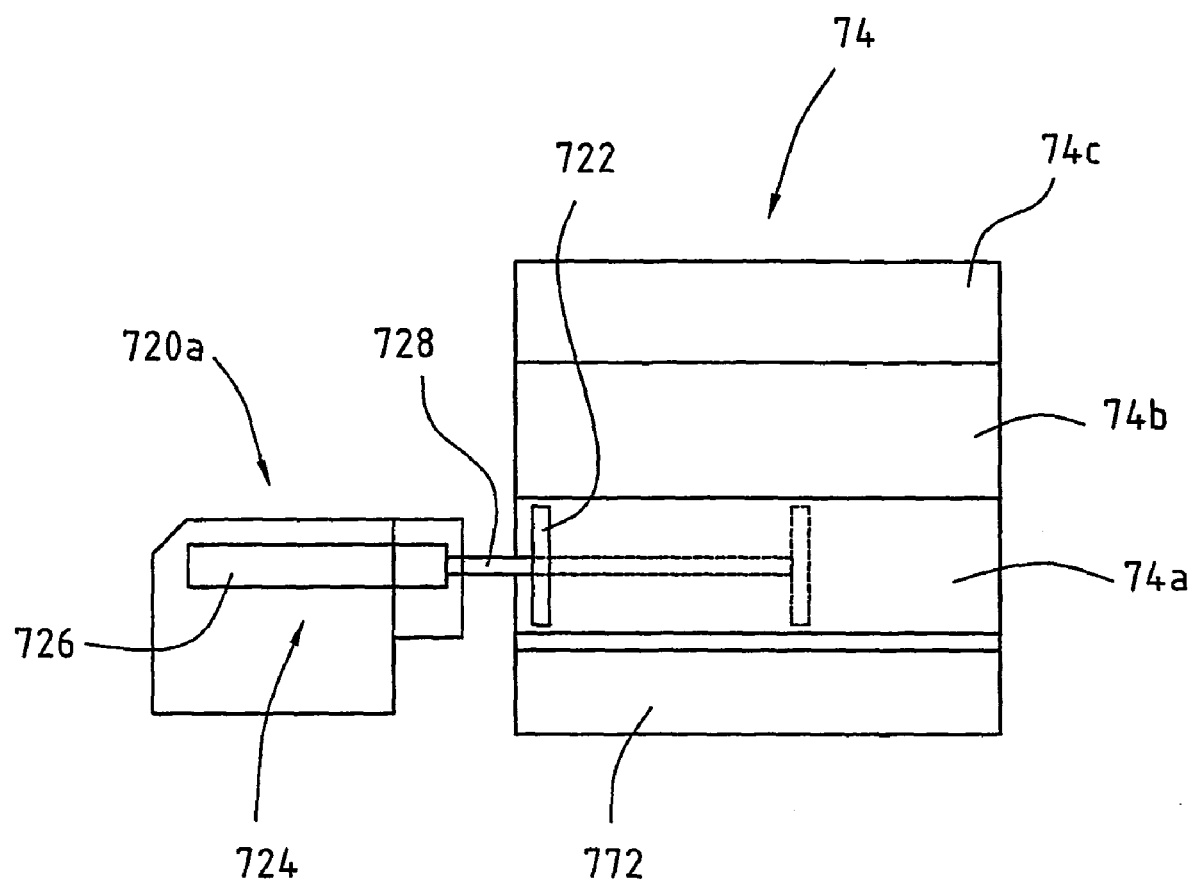
Figure 7B:
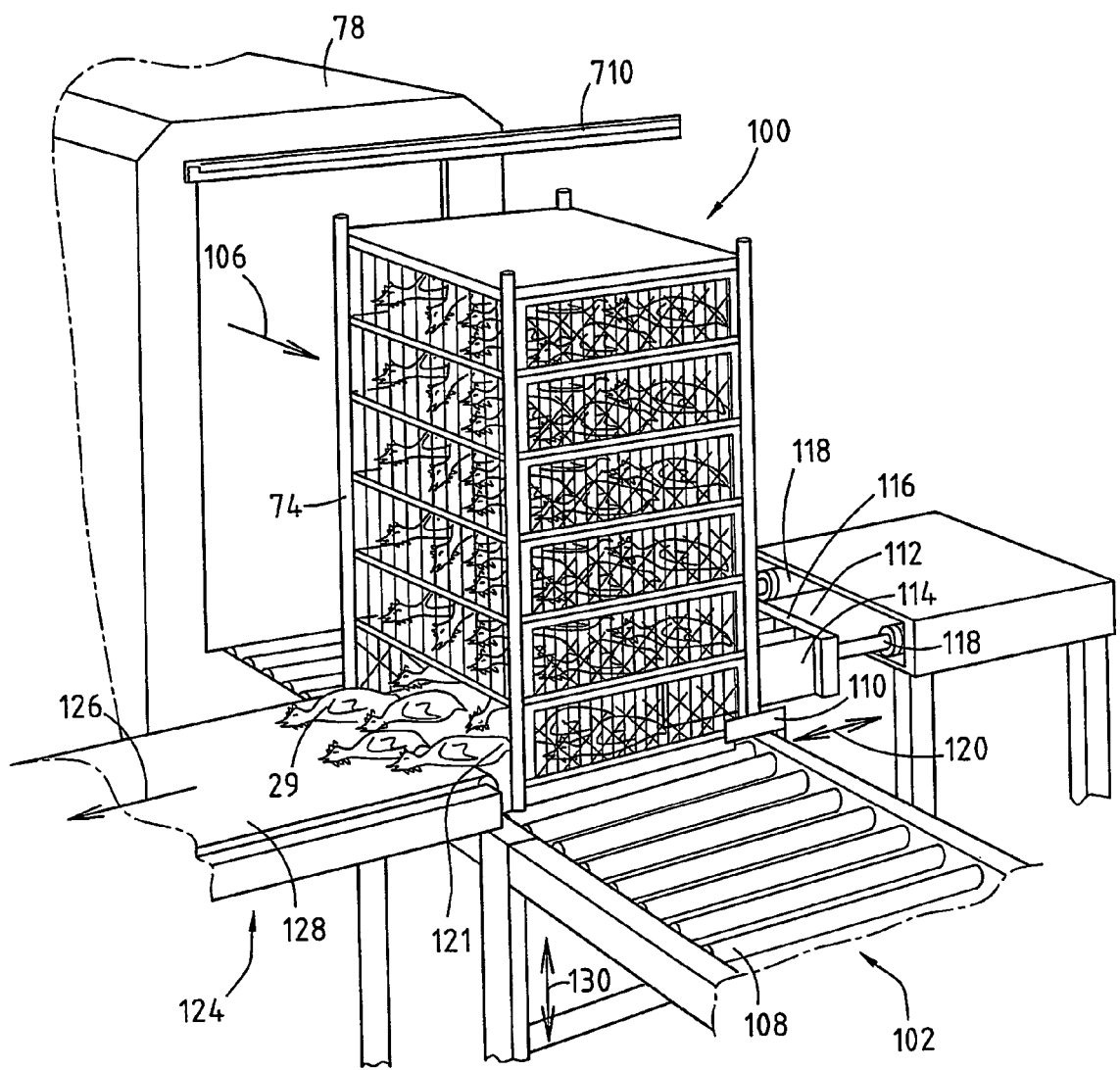
Figure 7C:
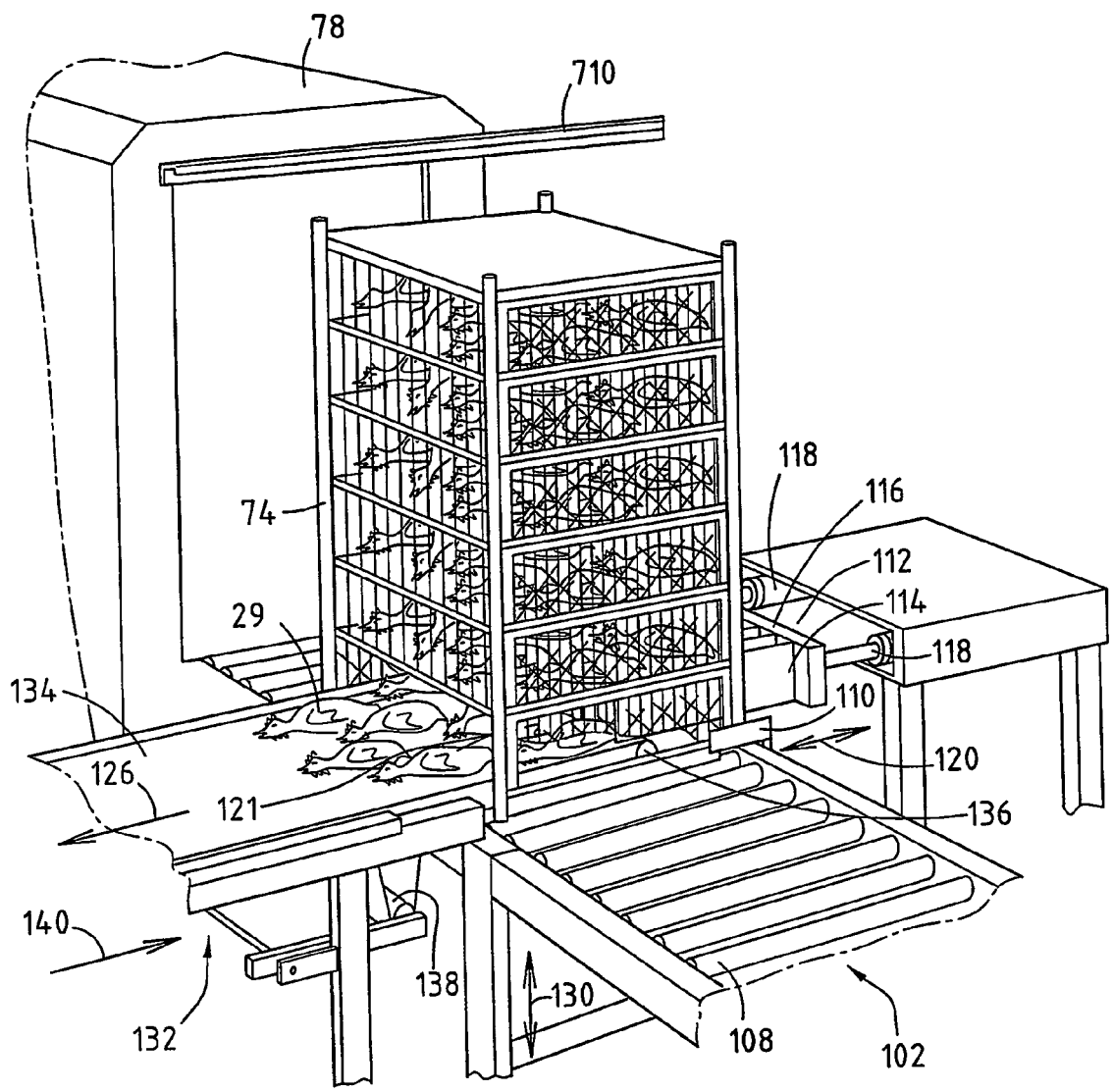
Figure 7D:
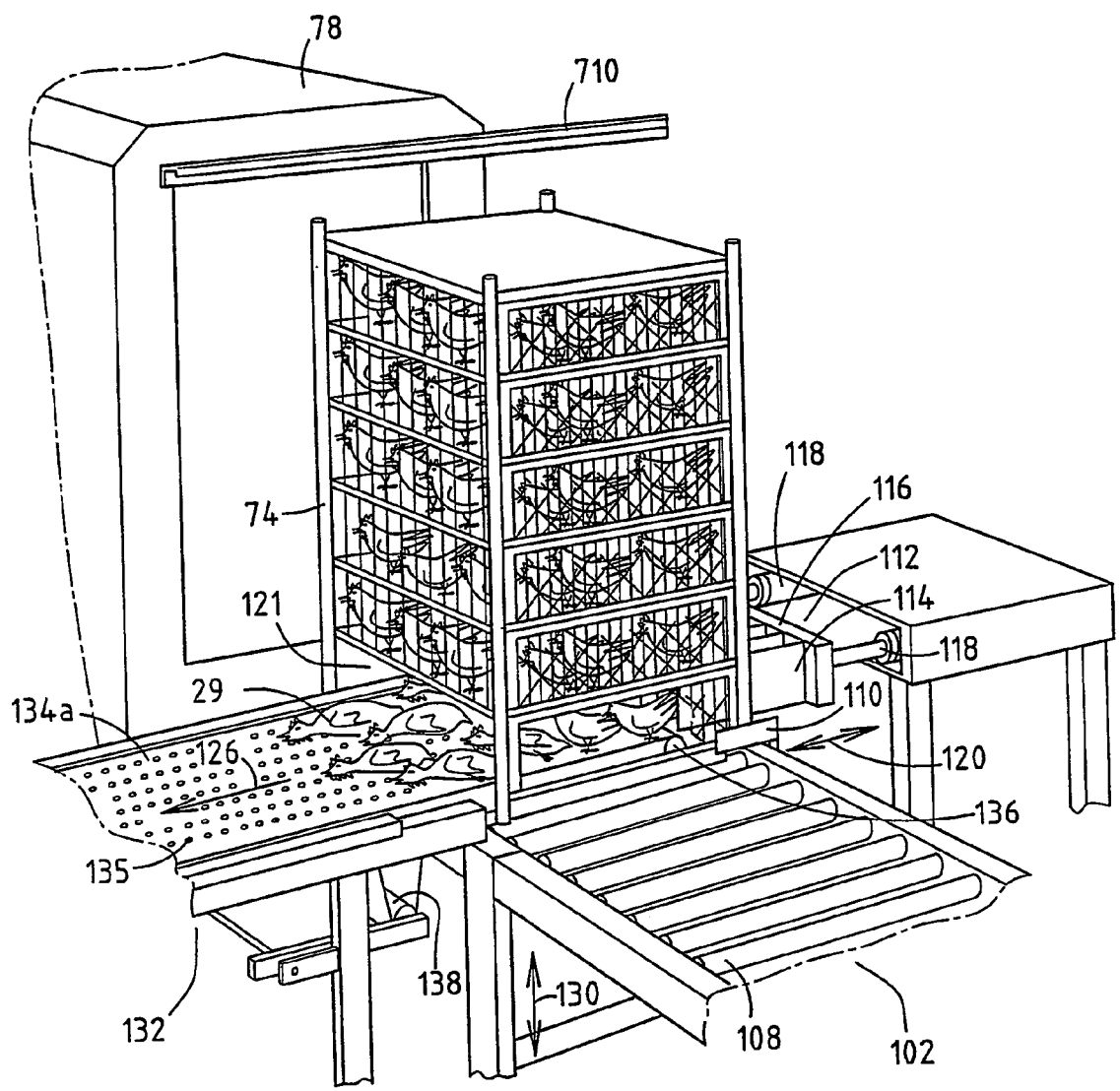
Figure 7E:
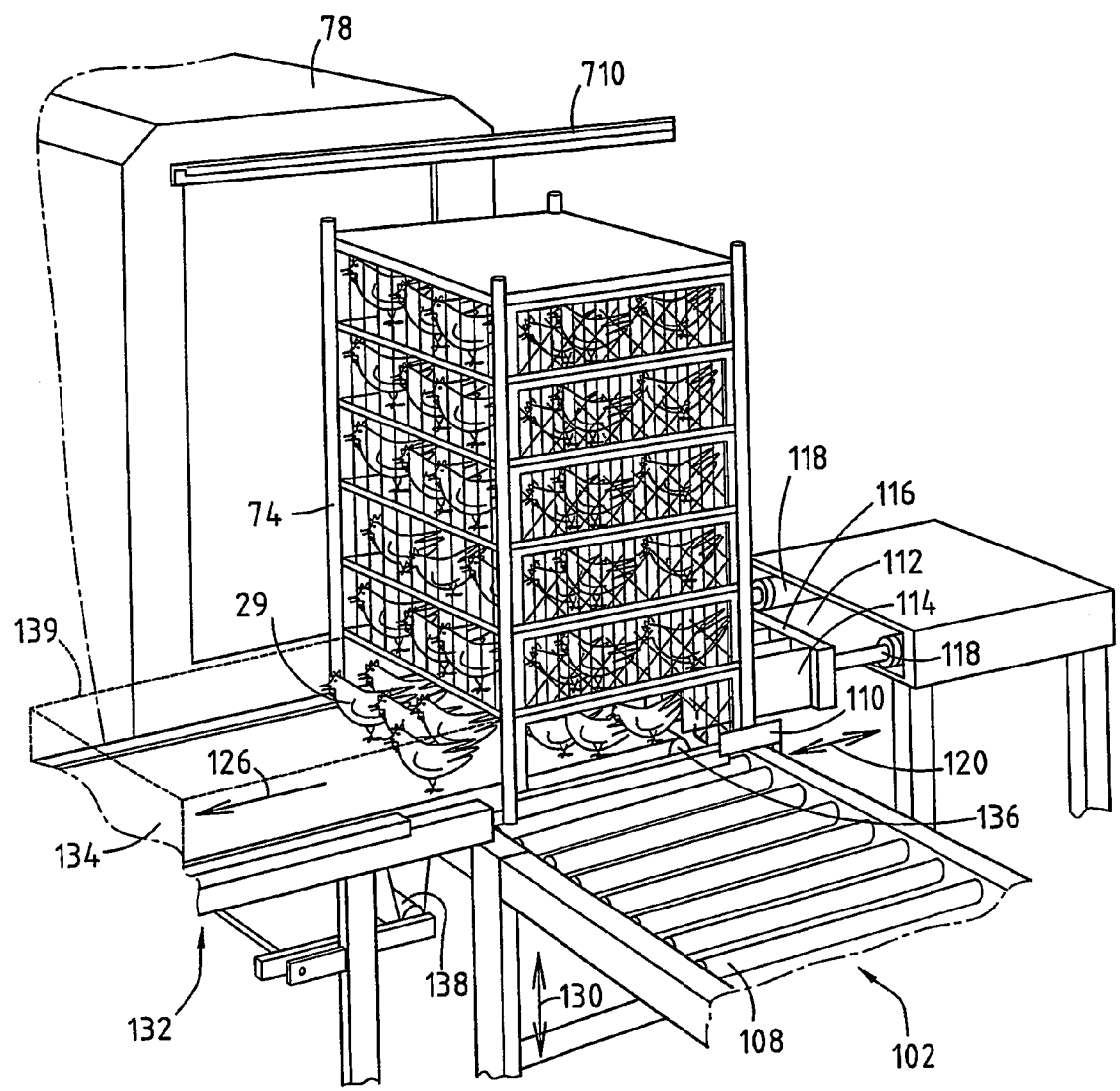
Figure 7F:
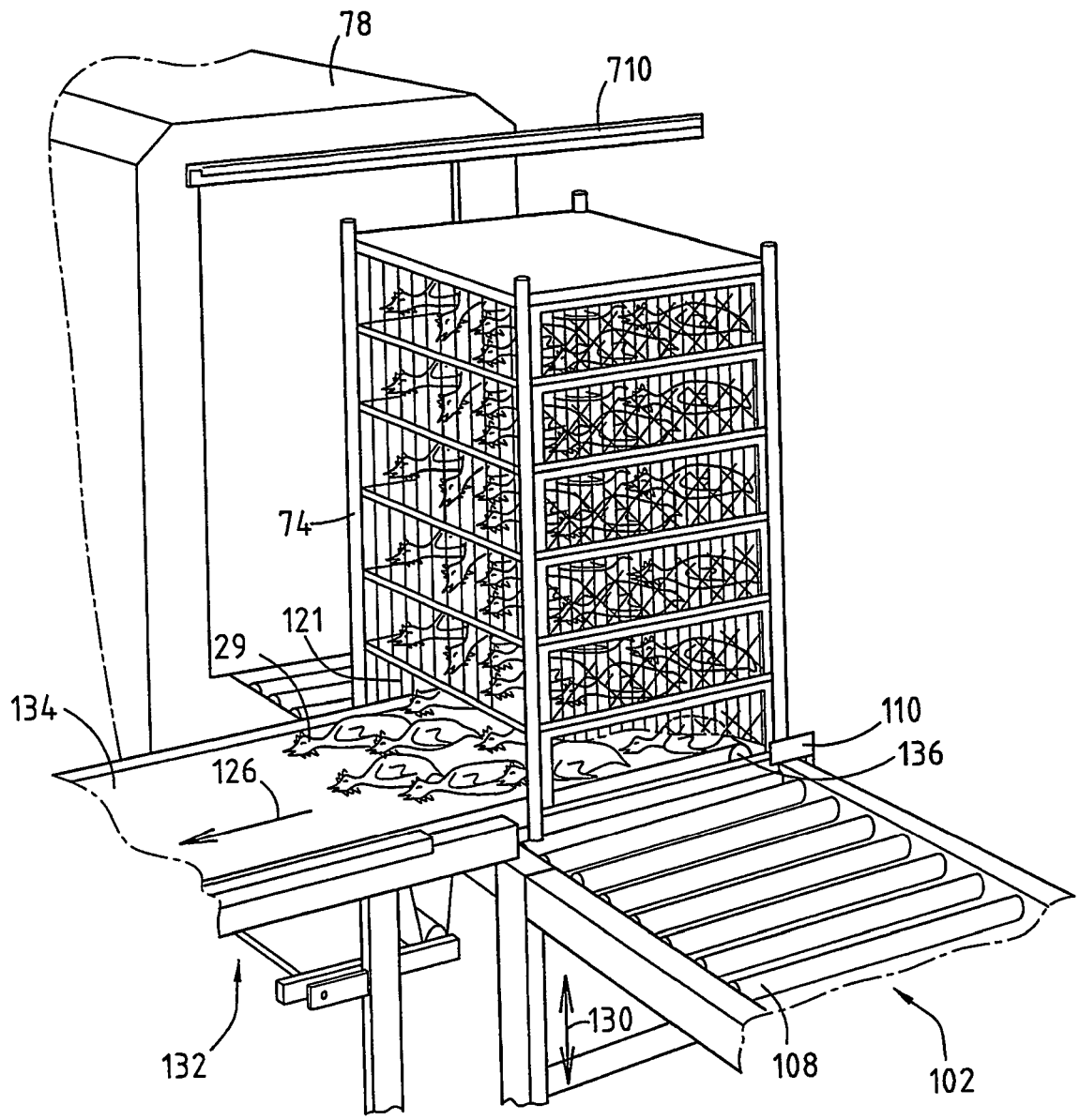
Figure 7G:
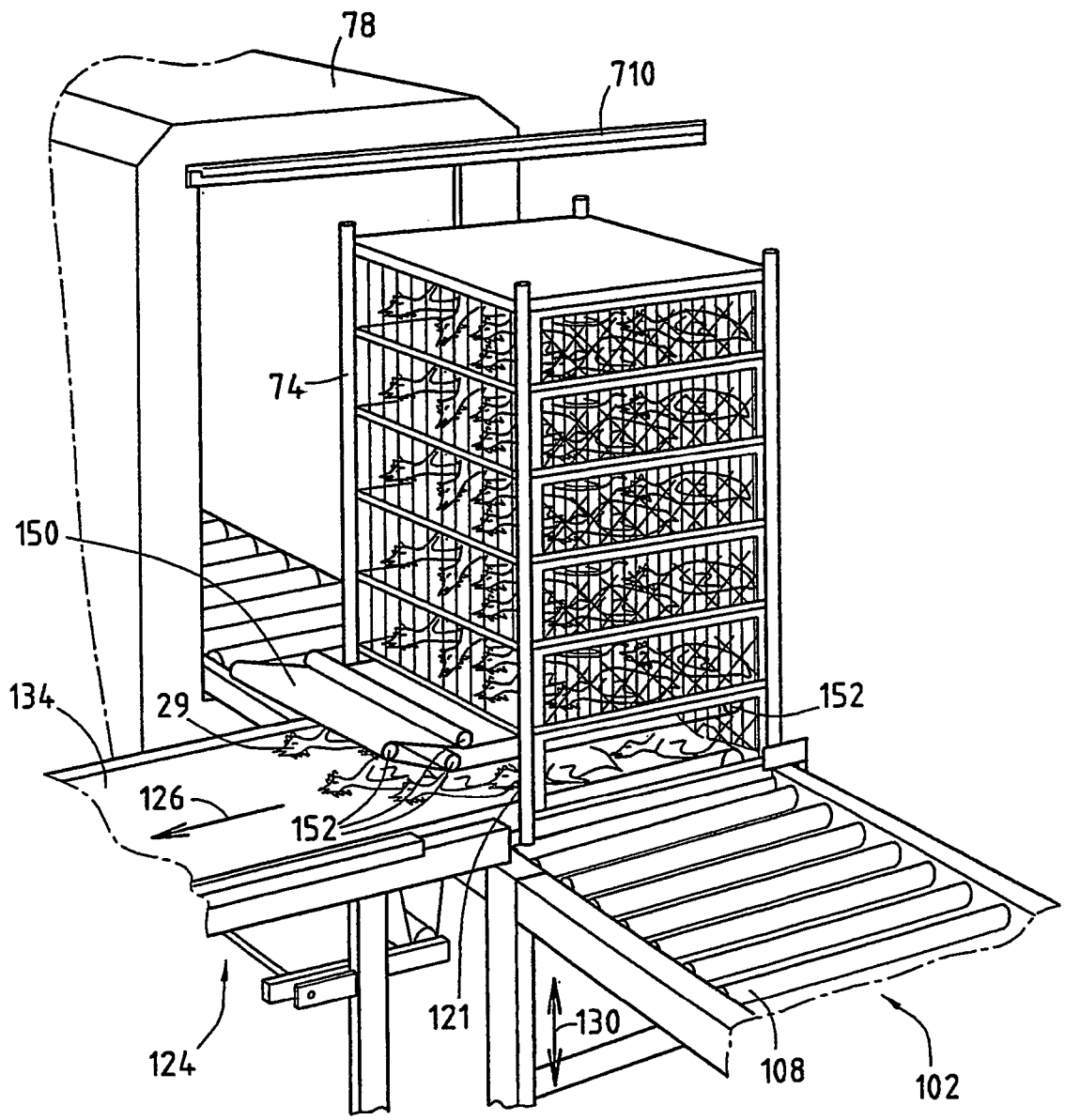
Figure 8A:
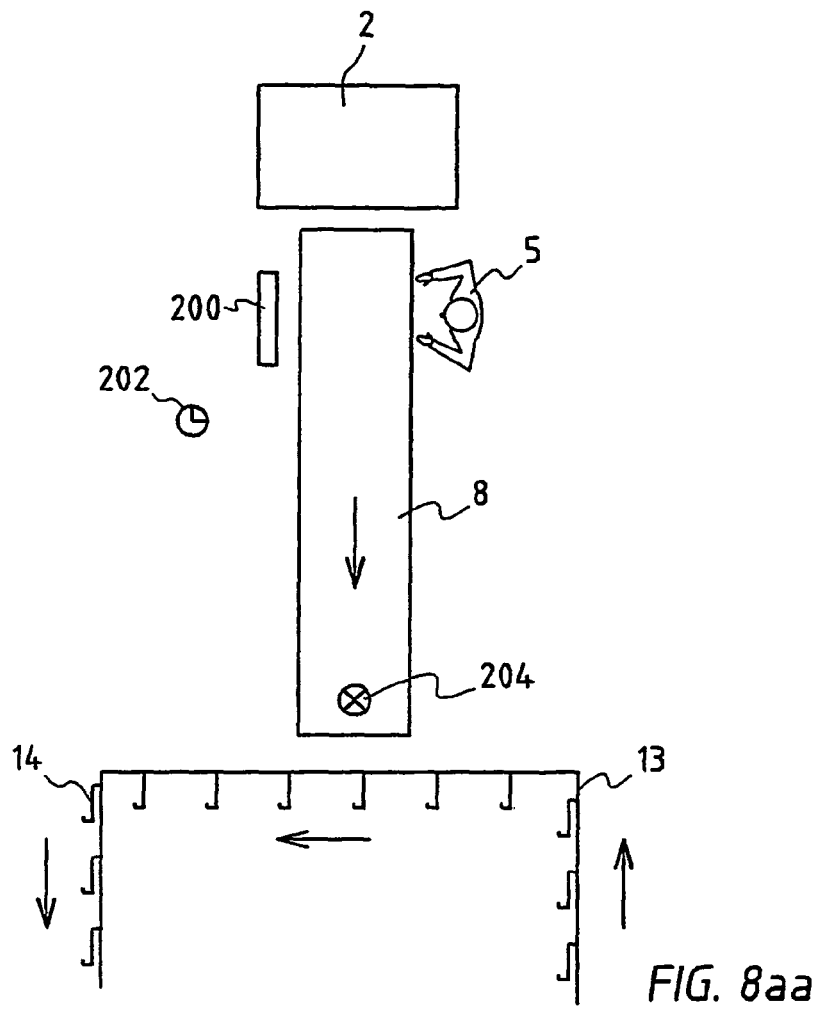
Figure 8A:
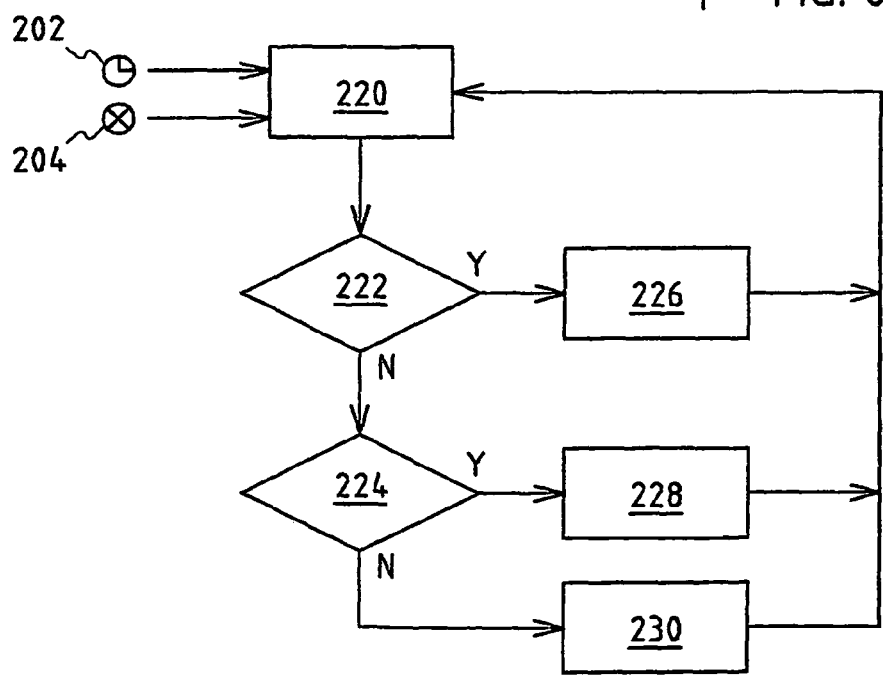
Figure 8B:
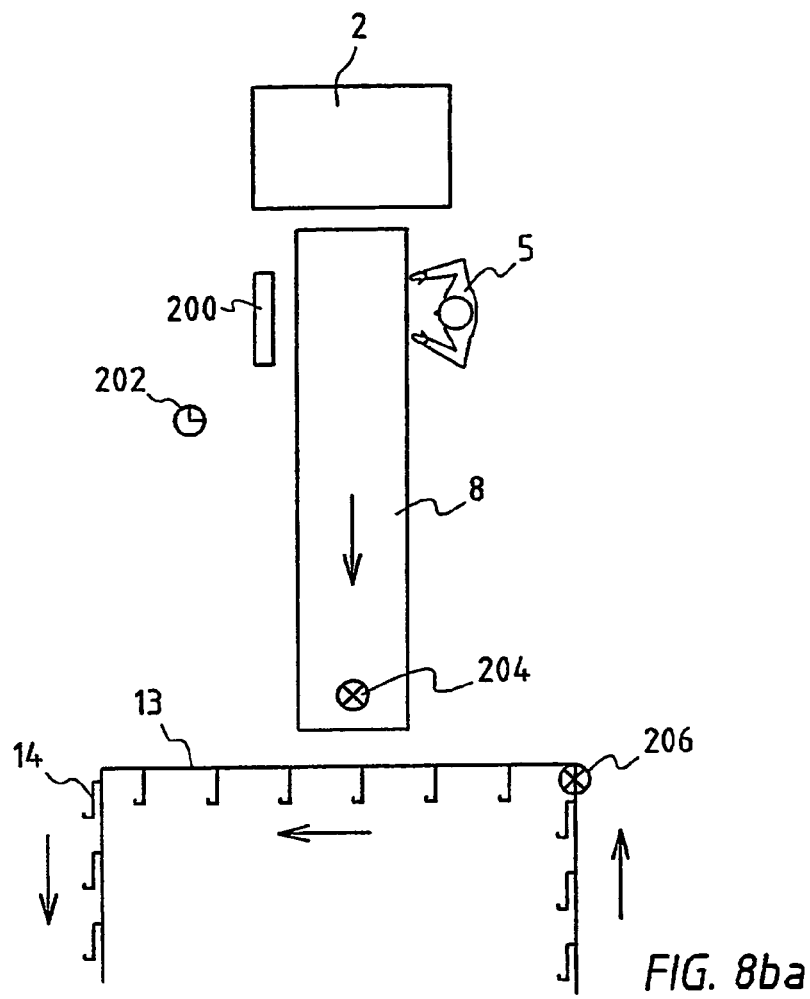
Figure 8B:
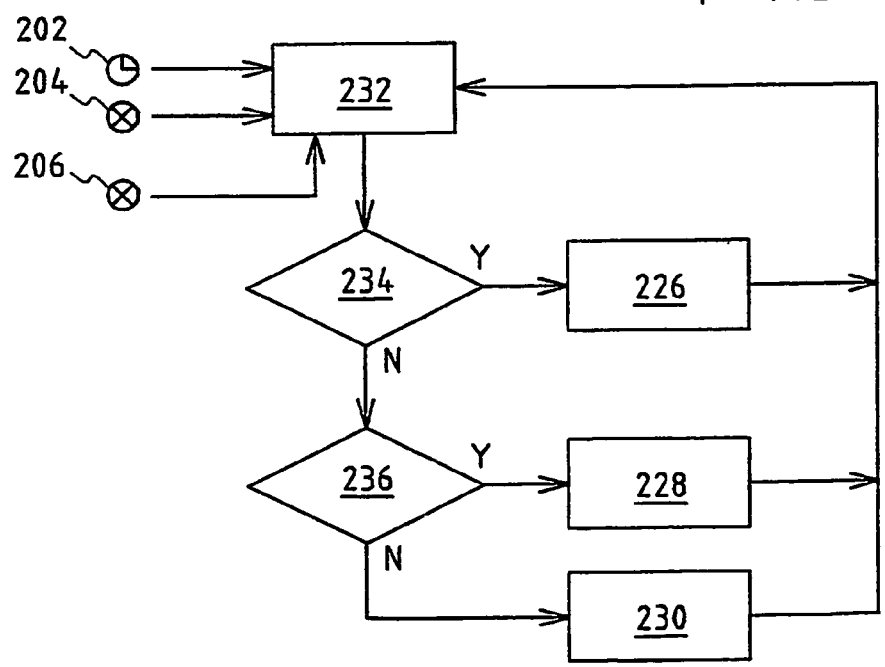
Figure 8C:
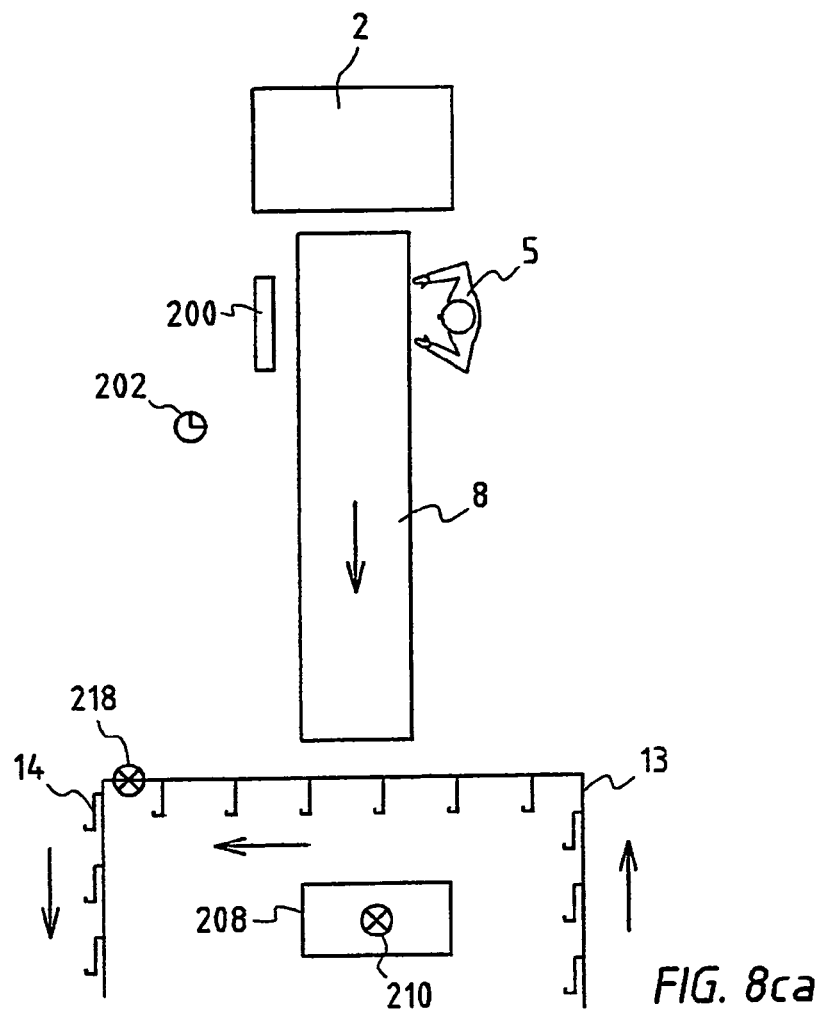
Figure 8C:
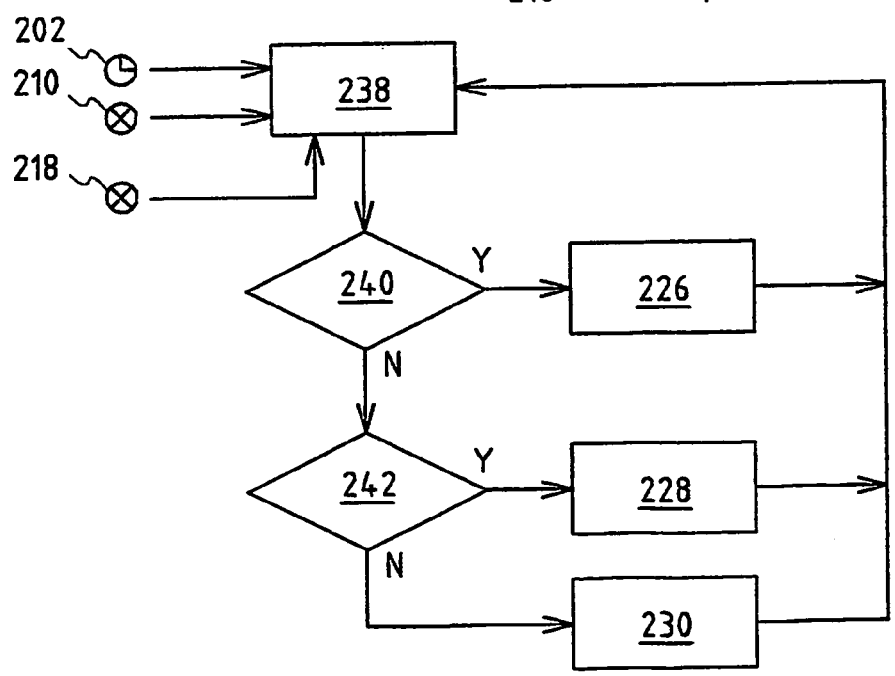
Figure 8D:
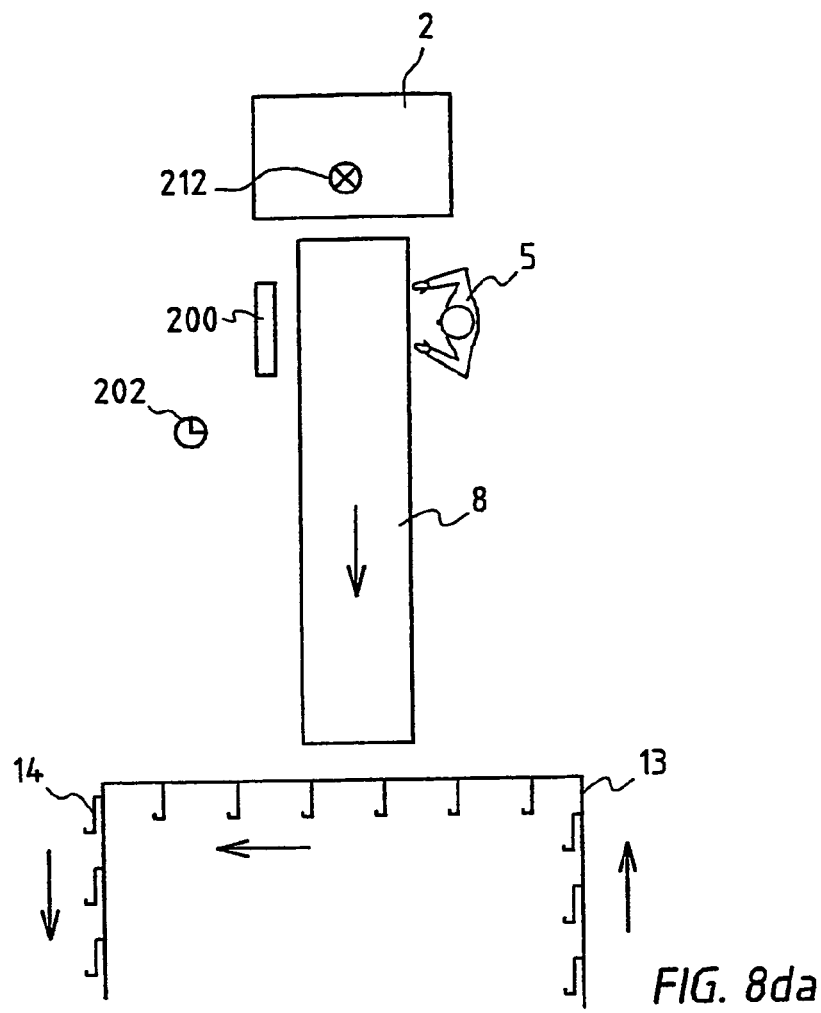
Figure 8D:
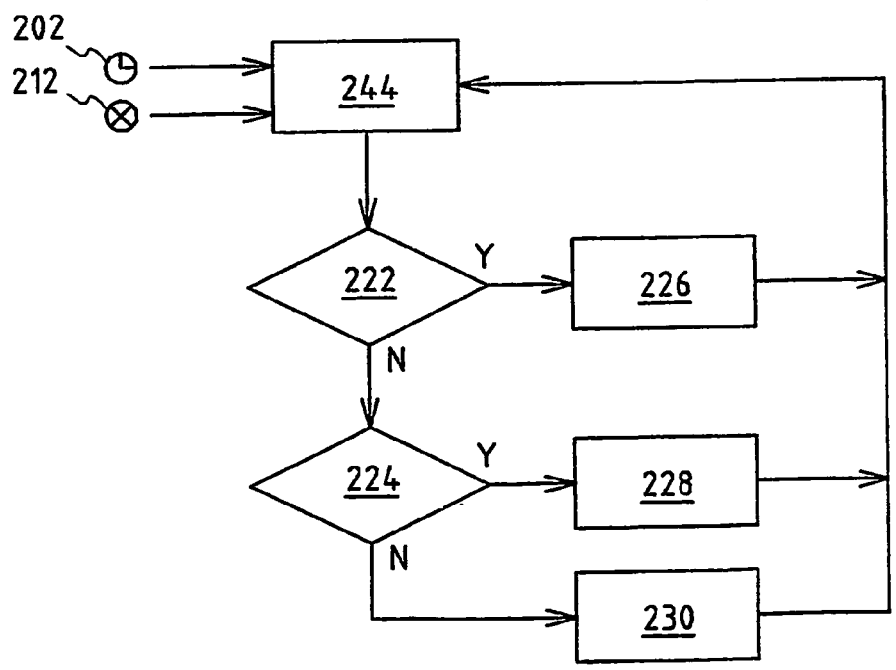
Figure 8E:
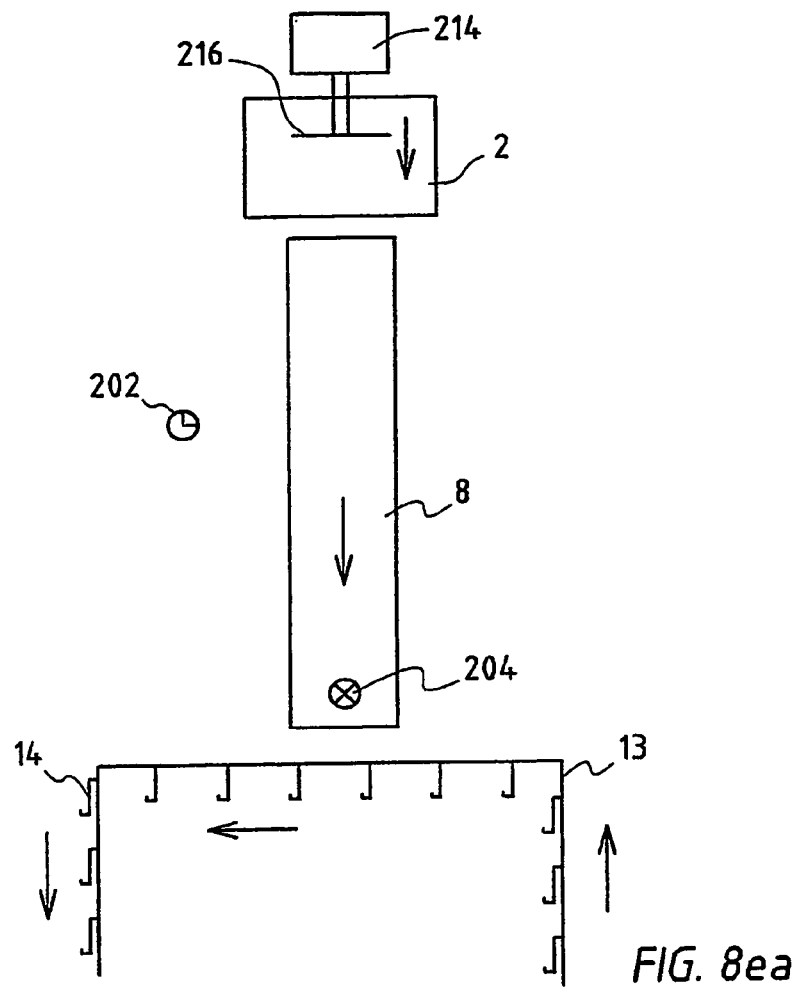
Figure 8E:
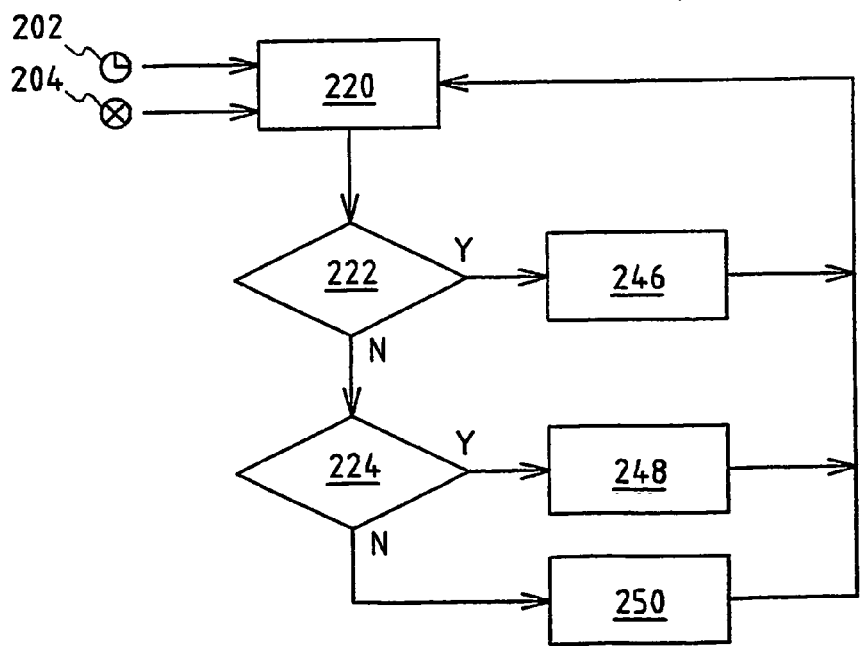
Figure 8F:
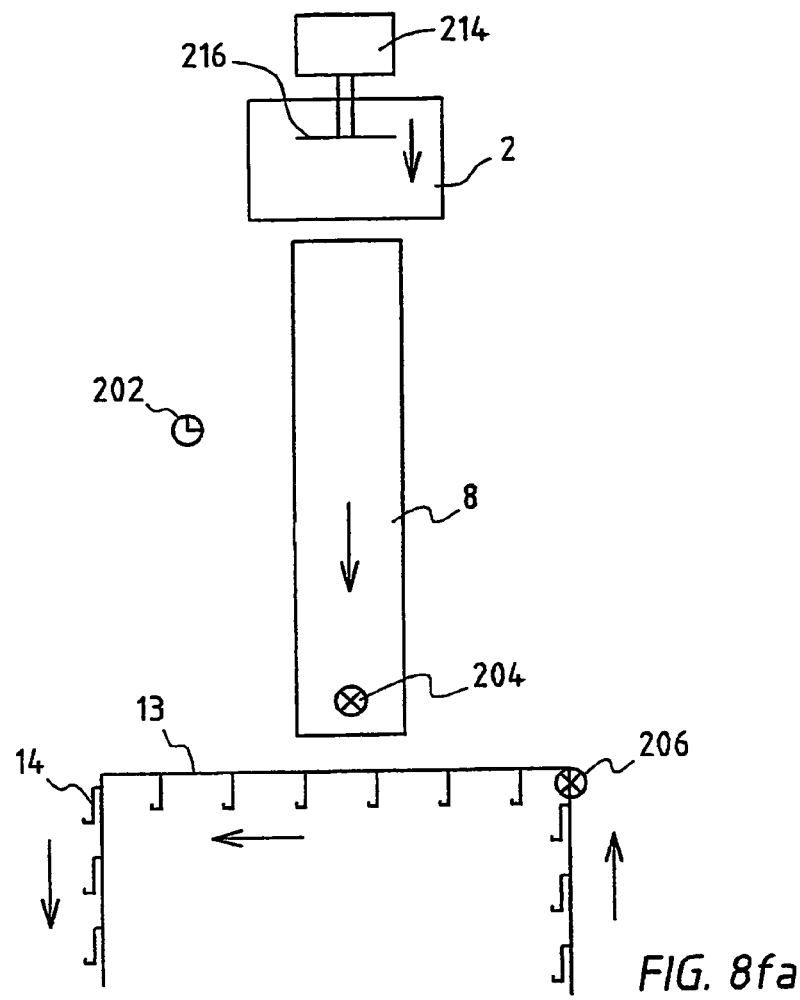
Figure 8F:
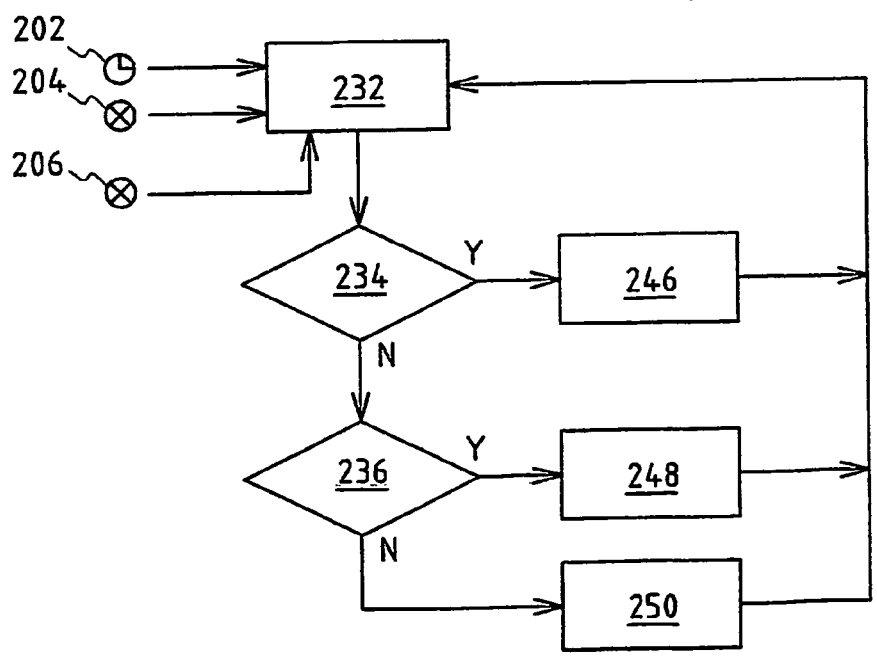
Figure 8G:
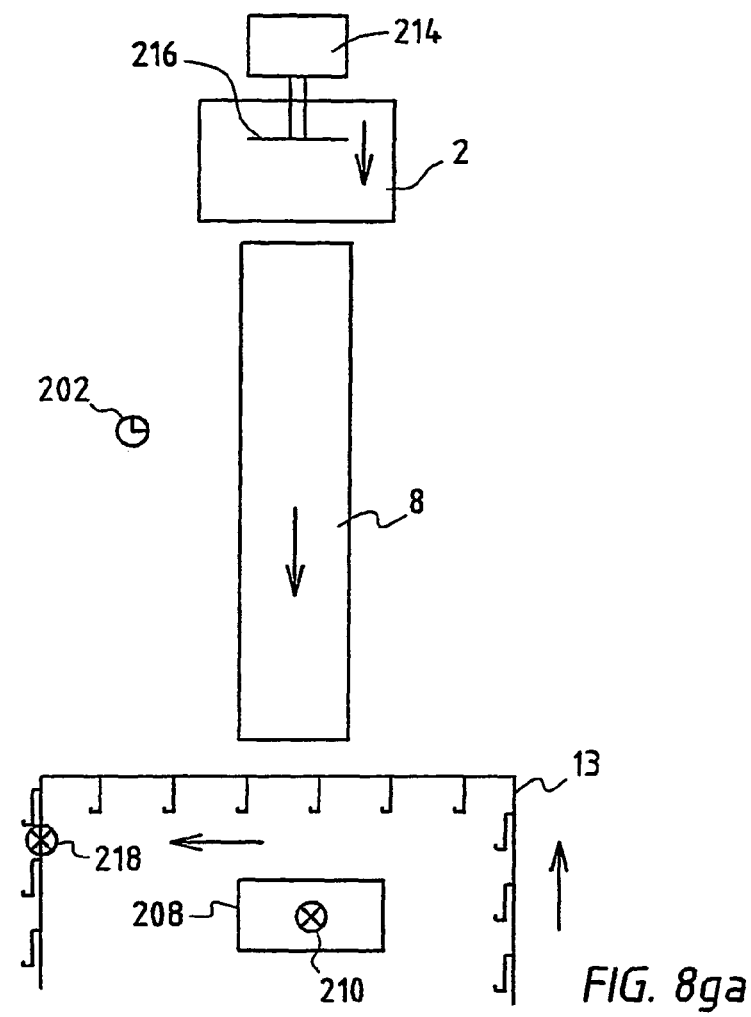
Figure 8G:
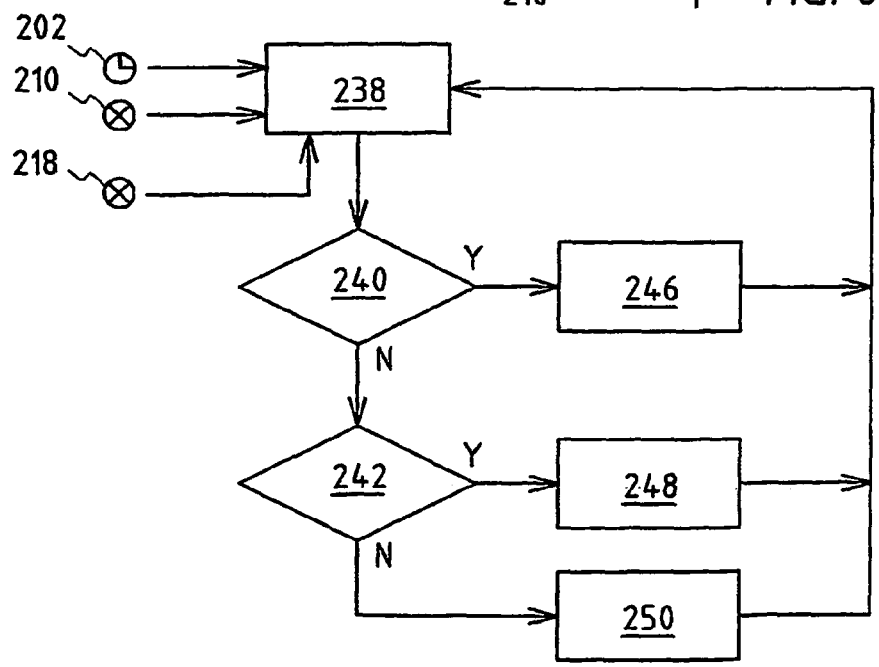
Figure 8H:
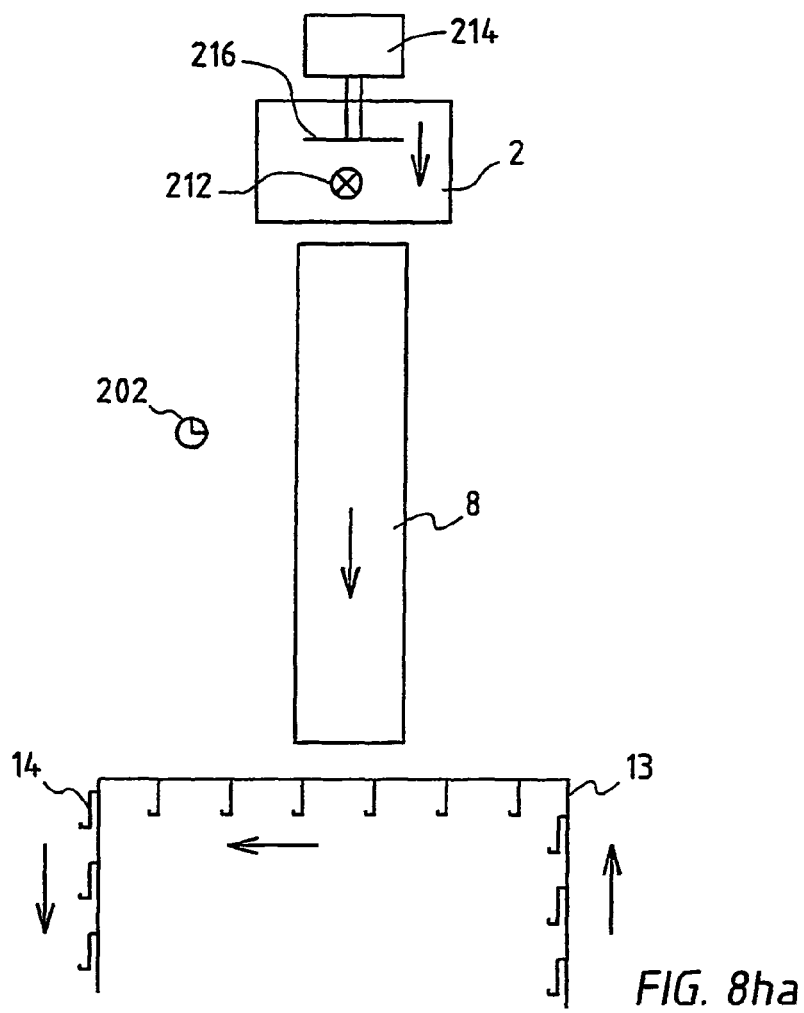
Figure 8H:
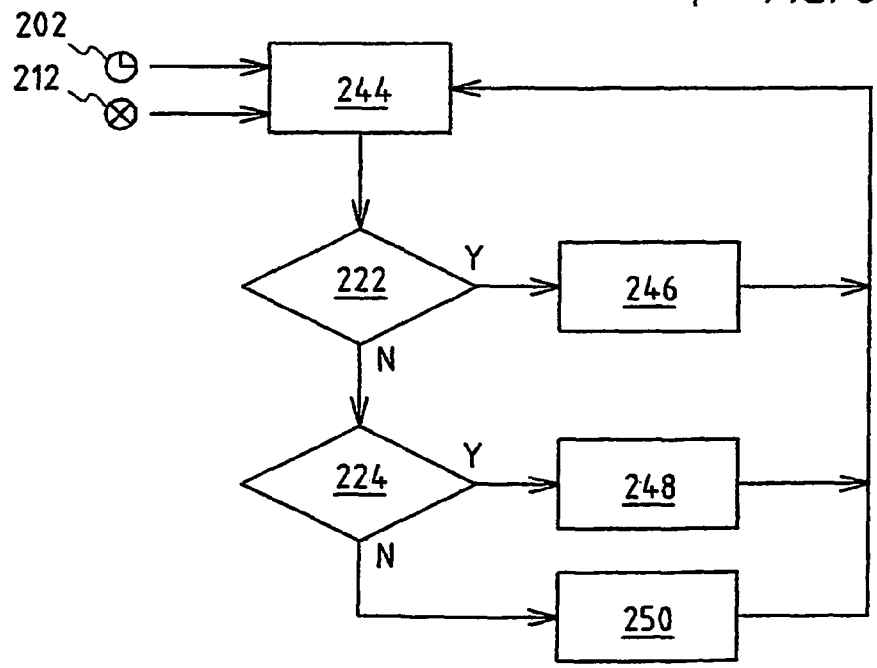
Figure 9A:
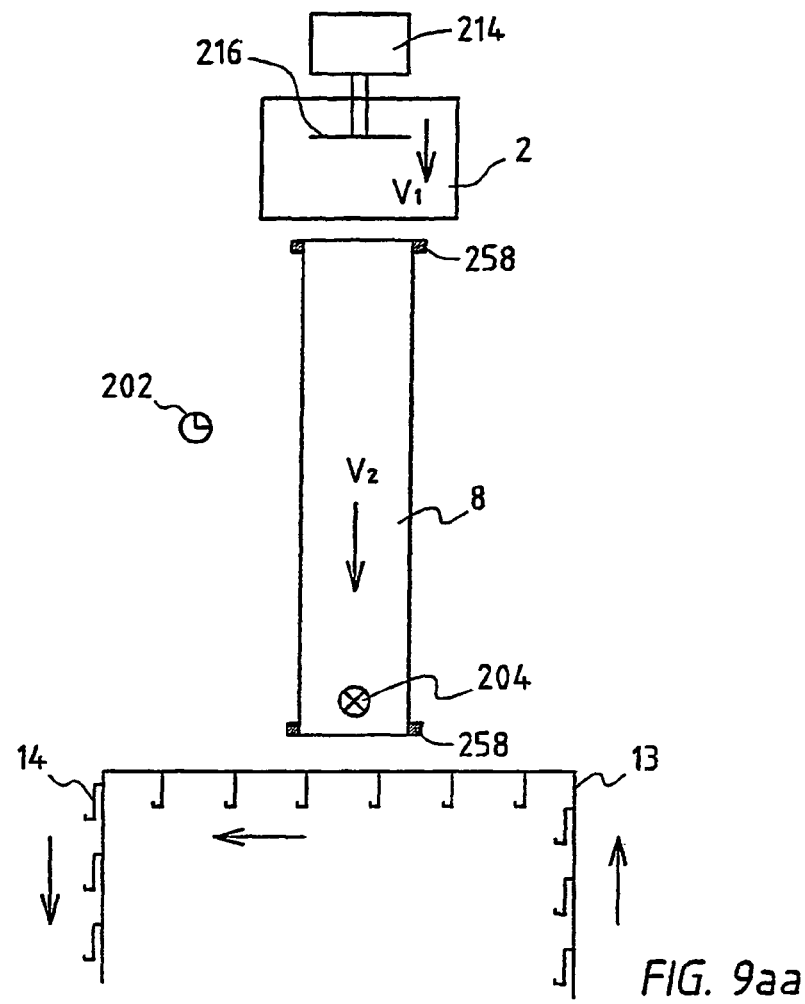
Figure 9A:
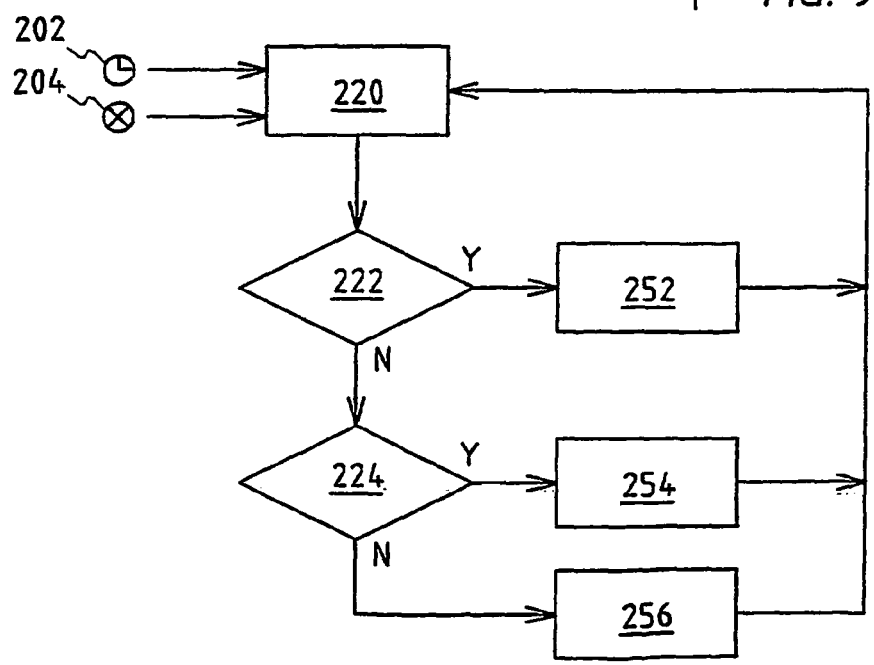
Figure 9B:
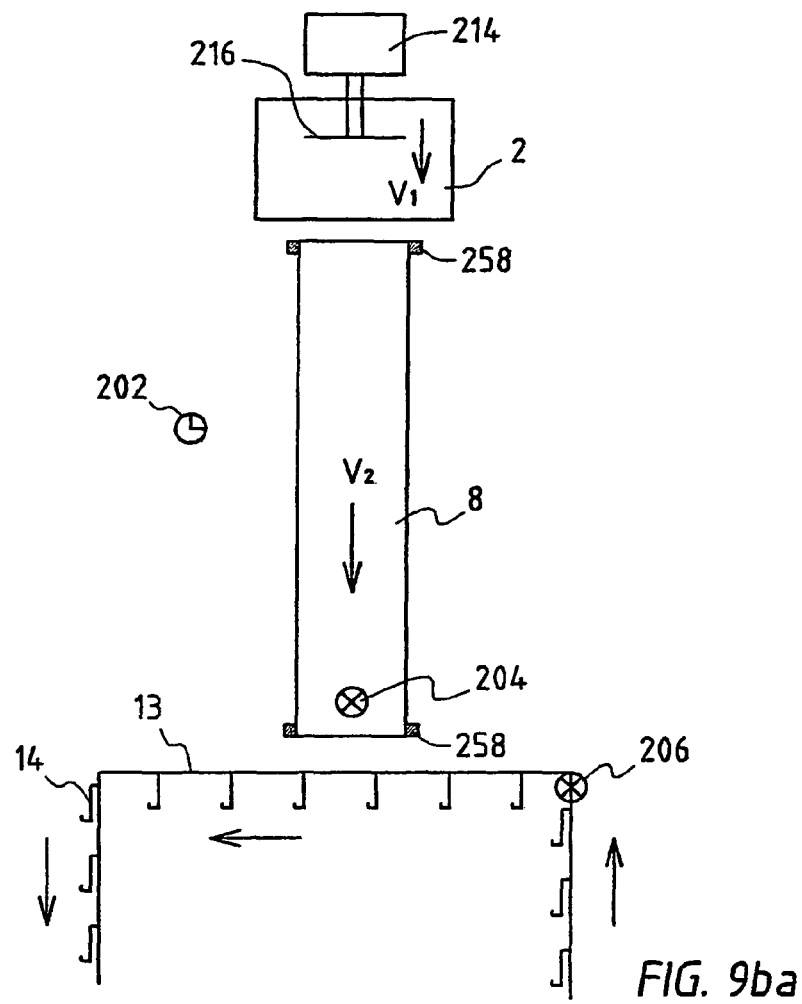
Figure 9B:
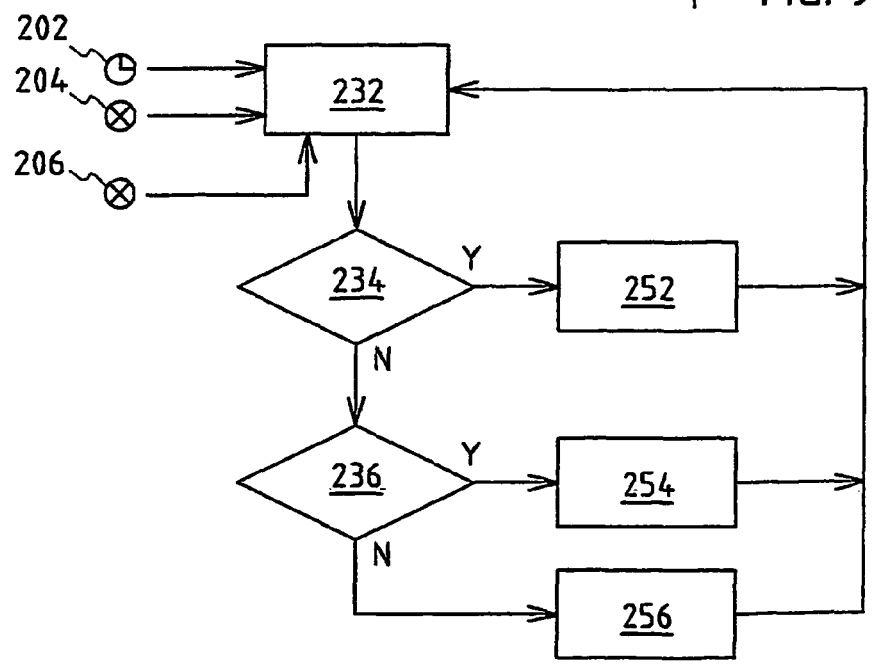
Figure 9C:
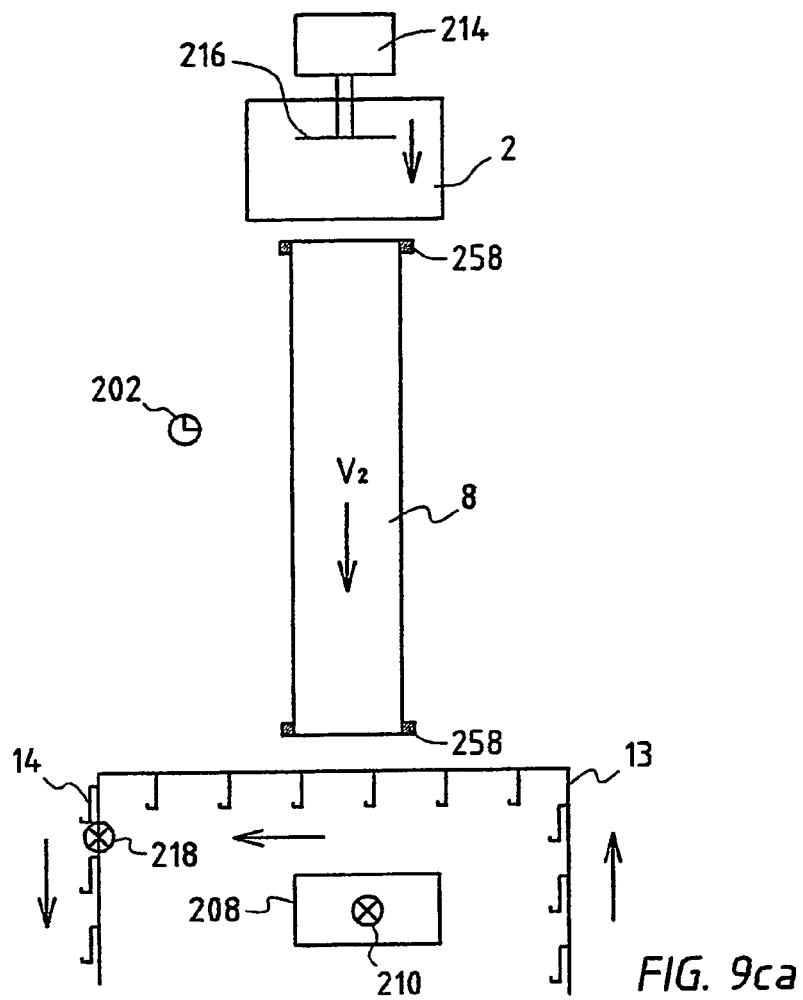
Figure 9C:
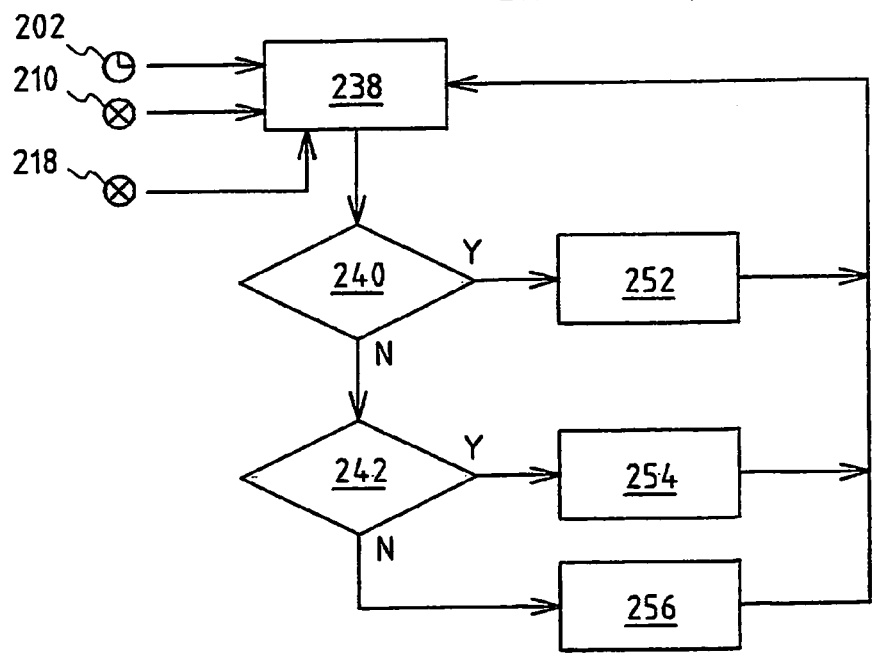
Figure 9D:
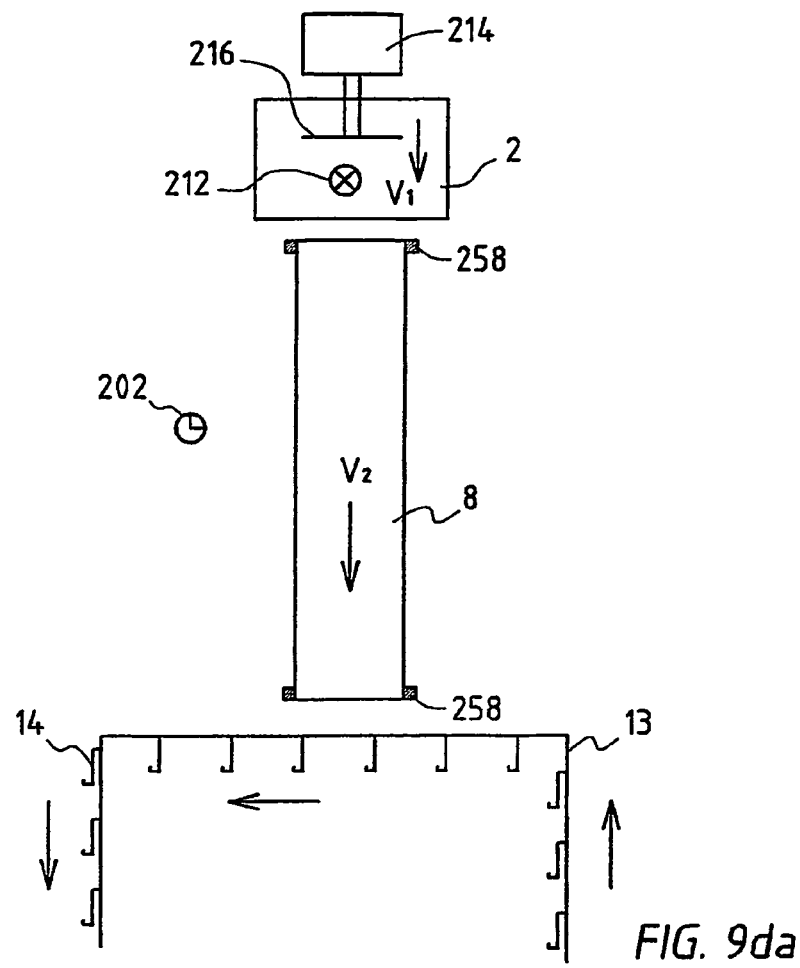
Figure 9D:
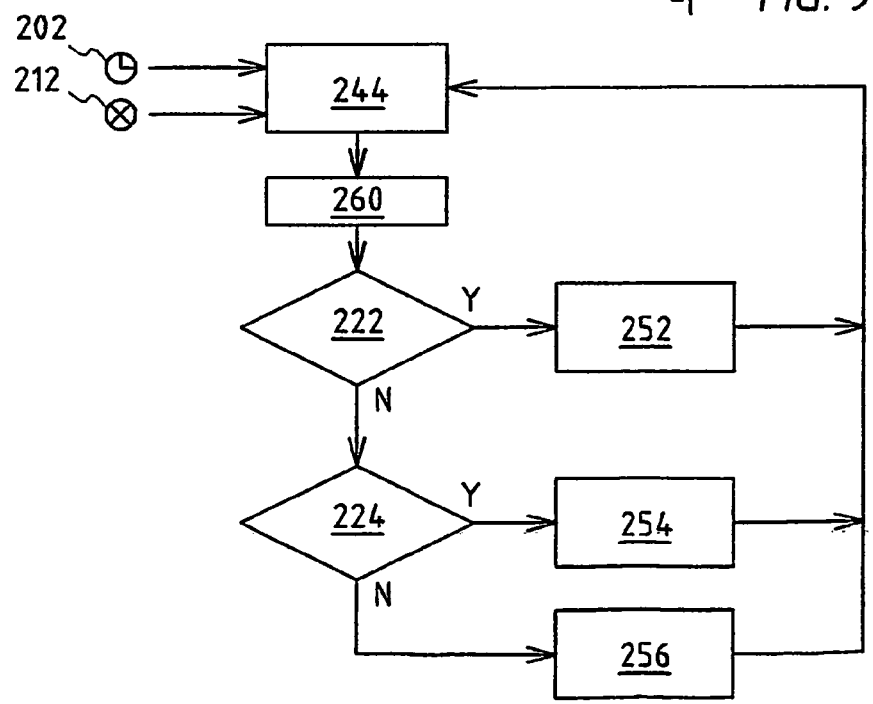
Figure 10A:
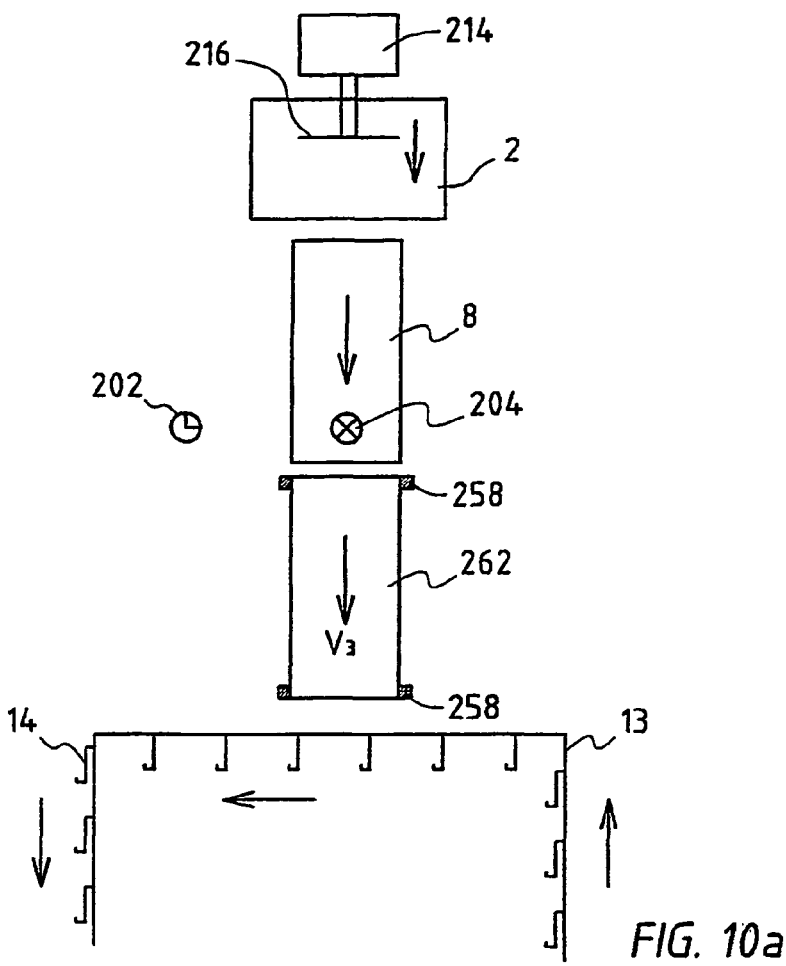
Figure 10B:
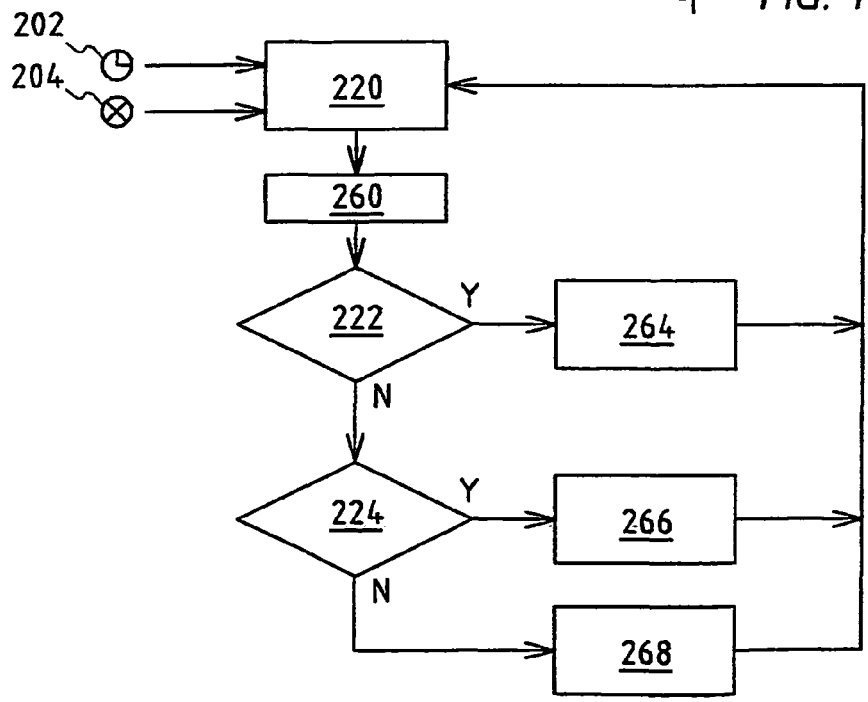
Figure 11A:
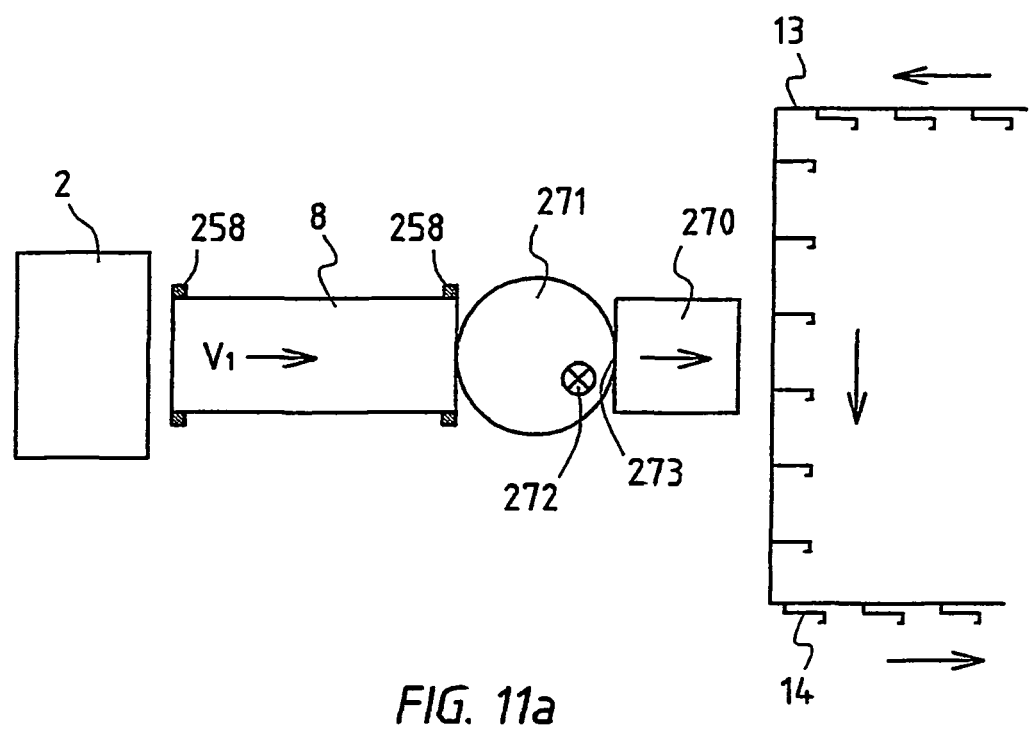
Figure 11B:
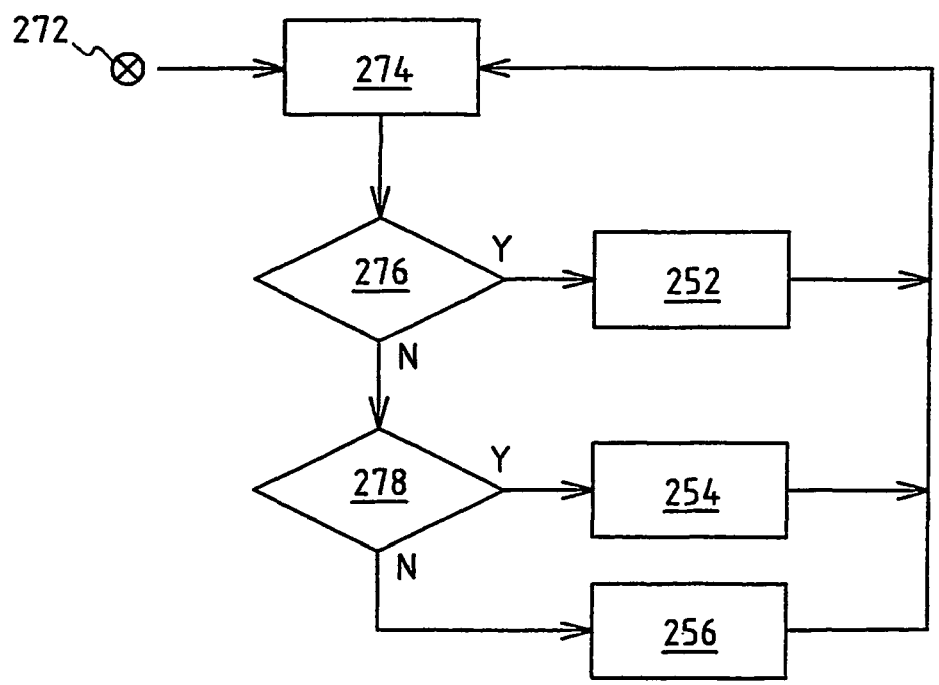
Figure 12A:
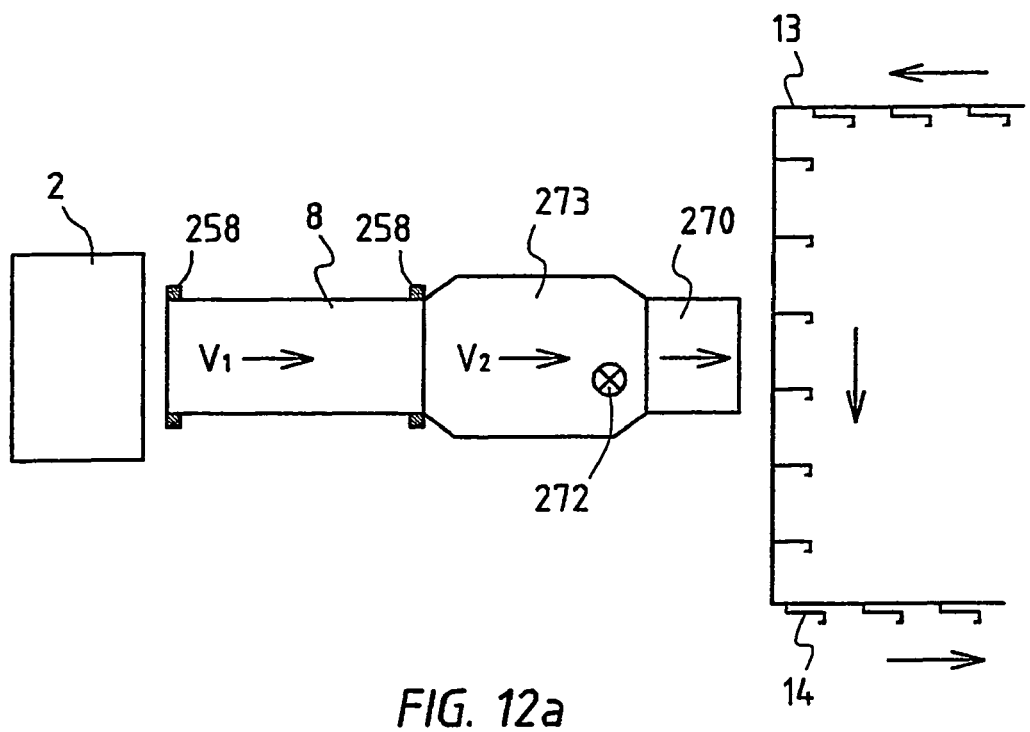
Figure 12B:
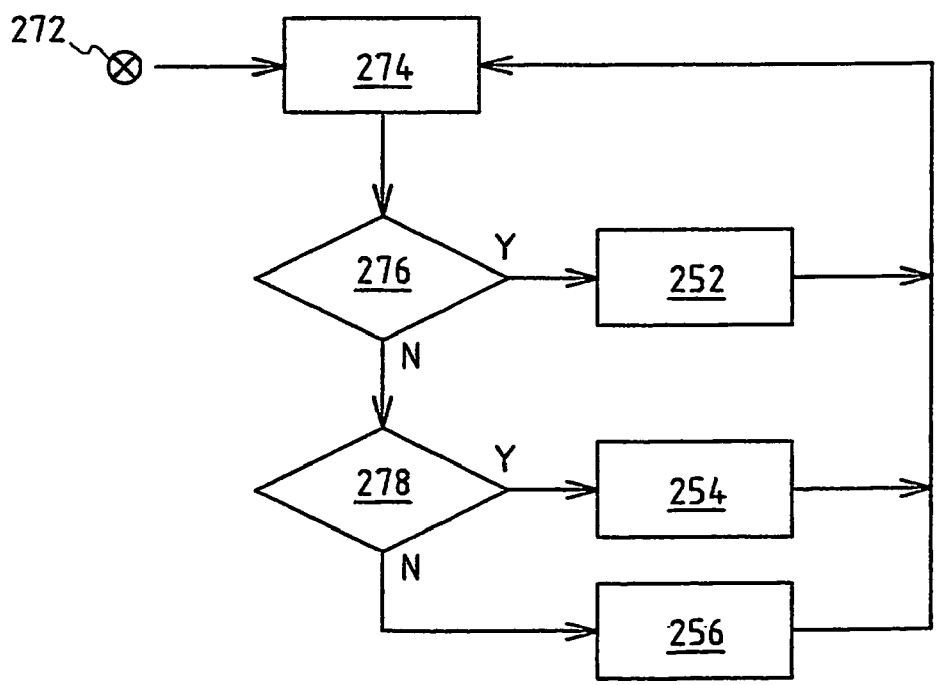
Figure 13A:
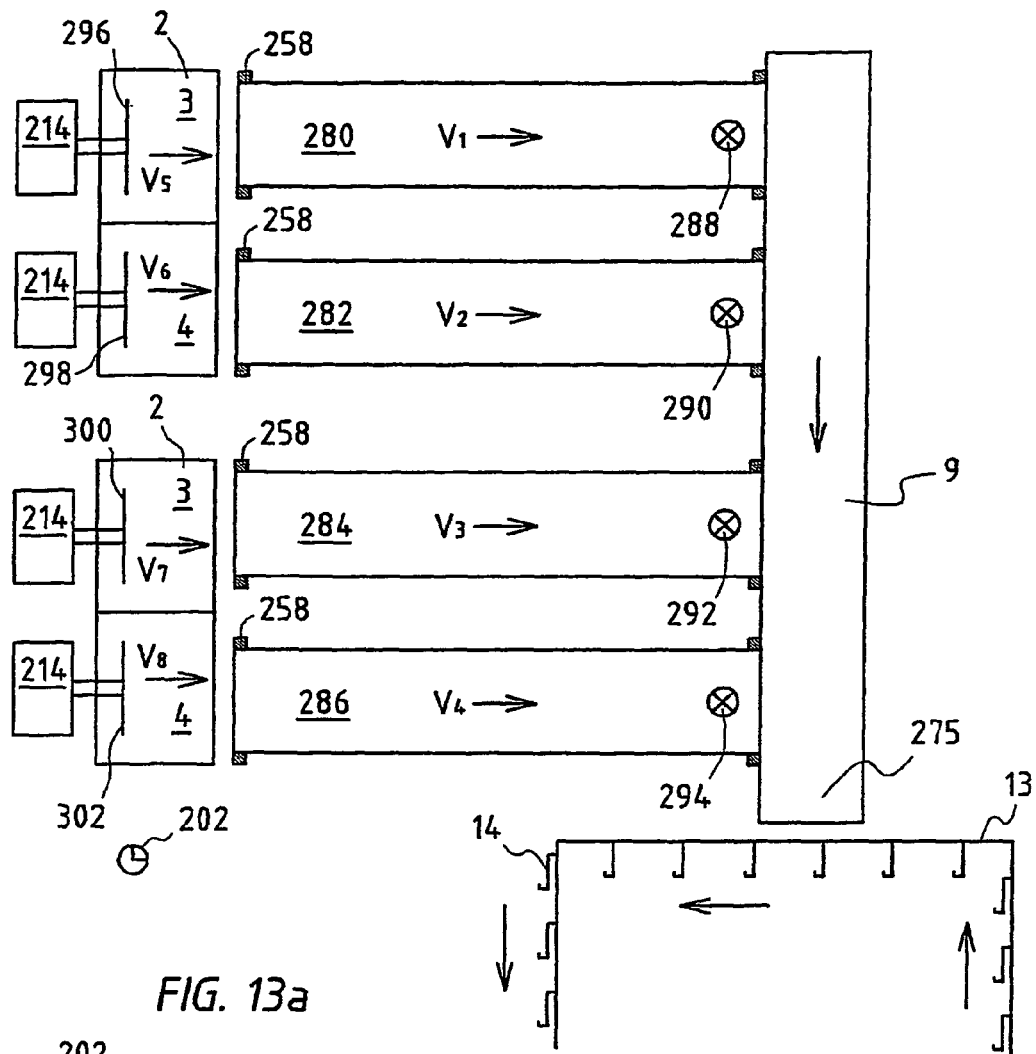

FIG. 3c diagrammatically depicts a parameter-processing system;

FIG. 4 shows a diagrammatic plan view of a detail of a device according to the invention, with conveyor devices connected in series;

FIG. 4a shows a diagrammatic plan view of a detail of a device according to the invention, with conveyor devices connected in series;

FIG. 4b shows another diagrammatic plan view of a detail of a device according to the invention, with conveyor devices connected in series;

FIG. 4c shows a schematic diagram of an embodiment of the control of the device;

FIG. 4d shows another schematic diagram of an embodiment of the control of the device;

FIG. 4e shows yet another diagrammatic plan view of a detail of a device according to the invention, with conveyor devices connected in series;

FIG. 4f shows yet another schematic diagram of an embodiment of the control of the device;

FIG. 5a shows a diagrammatic plan view of a device according to the invention, wherein conveyor devices are connected in parallel and open out onto a collection-conveyor device;

FIG. 5b shows a diagrammatic plan view of another embodiment of the device shown in FIG. 5a;

FIG. 6 shows a diagrammatic plan view of a connecting station having a conveyor device for temporary storage;

FIG. 6a shows a diagrammatic plan view of another embodiment of the connecting station;

FIG. 7a shows a diagrammatic cross section illustrating how an unloading station works;

FIG. 7b shows a perspective view of another unloading station;

FIG. 7c shows a perspective view of yet another unloading station;

FIG. 7d shows a perspective view of yet another unloading station;

FIG. 7e shows a perspective view of a further unloading station;

FIG. 7f shows a perspective view of another unloading station;

FIG. 7g shows a perspective view of yet another unloading station;

FIG. 7h shows a perspective view of yet another unloading station;

FIG. 7i shows a perspective view of a further unloading station;

FIG. 7j shows a perspective view of another unloading station;

FIG. 8aa shows a diagrammatic plan view of part of a slaughter line;

FIG. 8ab shows a schematic diagram of an embodiment of the control of the device;

FIG. 8ba shows a diagrammatic plan view of part of a slaughter line;

FIG. 8bb shows a schematic diagram of another embodiment of the control of the device;

FIG. 8ca shows a diagrammatic plan view of part of a slaughter line;

FIG. 8cb shows a schematic diagram of the control of the device;

FIG. 8da shows a diagrammatic plan view of part of a slaughter line;

FIG. 8db shows a schematic diagram of an embodiment of the control of the device;

FIG. 8*ea* shows a diagrammatic plan view of part of a slaughter line;

FIG. 8*eb* shows a schematic diagram of an embodiment of the control of the device;

FIG. 8*fa* shows a diagrammatic plan view of part of a slaughter line;

FIG. 8*fb* shows a schematic diagram of an embodiment of the control of the device;

FIG. 8*ga* shows a diagrammatic plan view of part of a slaughter line;

FIG. 8*gb* shows a schematic diagram of an embodiment of the control of the device;

FIG. 8*ha* shows a diagrammatic plan view of part of a slaughter line;

FIG. 8*hb* shows a schematic diagram of an embodiment of the control of the device;

FIG. 9*aa* shows a diagrammatic plan view of part of a slaughter line;

FIG. 9*ab* shows a schematic diagram of an embodiment of the control of the device;

FIG. 9*ba* shows a diagrammatic plan view of part of a slaughter line;

FIG. 9*bb* shows a schematic diagram of an embodiment of the control of the device;

FIG. 9*ca* shows a diagrammatic plan view of part of a slaughter line;

FIG. 9*cb* shows a schematic diagram of an embodiment of the control of the device;

FIG. 9*da* shows a diagrammatic plan view of part of a slaughter line;

FIG. 9*db* shows a schematic diagram of an embodiment of the control of the device;

FIG. 10*a* shows a diagrammatic plan view of part of a slaughter line;

FIG. 10*b* shows a schematic diagram of an embodiment of the control of the device;

FIG. 11*a* shows a schematic plan view of part of a slaughter line;

FIG. 11*b* shows a schematic diagram of an embodiment of the control of the device;

FIG. 12*a* shows a diagrammatic plan view of part of a slaughter line;

FIG. 12*b* shows a schematic diagram of an embodiment of the control of the device;

FIG. 13*a* shows a diagrammatic plan view of part of a slaughter line; and

Figure 13B:
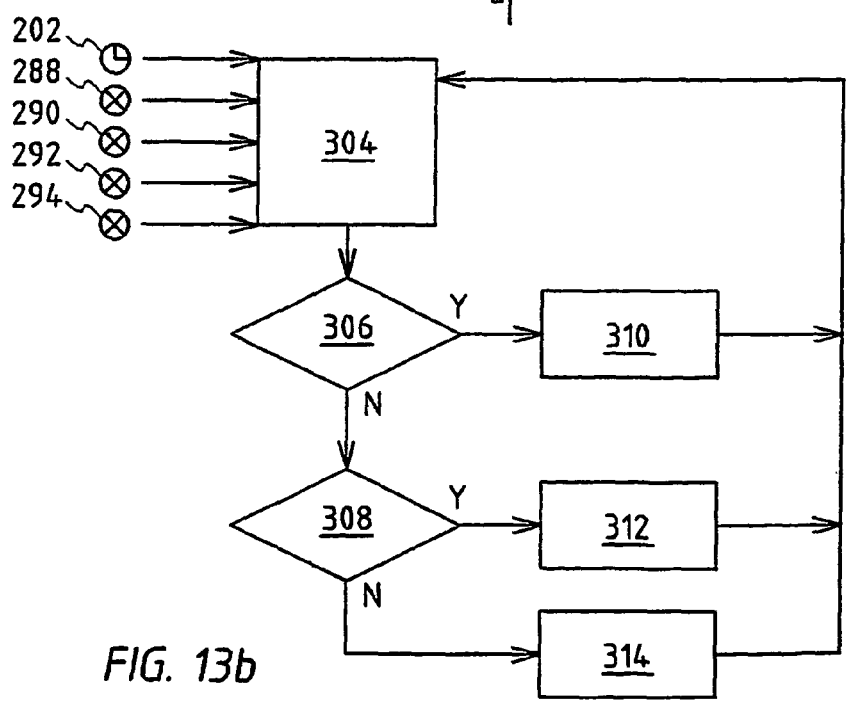

FIG. 13*b* shows a schematic diagram of an embodiment of the control of the device.

Identical reference numerals denote identical components or components with an identical or similar function. Arrows without any reference numerals indicate directions of movement of components.

Figure 1:
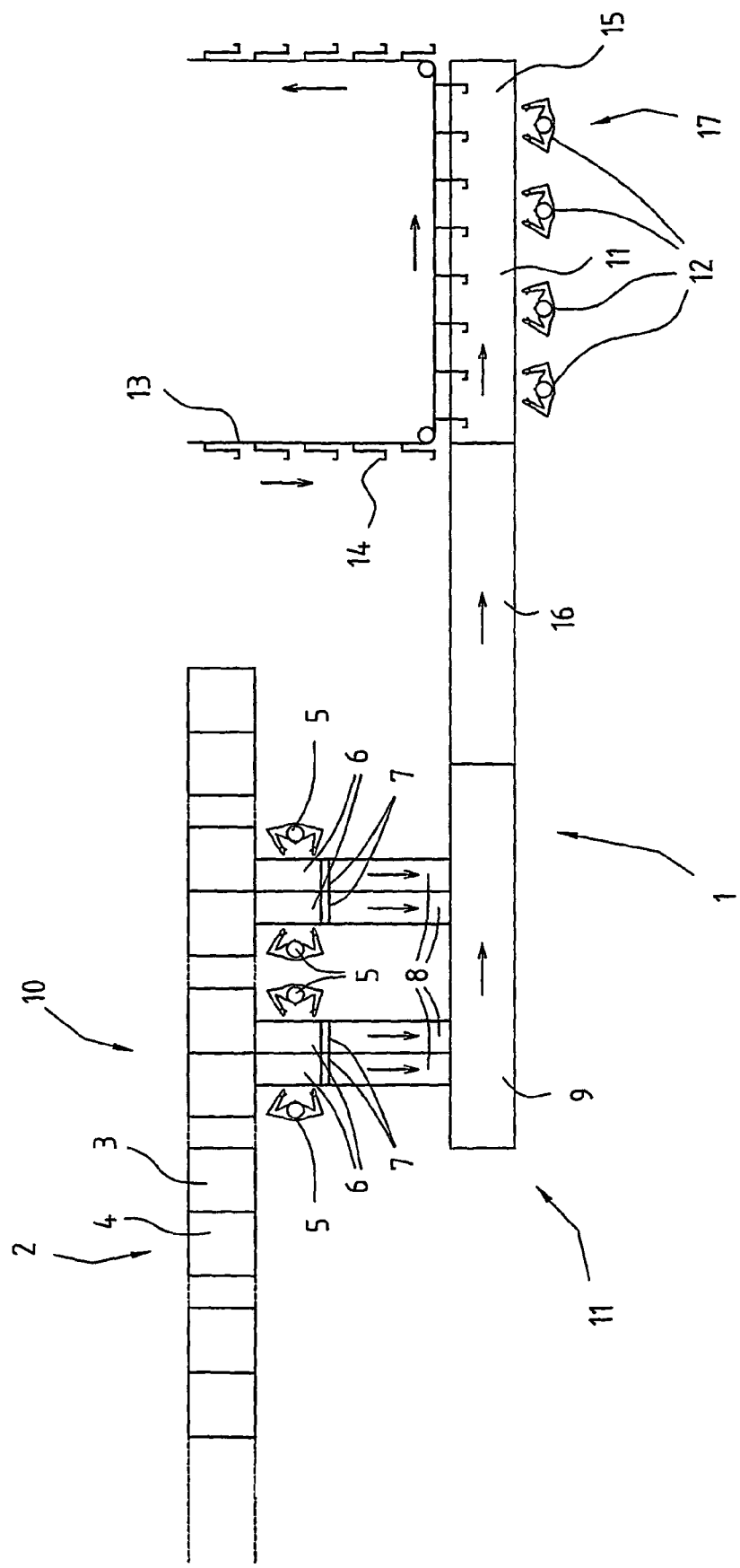
FIG. 1 shows a diagrammatic overview of part of a slaughterhouse.

FIG. 1 shows a diagrammatic overview of part of a slaughterhouse. The figure shows a combination 1 of an unloading station 10, a conveying station 11, a stunning station 16 and a connecting station 17. Birds arrive at the unloading station 10 in holders 2. Each holder 2 comprises a first stack 3 of compartments 21-27 (cf. FIG. 2*a* in this respect) and a second stack 4 of compartments. Two holders 2 are made ready simultaneously. First they are moved in such a manner that the compartments are positioned just in front of a workbench 6. Emptying of each holder 2 requires two unloading devices 5, with each unloading device 5 emptying the compartments of one of the stacks 3, 4.

The unloading devices 5 drive the birds out of the holder 2 and move the birds over a workbench 6 towards a conveyor belt 8. FIG. 1 shows a configuration of four conveyor belts 8.

The speeds of the conveyor belts 8 can be controlled separately. These conveyor belts 8 convey the birds 29 towards a collection-conveyor belt 9. The collection-conveyor belt 9 conveys the birds towards a stunning station 16. In the stunning station, the birds are stunned. The birds then arrive at the connecting station 17. The birds are conveyed past people 12, which connect the birds to carriers 14, by conveyor belt 15. The carriers 14 are attached to a conveyor 13. The conveyor 13 moves at a speed and moves a number of empty carriers 14 to the connecting station 17 during a time unit. When a bird 29 has been connected to a carrier 14, the bird 29 is conveyed further into the slaughterhouse by the carrier 14.

The stunning station 16 may also be positioned upstream, for example upstream of the unloading station 10, provided that the condition that the birds 29 are in a stunned state while they are being connected to a carrier 14 and for a certain time thereafter is satisfied.

In another embodiment, a buffer storage conveyor belt (not shown) may be present between the collection-conveyor belt 9 and the stunning station 16. The speed of this buffer storage conveyor belt can be controlled.

Figure 2A:
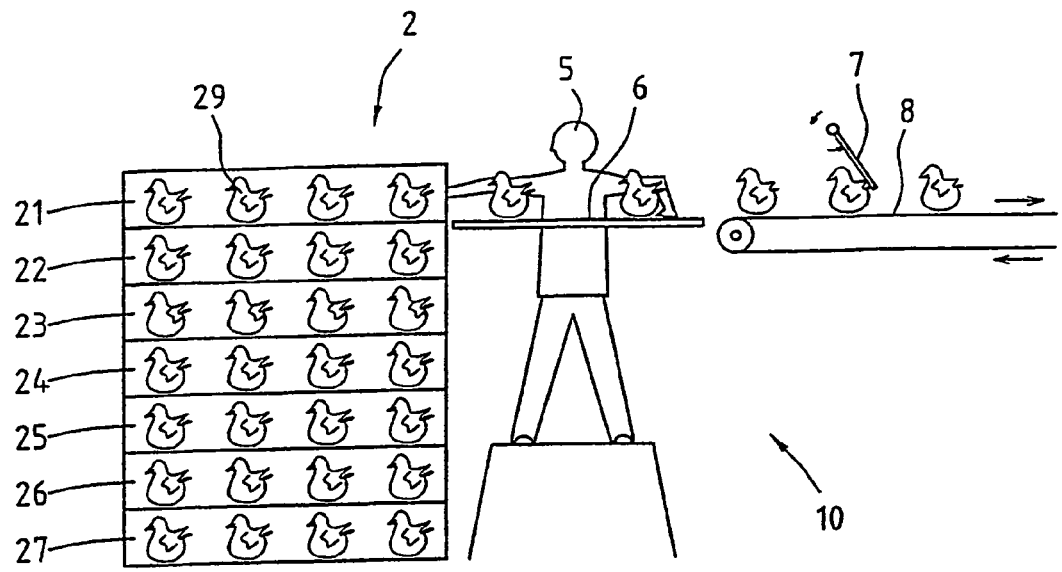
FIGS. 2a and 2b show a view of an unloading station.
Figure 2B:
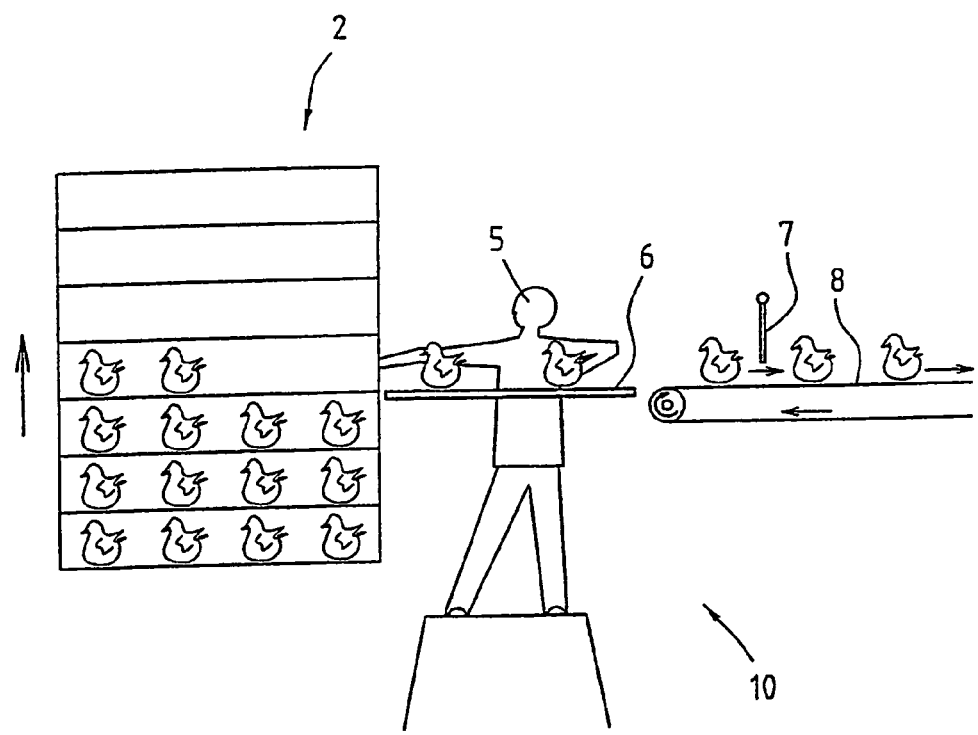

FIGS. 2*a* and 2*b* show how a holder 2 is unloaded, with the top compartment 21 being unloaded first. The operation is carried out by the person 5, with birds 29 being moved over the workbench 6 onto a conveyor belt 8. The birds 29 are unloaded from the compartment 21 by means of a pushing action carried out by the arm of the person 5. The person 5 who is removing the birds 29 from the compartment will initially not have to stretch far to be able to reach a bird 29. For subsequent birds 29, the person 5 will have to insert his arm a certain distance into the compartment 21. For the last bird 29 in a compartment 21, the person 5 will have to introduce a substantial part of his body into the compartment 21 to be able to reach the birds 29 which are usually located right at the back of the compartment 21. For the person 5, this means that the emptier the compartment 21 becomes, the more difficult it becomes to reach a bird 29. This means that the speed with which the birds 29 are unloaded from the compartment 21 will drop as the compartment 21 empties. When the compartment 21 is empty, the holder 2 is moved upwards, so that a new, full compartment 22 is then positioned at the height of the workbench 26 and can then be unloaded.

FIG. 3*a* shows the unloading speed $V_L$ over the course of time t for the unloading of a holder 2, which unloading speed $V_L$ is expressed in birds per time period. At the start 31 of the unloading of a compartment 21-27, the unloading speed $V_L$ is high. The unloading speed $V_L$ then drops as the compartment 21 empties. The speed is at a minimum (reference numeral 32) when the last bird 29 is being unloaded. When the holder 2 is being moved upwards in order for a new compartment 21 to be positioned in front of the workbench 6, the unloading speed $V_L$ is equal to zero (reference numeral 33). After a new compartment 21 has been positioned in front of the workbench 6, the unloading speed $V_L$ is initially once again at a maximum level. When all the compartments 21 of the holder 2 are empty, it is time for the holder 2 to be exchanged for a full holder. This is indicated by reference numeral 34 in FIG. 3: for a certain time, which is longer than the time required to change compartments, the unloading speed $V_L$ is once again zero.

The time unit 38 within which a compartment is emptied and a new compartment 21 is made ready is dependent, inter alia, on the type of birds which are present in the compartment 21. If the compartment 21 is filled with chicks, the time unit 38 will be different from if compartment 21 is filled with fully grown chickens. The time unit 38 is referred to by the term "cycle time of a compartment".

The time unit 39 within which a complete holder 2 is unloaded and a new, full holder 2 is put in place is also dependent, inter alia, on the type of birds which are present in the holder 2. The time unit 39 is referred to by the term "cycle time of a holder".

Fluctuations in the stream of birds are reduced with the aid of a parameter-processing system 35, which will be discussed below with reference to FIG. 3c, so that a more uniform stream of poultry is formed, as indicated by the line 37 in FIG. 3b. It is also possible for the stream of birds which fluctuates over the course of time as shown in FIG. 3a to be made into a substantially uniform stream of birds (reference numeral 36) as shown in FIG. 3b.

Returning now to FIG. 2, the person 5 who unloads the birds 29 from the compartments 21-27 will push the birds 29 over a workbench 6 towards and onto a conveyor belt 8. The birds 29 are then conveyed onwards by the conveyor belt 8. A mechanical counter 7 for counting the birds 29 is suspended above the conveyor belt 8. The mechanical counter 7 can be constructed, for example, in the form of a pivotable flap 7 which is linked to an electronic sensor (not shown). When a bird 29 moves past the flap 7, the flap 7 will rotate through a certain angle. The sensor detects this and counts the bird 29. The position of a bird on the belt is then permanently known as a result of the passage of a bird 29 past the counter 7 being detected and recorded and also the instant at which this takes place being recorded and the speed of the conveyor belt being recorded at the same time. Consequently, the speed of the conveyor belt 8 can be controlled in such a manner, taking account of the position of the counter 7 with respect to the conveyor belt 8, that the bird 29 leaves the conveyor belt 8 at a subsequent instant which can be selected variably within certain limits. This is true of each bird 29 which moves past the counter 7, so that fluctuations in the number of birds 29 which leaves the conveyor belt 8 per time unit can be reduced.

When the bird 29 has moved past the flap 7, the flap 7 pivots back into its starting position, so that the flap 7 is ready to count the next bird 29.

FIG. 3c diagrammatically depicts a parameter-processing system 35 with inputs W, X, Y and Z and outputs V, $U_1$, $U_2$, ... $U_n$. In the parameter-processing system 35, one or more signals supplied to the inputs W, X, Y and Z is used to determine one or more signals at one or more of the outputs V, $U_1$, $U_2$, ... $U_n$ for making a stream of poultry more uniform.

One or more signals relating to parameters which have been defined before a holder arrives at an unloading station are fed to the input W. These may be parameters originating from the supplier of the birds, such as a number of birds in the holder or the weight per bird. In addition, it is possible, for example, to carry out a manual count or a weighing operation before the holder arrives at the unloading station.

One or more signals relating to parameters connected with the unloading, measured during an unloading process, are fed to the input X. These may, for example, be the number of birds which comes out of the compartment per time unit, but may also, for example, be the position of a mechanical unloading device in a compartment if this unloading device is present.

One or more signals relating to parameters concerning the conveying of the poultry from an unloading station to a connecting station are fed to the input Y. A parameter of this type can be measured, and may be the number of birds present on a conveyor belt, or the speed of the conveyor belt itself, or the weight of the birds on the conveyor belt.

Another parameter which can be measured and which relates to the conveying is the position of a conveyor belt. By way of example, a pulse counter can be used for this purpose. This is an electromechanical member which is coupled to a roller which guides and supports a conveyor belt. The pulse counter measures a rotation of this roller by counting pulses which are generated during rotation of the roller in a suitable way which is known per se. It is also possible for a plurality of pulse counters, for example six such counters, to be positioned on a roller, distributed over the circumference of the roller. This allows the position of the roller to be accurately determined. If the position is measured a number of times over the course of time, it is also possible for the displacement of and distance covered by a conveyor belt to be determined.

One or more signals relating to parameters concerned with the connection of birds to a carrier in the connecting station are fed to the input Z. A parameter of this type can be measured and may, for example, be the number of birds which arrives at the connecting station, or the number of carriers which leaves the connecting station without a bird, or the mean waiting time of a bird at the connecting station. If the connecting station comprises a buffer store, it is also possible, for example, to measure a number of birds inside the buffer store.

The various parameters which are measured and have been mentioned above may also be measured simultaneously at different locations. In this way, the difference between the measured values can be used for control purposes. In the same way, it is also possible for the difference between two measured values at the same location but at different instants to be used for control purposes.

The output signals can be classified into two groups: those at the output V, on the one hand, and those at the outputs $U_1$ to $U_n$, inclusive, on the other hand.

The output V emits one or more signals for setting the speed of unloading in an unloading station. In the case of a manual unloading process, for example, the unloading device can be made to unload more quickly or more slowly with the aid of instructions. In the case of a mechanical unloading process, it is possible, for example, to control the position and/or speed of a movable arm. If a tilting device is used, the instant of tilting and the tilting angle of the tilting device can be controlled in order in this way to control the speed at which the birds leave the holder. The outputs $U_1$ to $U_n$ inclusive emit one or more signals for setting the speeds of one or more conveyor devices. If there are a plurality of conveyor devices, the speeds can be set individually and separately. These speeds can also be measured again (with the associated measurement signals being fed to input Y) and used for the control which is to be implemented by the parameter-processing system 35.

FIG. 4 shows two conveyor belts 41, 42 which adjoin one another in series. The birds 29 first of all arrive on the conveyor belt 41 and are then transferred to the conveyor belt 42. The birds 29 on the conveyor belt 41 are at varying distances from one another, as seen in the direction of flow. The birds 29 may also be distributed over the width of the conveyor belt 41. The birds 29 may be in a standing or lying position on the conveyor belt 41.

These varying distances are measured in the following way. A sensor 43 is located at a point on the upstream side of conveyor belt 41. This sensor 43 measures a bird 29 moving past it. The instant at which it moves past the sensor is recorded. Then, the sensor 43 measures when a subsequent bird 29 moves past it. The instant at which it does so is also recorded. The speed of the conveyor belt 41 can be measured using a pulse counter 44 which is linked to one of the rollers 45 which supports and guides the conveyor belt 41. At least one of the rollers 45 is driven, with the speed of the conveyor belt being controllable. The distance between the two birds can be worked out by multiplying the speed of the conveyor belt 41 by the time difference between the two instants at which the birds move past the sensor 43.

The distances between the birds 29 are made more uniform by the speed of the conveyor belt 41 being varied on the basis of the calculated distances. The conveyor belt 41 will meter the birds 29 substantially uniformly to conveyor belt 42.

If the distance between the birds 29 is greater than a desired distance, the conveyor belt 41 will be accelerated at the moment at which the first bird has been delivered to the conveyor belt 42. The second bird 42 will then be delivered to the conveyor belt 42 more quickly. As a result, the distance between the two birds 29 on the conveyor belt 42 will be shorter than on conveyor belt 41.

If the distance between the birds 29 is shorter than the desired distance, on the other hand, the conveyor belt 41 will be decelerated at the moment at which the first bird 29 has been delivered to conveyor belt 42. In this way, the distances between the birds on the conveyor belt 42 will move closer to the desired distance.

The arrangement shown in FIG. 4 can be used as a collection-conveyor belt in combination with a buffer storage conveyor belt. In this case, conveyor belt 41 is the collection-conveyor belt and conveyor belt 42 is the buffer storage conveyor belt.

However, the arrangement shown in FIG. 4 can also be used with the conveyor belt 8 shown in FIG. 1. In that case, each conveyor belt 8 is divided into two parts 41, 42. The first conveyor belt 41 is controlled as described above in order to make the distances between the birds on the second conveyor belt 42 more uniform than the distances between the birds on conveyor belt 41.

In this embodiment, it is possible for the operating time of the metering belt 41 to be divided into two operating periods. In a first operating period, the conveyor belt 41 is filled with birds 29. In this first operating period, conveyor belt 41 runs at a uniform speed. The birds 29 are transferred to conveyor belt 41 in a fluctuating stream and are consequently distributed unevenly on conveyor belt 41. In a second operating period, the birds 29 are transferred from conveyor belt 41 to conveyor belt 42. In this operating period, the speed of conveyor belt 41 is controlled in order for the birds 29 to be transferred substantially uniformly to conveyor belt 42. When all the birds 29 have been transferred to the conveyor belt 42 and conveyor belt 41 is once again free of birds, the second operating period is terminated. A first operating period, in which birds 29 can once again be transferred to conveyor belt 41, then starts up again.

When conveyor belt 42 is at a constant speed, conveyor belt 42 will deliver birds 29 in a substantially uniform stream during a first operating period and will not deliver any birds 29 in a second operating period.

In this context, it is possible for a number of combinations of conveyor belts 41 and 42 to be arranged in parallel (not shown). If second operating periods of the respective conveyor belts 42 are substantially spread apart from one another over the course of time, it is possible to ensure that an equal number of conveyor belts 42 is always in the second operating period. When the respective streams of poultry are combined, a substantially uniform stream of poultry is formed therefrom.

FIG. 4a shows a possible way of controlling both the speed of conveyor belt 41 and the speed of conveyor belt 42. In this case, the conveyor belt 42 can be divided into compartments 46 which move in the conveying direction of the conveyor belt 42. The compartments 46 are not actual physical entities, but rather are defined on conveyor belt 42 in the control process. The number of birds 29 which is present in a compartment 46 is determined with the aid of the sensor 43 and the pulse counter 44 at conveyor belt 41. The moment at which the birds 29 are transferred from conveyor belt 41 to conveyor belt 42 can be determined in the process. The position of conveyor belt 42 is likewise measured using a pulse counter 44. Since the moment of transfer is known, as is the position of conveyor belt 42, it is possible to determine how many birds 29 are passed into each compartment 46 of conveyor belt 42. If, during operation, the situation arises whereby fewer birds are present in one compartment 46 (referred to below as the empty compartment 46) than desired, this constitutes a fluctuation. It is then possible for conveyor belt 42 to be accelerated at a defined moment, in such a manner that the compartments 46 which are delivered by conveyor belt 42 prior to the empty compartment 46 are delivered at an accelerated rate. As a result, more birds 29 are temporarily delivered by conveyor belt 42 at the end of conveyor belt 46 prior to the arrival of the empty compartment 46. This temporary increase in supply can then compensate for the temporary drop in supply caused by the empty compartment 46.

FIGS. 4b and 4c show a form of control for controlling the speed of the conveyor belt 41. It can be seen from FIG. 4b that a first compartment 49 is defined on conveyor belt 42. This first compartment 49 moves with conveyor belt 42 and disappears as soon as a new first compartment 49 is formed by the movement of conveyor belt 42. A control means which recognizes a plurality of criteria is used to control conveyor belt 41. The number of birds 29 which is present in the first compartment 49 on conveyor belt 42 is determined with the aid of sensor 43, the pulse counter 44 at conveyor belt 41 and a timing means.

The control begins at block 402 in the control diagram shown in FIG. 4c. Block 402 determines whether the first compartment 49 on conveyor belt 42 contains a larger number of birds 29 than a maximum number of birds 29 for compartment 49. If so, in block 410 the speed of conveyor 41 is made equal to the speed of conveyor belt 42.

If not, block 404 determines whether the number of birds 29 in compartment 49 is lower than a minimum value for the number of birds in compartment 49. If so, block 408 increases the speed of conveyor belt 41. The emptier the compartment 49, the more the speed of conveyor belt 41 is increased. If compartment 49 is completely empty, the speed of conveyor belt 41 is increased to its maximum. In practice, there will be a maximum conveying speed for a conveyor belt 41 of this type.

The minimum number of birds in block 404 may be equal to the maximum number of birds in block 402, but may also be lower than this maximum number. In this way, it is possible to create a certain range around a predetermined desired value for the number of birds in compartment 49.

If the number of birds 29 in compartment 49 is not lower than a minimum number of birds in compartment 49, block 406 sets the conveying speed of conveyor belt 41 to a normal operating speed. This normal operating speed which is selected will be defined in practical use.

The form of control described works if conveyor belt 41 is conveying birds 29 and is able to transfer these birds 29 to conveyor belt 42 within the set limits.

The control diagram illustrated in FIG. 4d shows an alternative which is broadly identical to the control shown in FIG. 4c, but to which a decision block has been added. The additional block 412 determines whether the unloader 5 has unloaded the compartment 21 too quickly. This is achieved by relating a number of birds 20 which has already been unloaded from a compartment 21 to the duration of time which has passed since the start of unloading of the compartment 21. The unloading speed of the unloader 5 can be derived therefrom. If the unloading speed over this period of time is quicker than intended, block 414 delays the speed of conveyor belt 41. In this way, birds 29 which are unloaded by the unloader 5 will be discharged less quickly by conveyor belt 41. Consequently, these birds 29 will impede the unloader 5 to a certain extent during unloading, with the result that the unloader 5 cannot unload as many birds 29 from the compartment 21.

FIGS. 4e and 4f show a control diagram for controlling conveyor belt 42. This makes use of the defined compartments 46 on the conveyor belt 42. In this case, control in particular is based on the presence of birds 29 in compartment 422 and compartment 420, compartment 420 being the compartment located furthest downstream on conveyor belt 42 and compartment 422 being the compartment located immediately upstream of it. First of all, block 416 determines whether birds 29 are present in compartment 422. If birds are indeed present in compartment 422, block 418 controls the conveying speed of conveyor belt 42 in such a way that the total number of birds in compartment 420 and compartment 422 is delivered to a subsequent conveyor belt (not shown) within a duration of time which corresponds to the required duration of time for a corresponding number of birds 29, i.e. the conveying speed of conveyor belt 42 is averaged out in order for the combined number of birds in compartments 420 and 422 to be delivered within a required duration of time.

If there are no birds present in compartment 422, block 420 determines whether birds 29 are present in the other compartments 46 upstream of compartment 422. If one or more birds 29 are present in at least one of these compartments 46, block 422 then increases the speed of conveyor belt 42 in accordance with the following procedure. The number of empty compartments between compartment 420 and compartment 46 which contains birds is determined. Then, the duration of time which is required for the conveyor belt 42 to turn from the end of compartment 420 to the start of compartment 46 which contains birds 29 is determined. This duration of time is subtracted from the normal duration of time which is required to deliver compartment 420 to the subsequent conveyor belt. This gives a residual duration of time for unloading compartment 420, and the conveying speed of conveyor belt 42 is adapted on the basis of this duration of time in such a way that the compartment 420 is delivered during this residual duration of time.

If all the compartments upstream of compartment 420, and also compartment 420 itself, are empty (i.e. if the entire conveyor belt 42 is empty), block 424 is carried out, in which the conveying speed of conveyor belt 42 is set to a minimum value. This minimum value will in practice result from the physical characteristics of the conveyor belt 42.

FIG. 5a shows an arrangement wherein conveyor belts are arranged at a plurality of locations with respect to FIG. 1. Two holders 2, which each have two stacks of compartments 21, are being unloaded simultaneously. Consequently, four unloading devices 5 are involved in the unloading. Each unloading device 5 has a workbench 6. The unloading devices 5 remove the birds from the holder and place the birds onto four conveyor belts 51 to 54. The conveyor belts 51 to 54 lead to a collection belt 9. The collection belt 9 has a conveying direction which is substantially perpendicular to the conveying direction of the conveyor belts 51 to 54. The speeds of each of the conveyor belts 51 to 54 can be controlled separately, in order in this way to control the degree of loading of the collection belt 9.

In this arrangement, the conveyor belts 51 and 52 can be used to pass poultry to collection belt 9 at a continuous speed. The number of birds which is present on collection belt 9 on the section located downstream of the point at which conveyor belt 52 adjoins the collection belt 9 and upstream of the point at which conveyor belt 53 adjoins the collection belt 9 can then be measured.

This can be achieved, for example, by measuring the weight on the collection belt 9 or by using an animal sensor (not shown), such as a pivotable flap, or by means of an animal sensor which utilizes a detector which measures infrared radiation emitted by the birds. Another animal sensor which can be used is a video camera which records a moving image and transmits it to a parameter-processing system 15 (as shown in FIG. 3c). This parameter-processing system 35 can use suitable algorithms to calculate the number of birds and their respective positions on the collection belt 9 from an input signal.

Conveyor belts 53 and 54 can then be controlled with the aid of these measurements. These conveyor belts can be controlled in such a manner that if a lower number of birds is measured on the collection belt 9, the conveyor belts 53 and 54 are accelerated, so that they deliver a greater number of birds to the collection belt 9. If a greater number of birds is present on the collection belt 9, the conveyor belts 53 and 54 can be decelerated, so that they deliver fewer birds onto the collection belt 9. In this way, the number of birds on the collection belt 9 downstream of the point at which the conveyor belt 54 adjoins the collection belt 9 can be made substantially uniform.

The collection and conveyor belt 9 can adjoin a buffer storage conveyor belt (not shown), a stunning station 16 or a connecting station 104.

FIG. 5b shows an embodiment which is similar to the arrangement shown in FIG. 5a, but with additional space created between the two holders 2, 2 which are being unloaded simultaneously. A holder 2 which has been partially unloaded by the unloading devices at the conveyor belts 51 and 52 can be placed in this space. This creates an additional buffer storage facility, enabling the unloading speed for the unloading devices 5 in the vicinity of the conveyor belts 53 and 54 to be increased or reduced for a certain time by making use of the buffer store or even emptying the latter. Consequently, this space may contain a holder 2, but the space may also be empty. The unloading devices 5 at the conveyor belts 53 and 54 therefore have a certain amount of freedom and can work in a manner which is more independent of the unloading devices at conveyor belts 51 and 52. This makes it easier to make the stream of poultry more uniform.

Although FIGS. 5a and 5b show unloaders 5 in the form of people, a person skilled in the art will recognize that it is also possible to use unloading devices instead of the unloaders 5.

FIG. 6 shows an arrangement of the connecting station 17 wherein a conveyor belt 61 is positioned downstream of conveyor belt 15. The conveyor belt 61 is running at a lower speed than the conveyor belt 105.

A conveyor belt 61 is positioned on the downstream side of the conveyor belt 15. The conveyor belt 61 is running at a lower speed than the conveyor belt 15. A conveyor 13 introduces the carriers 14 into the connecting station 17. The carriers 14 are initially empty and are guided alongside the conveyor belt 15.

Birds 29 are transferred from the conveyor belt 63 to the conveyor belt 15 and are connected to the carriers 14 by the people 12 who are located next to the conveyor belt 62. The carriers 14 with the birds 29 are then introduced further into the poultry slaughterhouse.

If too many birds 29 are supplied for a certain time and it is not possible for all the birds 29 to be connected to a carrier 14, one or more birds 29 will pass through the entire conveyor belt 14 without having been connected to a carrier 14 and will move on to conveyor belt 61. The conveyor belt 61 conveys these birds slowly onwards and in this way functions as a temporary buffer store.

When the supply of the birds 29 drops below a defined level, the person 12 who is working furthest downstream in the connecting station 17 will no longer be given any birds 29 to be connected to a carrier 14, since the people 12 who are located further upstream than this person are able to process the entire supply of birds. The person 12 who is located furthest downstream then has the job of connecting the birds 29 which are still on the conveyor belt 61 to a carrier 14. For this purpose, he will move along the conveyor belt 61 (as indicated by a dashed arrow) and connect the birds 29 which are present on the conveyor belt 61 one by one to one of the carriers 14.

The number of birds 29 which is present on the conveyor belt 61 can also be measured using one of the measurement instruments referred to above and fed back to the parameter-processing system 35. In this way, it is possible to measure a number of birds 29 for which no carrier 14 is available for a certain period.

This measurement can also be performed by the person 12 who is connecting the birds on the conveyor belt 61 to the carrier 14. If too many animals are present on the conveyor belt 61, the person 12 can give a signal, by means of which conveyor devices located upstream of this point, for example, are controlled or unloading is delayed in order to reduce the supply of birds.

FIG. 6a shows another embodiment of the connecting station. This embodiment of the connecting station comprises two connecting lines. The stream of poultry is split into two separate streams before being connected to a carrier 13. This is implemented by arranging a splitting member 64 located in the centre of the path of the conveyor belt 62, with birds 29 being able to move past the splitting member 64 on either side. Birds 29 which move past the left-hand side (as seen in the direction of flow) of the splitting member 64 are guided to a first connecting line 66, and birds 29 which move past the right-hand side of the splitting device are guided to a second connecting line 68.

The conveyor 13 is first of all guided along the first connecting line 66 and then along the second connecting line 68.

During operation, the birds 29 in the first connecting line 66 are connected to alternate carriers 14, so that a carrier 14 without a bird 29 is present between each carrier 14 with a bird 29. Then, the empty carriers 14 are filled with a bird 29 in the second connecting line 58.

It is also possible for a bypass 18 to be arranged at the first connecting line 66, in order to divert half of the carriers 14 out of the first connecting line 66. This means that more space is available between the carriers 14 during the connecting operation. This may be advantageous for relatively large birds 29, such as turkeys. It is easier to attach large birds 29 if sufficient space is available between the carriers. The bypass 18 in this way allows a conveyor 13 with carriers 14 with the same distance between them to be used for both large and small birds.

As can be seen from FIG. 7a, an unloading station 720a may be provided with an expulsion member 722, such as a displaceable wall or a collection of elements arranged in a plane, which expulsion member 722 can be introduced into the holder 74 and can be displaced, by means of one or more drive members 724, such as jacks 726 with drive rods 728, between the first position, which is indicated by solid lines, and the second position, which is indicated by dashed lines. A holder 74 may, for example, comprise a wall formed by bars, in which case the expulsion member 722 can be moved into the holder 74 from outside the holder 74 between the bars. The drive members 724 are preferably constructed in such a manner that the expulsion member 722 can adopt any desired position in or between the first and second positions, as determined by an operator.

According to the invention, the speed of the drive members 724 can be controlled in order in this way to allow the speed at which the birds 29 are unloaded from the holder 74 to be varied.

The expulsion member 722 of the unloading station 720a acts in the bottom compartment 74a of a holder 74. In a similar way, expulsion members 722 of the unloading stations 720b and 720c are acting in the middle compartment 74b and the top compartment 74c of a holder.

FIG. 7b shows an unloading station 100 which is arranged downstream of a gas stunning device 78. The unloading station comprises a roller conveyor 102, over which a holder 74 filled with stunned birds 29 can be advanced in the direction indicated by arrow 106, either by hand, or by driving rollers 108 of the roller conveyor 102 or by other means (not shown) arranged along the path of the holder 74, such as a driver. The roller conveyor 102 is provided with a stop 110 which can be moved into and out of the path of the holder 74 for stopping the holder 74 at a predetermined position in the unloading station 100. An expulsion member 112 comprises a series of parallel, substantially rectangular plates 114, which are each attached to a carrier 116 at one end. The carrier 116 can be moved controllably in the direction of double arrow 120 by means of a pair of jacks 118, which may be electrical, pneumatic or hydraulic, with the plates 114 moving into a compartment 121 of the holder 74 between bars on one side of the holder 74.

The speed of the expulsion member 112 can be controlled in order in this way to enable the speed at which the birds 29 are unloaded from the compartment 121 to be varied.

The holder 74 can be opened compartment 121 by compartment, in a manner which is not shown in more detail, on an opening side on the opposite side from the side provided with bars, and the free ends of the plates 114 can push birds 29 which are present in the compartment 121 out of the holder 74 on the opening side. To receive the birds 29 as they are removed from the holder 74, a belt conveyor 124 is arranged on the opening side of the holder 74, having a conveyor belt 128 which moves in the direction indicated by arrow 126 and onto which the birds 29 move from the holder 74, before being discharged for further processing, such as any further stunning or killing, positioning, hanging, opening of a blood vessel, exsanguination and the like.

The roller conveyor 102 can be moved upwards and downwards with the aid of drive means, which are not shown in more detail and may be of any known type, in the directions indicated by double arrow 130, with respect to the expulsion member 112 and the belt conveyor 124, in order to allow the birds 29 from subsequent compartments 121 to be unloaded. It is also possible for the expulsion member 112 and the belt conveyor 124 to be moved in the directions indicated by the double arrow 130 with respect to the roller conveyor 102 for the purpose of unloading other compartments 121.

The arrangement shown in FIG. 7c substantially corresponds to that shown in FIG. 7b, with the exception of the belt conveyor 132 used. The conveyor belt 134 of the belt conveyor 132 is guided over rollers 136, 138 in such a manner that part of the conveyor belt 134 can be introduced into a compartment 121 of the holder 74, more particularly along the bottom of the compartment 121, over part of the depth of the compartment 121. This movement can be brought about by the belt conveyor 132 as a whole being moved in the direction indicated by arrow 140 or by the roller 136 of the belt conveyor 132 being moved in the plane of the conveyor belt 134, in the direction indicated by arrow 140, with respect to an otherwise fixed frame of the belt conveyor 132. In this case, a sufficient free length of the conveyor belt 134 has to be available, it being possible for the conveyor belt 134 to be held taut, for example, with the aid of the roller 138, which for this purpose is likewise constructed to be movable. The expulsion member 112 pushes the birds 29 onto that part of the conveyor belt 134 which is present in the compartment 121, and this conveyor belt 134 then discharges the birds 29 for further processing.

The speed of the expulsion member 112, the belt conveyor 132 and the conveyor belt 134 can be controlled in order in this way for it to be possible to vary the speed at which the birds 29 are unloaded from the compartment 121.

FIG. 7d shows a similar arrangement to that presented in FIG. 7c. In FIG. 7d, however, the conveyor belt 134a is provided with perforations 135, out of which a gas or gas mixture flows in order to bring about the first stunned state of the birds 29 or to bring about the second stunned state if the first stunned state of the birds 29 had already been implemented in the gas stunning device 78. The gas or gas mixture is, for example, distributed between the reciprocating section of the conveyor belt 134a in order to escape through the perforations 135 in the conveyor belt 134a. The birds 29 which are in the immediate vicinity of or on the conveyor belt 134a and breathe in the gas or gas mixture enter the desired stunned state and are discharged by the conveyor belt 134a for further processing. The plates 114 of the expulsion member 112 force the birds 29 towards and onto the conveyor belt 134a.

The speed of the expulsion member 112, the belt conveyor 132 and the conveyor belt 134a can be controlled in order in this way for it to be possible to vary the speed at which the birds 29 are unloaded from the compartment 121.

FIG. 7e once again shows a similar arrangement to that shown in FIG. 7c, but this time used for unloading living, unstunned poultry 29 from the holder 74. In this case, the conveyor belt 134 is positioned in front of the compartment 121 or introduced a certain distance, for example ¼ or ⅓ or ½ or ¾ or 1/1 of the depth of the compartment 121, into the compartment 121, and the free ends of the plates 114 of the expulsion member 112 are moved to the vicinity of the roller 136 of the belt conveyor 132 or further, to above the conveyor belt 134. As a result, the birds 29 which are present in the compartment will be forced to move onto the conveyor belt 134, then being conveyed out of the compartment 121 in the direction indicated by the arrow 126. As the conveyor belt 134 moves out of the compartment 121 again, the expulsion member 112 follows the conveyor belt 134 at least in such a manner that the plates 114 are always located directly behind or partly above the conveyor belt, in order to ensure the birds 29 do not have any opportunity to remain inside the compartment 121. Then, the other compartments of the holder 74 are emptied in the same way.

To prevent the birds 29 from leaving the conveyor belt 134, a cover 139 indicated by dashed lines may be positioned above it, made from a transparent and/or perforated material, so that the birds 29 can be seen on the conveyor belt 134 and are, as it were, passed through a tunnel. The conveyor belt may if appropriate be of the perforated type 134a (cf. FIG. 7d), in which case a stunning gas or gas mixture is introduced above the conveyor belt. In this case, the cover 139 will be substantially sealed in order to minimize gas losses, and feed and discharge openings for the tunnel formed by the cover 139 will be provided with partition walls which are not shown in more detail and are known per se and through which it is possible to pass, for example strip curtains.

The speed of the expulsion member 112, the belt conveyor 132 and the conveyor belt 134 can be controlled in order in this way for it to be possible to vary the speed at which the birds 29 are unloaded from the compartment 121.

FIG. 7f once again shows a similar arrangement to FIG. 7c, except that expulsion means are absent and the belt conveyor 132 is constructed to move the conveyor belt 134 into the compartment 121 over substantially the entire depth of the compartment 121. This means that the conveyor belt 134 can move all the birds 29 which are present in a compartment out of the holder 74 and discharge them for further processing without having to interact with expulsion means. The speed of the conveyor belt 134 and the belt conveyor 132 can in this case be controlled in order in this way to vary the speed at which the birds 29 are unloaded from the compartment 121.

FIG. 7g shows an alternative option for removing birds 29 from a holder. If the birds 29 are of a size which allows them to stand in the compartment 121, the situation may arise whereby the birds 29 do not move with the conveyor belt 134 in its conveying direction 126, but rather start to walk in the opposite direction to the conveying direction 126 in order to remain in the compartment. In practice, this situation may arise, for example, if the compartment 121 is of a height which is suitable for cocks but is filled with hens. Since hens are smaller than cocks, they have more space available in the vertical direction. Consequently, unlike cocks, they do not have to sit crouching down, but rather can stand upright. This enables them to walk.

In that case, an additional conveyor belt 150 can be used. The conveyor belt 150 is introduced at the top side of a compartment 121 and is guided by rollers 152. In this way, the birds 29 are pushed towards the exit of the compartment 121 on both the underside and the top side. In this context, it may be important for the additional conveyor belt 150 to be positioned at a height which is such that the heads of the birds 29 automatically come into contact with conveyor belt 150.

A person skilled in the art will recognize that a conveyor belt above the birds 29 can also be used in other situations to move birds in a certain direction.

It is also possible for the conveyor belt 150 to be provided with projections (not shown), such as flexible flaps, in order to improve the movement of the birds 29 still further. Other forms of projections, such as wires or chains, with a similar function are of course also possible.

FIGS. 7h, 7j and 7i show an arrangement for unloading birds 29 from a holder 74. Holders 74 are generally provided with a single loading door 156 which provides access to all the compartments 121.

The loading door 156 may in this case be moved into various open positions; in a first position, access is created only to the bottom compartment 121, while in a subsequent position access is created to the bottom two compartments 121 and in the top position access is created to all the compartments 121.

During the manual unloading of holders 74, the loading door 156 of the holder 74 is generally opened compartment 121 by compartment, i.e. first of all the loading door 156 of the bottom compartment 121 is opened, and then the birds 29 are unloaded from this compartment 121. Then, the holder 74 is moved downwards, so that a new, full compartment 121 comes to stand at the level of the workbench 6. Then, the loading door 156 is moved into its next position, so that the full compartment 121 is opened, and this compartment 121 is unloaded.

The operation of opening the loading door 156 to the next compartment 121 takes time and therefore causes delay. It is preferable for the loading door 156 to be moved into the limit position in a single movement in order for all the compartments to be opened simultaneously. This saves time. To prevent the birds 29 from leaving the holder 74 in an uncontrolled way, an ancillary shield 154 is provided in the arrangement shown in FIGS. 7*h*, 7*i* and 7*j*. The ancillary shield 154 is located vertically above the position 158 at which a compartment 121 to be unloaded is located and at the front of the holder 74, as seen from the perspective of the unloader 5.

In use, the loading door 156 is completely opened, after which the holder 74 is moved into its uppermost position. As can be seen from FIG. 7*i*, all the compartments 121 of the holder 74 are now located behind the ancillary shield 121 apart from the bottom compartment. This compartment 121 is located at the height of the workbench 6 and can be unloaded. The ancillary shield 154 prevents the birds 29 from being able to leave the other compartments 121. When the bottom compartment 121 has been unloaded, the holder 74 is moved downwards into a new position, so that the next compartment 121 comes out from behind the ancillary shield 154 and can be unloaded. The entire holder 74 can be unloaded this way yet the loading door 154 only has to be opened once.

FIG. 7*j* shows how the ancillary shield 154 can also be used in an arrangement with a mechanical unloading device, with the birds being unloaded mechanically from each compartment.

The use of the ancillary shield 154 means that the period 33 in FIG. 3*a* in which no animals can be unloaded during the period between the unloading of two compartments will become considerably shorter.

It will be clear to a person skilled in the art that the ancillary shield 154 can also be used in other situations to facilitate and/or accelerate the unloading of birds 29 from a holder 74.

It is also possible for an ancillary shield 154 of this type to be used in a situation in which the holder is unloaded starting with the top compartment. In this situation, the ancillary shield will be located on the underside of the unloading position 158, at the height of the workbench 6.

FIG. 8*aa* diagrammatically depicts part of a slaughter line to illustrate one embodiment of control. In this case, a holder 2 is positioned on an upstream side of a conveyor belt 8. An unloader 5 stands at the holder 2 in order to unload it. A display unit 200 is arranged opposite the unloader 5 in order to show information to the unloader 5. A sensor 204, which is constructed to count the number of birds which moves past the sensor 204, is positioned on the downstream side of the conveyor belt 8. A conveyor 13 which transports carriers 14 is positioned at the downstream side of conveyor belt 8.

The control diagram shown in FIG. 8*ab* illustrates how the system is controlled. A block 220 uses a clock 202 and the sensor 204 to determine the number of birds which moves past the sensor 204 per time unit. This number of birds per time unit is expressed in a flow rate Q. A decision block 222 compares the flow rate Q with a first, high limit value. If the flow rate Q is above this first, high limit value, the decision block 222 selects the output denoted by Y, and a block 226 then displays a message on the display unit 200 indicating that the unloader 5 needs to unload more slowly. This may be the message "unload more slowly" in a language which can be understood by the unloader 5. If the flow rate Q is not higher than the first, high limit value, the decision block 222 then selects the output denoted by "N". Then, a decision block 224 compares the flow rate Q with a second, low limit value. If the flow rate Q is lower than the second, low limit value, the output denoted by "Y" is selected. Then, a block 228 shows the message "unload more quickly" on the display unit 200. If the flow rate Q is greater than or equal to the second, low limit value, the decision block 224 selects the output denoted by "N". Then, a block 230 shows the message "maintain speed" on the display unit 200.

This results in a stable process of unloading the birds from the holder 2, with the number of birds which is transferred to the connecting station per time unit being dependent on the limit values which are set and with fluctuations in the stream of poultry being limited.

It is also possible for just the profile of the cycle time 38 of a compartment 21 or the cycle time 39 of a holder 2 to be displayed on the display unit 200. This can be realized by indicating a part of the cycle time 38, 39 which has already elapsed or by indicating a part of the cycle time 38, 39 which is still remaining, or both. The unloader 5 can compare the part of the cycle time 38, 39 which is shown with the number of birds 29 which is still in the compartment 21. In this way, an unloader 5 can make his own estimate as to whether he is on schedule with the unloading or whether he is ahead or behind on the schedule of the cycle time 38, 39. The unloader 5 can control the unloading speed on the basis of this estimate.

A good way of displaying this cycle time is by designing the display unit 200 as a number of lamps positioned in series (not shown), for example 10 such lamps, which each light up or go out when part of the cycle time has elapsed. With a series of 10 lamps, a respective lamp will light up or go out when 10% of the cycle time 38, 39 has elapsed.

FIG. 8*ba* shows part of a slaughter line for illustrating an embodiment of control which to some extent corresponds to the embodiment shown in FIGS. 8*aa* and 8*ab*, but wherein an additional sensor 206 is positioned at conveyor 13. The sensor 206 measures the passage of the carriers 14 when they are moved past the sensors 206 by the conveyor 13.

Then, in the control diagram shown in FIG. 8*bb*, a block 232 uses the clock 202 and the sensor 204 to calculate the number of birds which is guided past the sensor 204 by the conveyor belt 8 per time unit. This number is denoted by Q1. The sensor 206 and the clock 202 are used to calculate the number of carriers 14 supplied by the conveyor per time unit. This number of carriers 14 is denoted by Q2.

Then, a decision block 234 compares Q1 with Q2. If Q1 is greater than Q2, the block 226 is carried out. In this block, in a corresponding way to in FIG. 8*ab*, the message "unload more slowly" is shown on the display unit 200. If Q1 is not greater than Q2, a decision block 236 is carried out. This determines whether Q1 is lower than Q2. If Q1 is lower than Q2, the block 228 shows the message "unload more quickly" on the display unit 200. If Q1 is equal to Q2, the block 230 shows the message "maintain speed" on the display unit 200.

A person skilled in the art will recognize that it is also possible to use an additional threshold value in the two comparisons, so that the messages "unload more slowly" and "unload more quickly" are only shown if Q1 deviates from Q2 by more than the threshold value. If Q1 is located within a certain range around Q2, which has a lower limit of Q2 minus the threshold value and an upper limit of Q2 plus the threshold value, block 230 is carried out, wherein the message "maintain speed" is shown on the display unit. The use of a different lower threshold value and upper threshold value is also possible.

FIG. 8*ca* once again shows an embodiment according to the invention. In this embodiment, a platform 208 has been positioned on the downstream side of the conveyor belt 8.

Birds which are delivered by the conveyor belt 8 but for which an empty carrier 14 is not available can be placed onto this platform 208. The platform 208 functions as a buffer store. A sensor 210 is arranged at the platform 208, in order to count birds 29 which are placed onto the platform 208.

Furthermore, a sensor 218, which is suitable for counting the number of empty carriers 14 which moves past the sensor 218, is arranged on the downstream side of the conveyor 13.

FIG. 8cb shows how the control is carried out. In use, the block 238 uses the clock 202 and the sensor 218 to determine the number of empty carriers 14 which moves past the sensor 218 per time unit. This number is denoted here by Q1. Furthermore, the block 238 uses the clock 202 and the sensor 210 to determine a change in the number of birds which is present on the waiting stack. This change is expressed in a number of birds per time unit and is denoted here by Q2. The decision block 240 then determines whether Q2 is greater than zero. If so, block 226 is carried out, wherein the message "unload more slowly" is shown on the display unit 200. If the size of the waiting stack does not change and Q2 is equal to zero, decision block 242 is carried out, wherein it is determined whether Q1 is greater than zero. If so, block 228 is carried out. The control diagram illustrated in FIG. 8ab shows how the system is controlled. According to this block, the message "unload more quickly" is shown on the display unit 200.

If the number of empty carriers Q1 per time unit is equal to zero, block 230 is carried out, wherein the message "maintain speed" is shown on the display unit 200.

A person skilled in the art will recognize that numerous other messages with a similar gist to the text mentioned can be shown on the display unit 200.

FIG. 8da once again shows an embodiment wherein a sensor 212 which is suitable for measuring the number of birds 29 present in the holder 2 is arranged in the holder 2.

The control diagram presented in FIG. 8db shows how the system is controlled. In use, the number of birds which leaves the holder per time unit is determined using sensor 212 and clock 202. This number is denoted here by Q1. The decision block 222 then determines whether Q1 is greater than a first, high limit value. If so, block 226 is carried out, wherein the message "unload more slowly" is shown on the display unit 200. If Q2 is not greater than a first, high limit value, decision block 224 is carried out. This block determines whether Q1 is lower than a second, low limit value. If so, block 228 is carried out, wherein the message "unload more quickly" is shown on the display unit 200. If Q1 is not lower than the second, low limit value, block 230 is carried out, wherein the message "maintain speed" is shown on the display unit 200.

A person skilled in the art will recognize that the first and second limit values in the blocks 222 and 224 may be different values but may also be the same value.

FIG. 8ea shows an embodiment which to a certain extent corresponds to the arrangement shown in FIG. 8aa, except that the unloading process is now carried out not by hand but rather mechanically. The unloader 5 has been replaced by an unloading device 214 with a movable arm 216. The movable arm 216 can move through the holder 2 at a speed denoted by V1, the unit used for V1 being distance per time unit.

A sensor 204 which measures a number of birds which moves past the sensor 204 is positioned on the downstream side of the conveyor belt 8.

The control diagram illustrated in FIG. 8eb shows how the system is controlled. In use, the block 220 uses the clock 202 and the sensor 204 to determine the number of birds Q1 which moves past the sensor 204 per time unit. The decision block 222 compares Q1 with a first, high limit value. If Q1 is greater than this first limit value, block 246 is carried out, wherein the speed V1 is reduced. If Q1 is not greater than the limit value, decision block 224 is carried out, wherein Q1 is compared with a second, low limit value. If Q1 is lower than this second limit value, block 248 is carried out, wherein the speed V1 is increased. If Q1 is not lower than the second limit value, block 250 is carried out, wherein V1 is maintained at the existing value.

FIG. 8fa shows an embodiment which is analogous to that shown in FIG. 8ba, except that in this case too the unloader 5 has been replaced by an unloading device 214 with a movable arm 216 which can move through the holder 2 at a speed V1.

The control diagram illustrated in FIG. 8fb shows how the system is controlled. In use, the number of birds which moves past sensor 204 per time unit is determined with the aid of the sensor 204 and the clock 202. This number is denoted here by Q1. Block 232 uses sensor 206 and clock 202 In use to determine the number of carriers Q2 which moves past the sensor 206 per time unit. The decision block 234 then determines whether Q1 is greater than Q2, and if so block 246 is carried out, wherein the speed V1 of the movable arm is reduced. If Q1 is not greater than Q2, decision block 236 is carried out, which determines whether Q1 is lower than Q2. If so, block 248 is carried out, wherein the speed V1 is increased. If Q1 is not lower than Q2, block 250 is carried out, wherein the speed V1 is kept constant.

FIG. 8ga shows an embodiment wherein a platform 208 for the temporary storage of birds 29 which are delivered to the conveyor 13 without a carrier 14 being available is positioned on the downstream side of the conveyor belt 8 in the vicinity of the conveyor 13. A sensor 210 which measures a bird which is placed onto the platform 208 is arranged at the platform 208. A sensor 218 which measures empty carriers 14 which move past the sensor 218 is positioned on the downstream side of the conveyor 13.

The control diagram illustrated in FIG. 8gb shows how the system is controlled. In use, the block 238 uses the clock 202 and the sensor 218 to determine the number of empty carriers which moves past the sensor 218 per time unit. This number is denoted here by Q1. Furthermore, the clock 202 and the sensor 210 are also used to determine a change in the number of birds which is present on the waiting stack on the platform 208. This number is denoted here by Q2. The decision block 240 then determines whether Q2 is greater than zero. If so, the speed V1 is reduced in accordance with block 246. If Q2 is not greater than zero, decision block 242 is carried out, which determines whether Q1 is greater than zero. If Q1 is greater than zero, the speed V1 of the movable arm 216 is increased in accordance with block 248. If Q1 is not greater than zero, block 250 keeps the speed V1 of the movable arm 216 constant.

FIG. 8ha shows an embodiment of the invention wherein a sensor 212 for measuring the number of birds 29 present in the holder 2 is positioned in the holder 2.

The control diagram illustrated in FIG. 8hb shows how the system is controlled. In use, the block 244 uses the clock 202 and the sensor 212 to determine a number of birds which leaves the holder 2 per time unit. This number is denoted here by Q1. Then, the decision block 222 determines whether Q1 is greater than a first limit value. If so, block 246 reduces the speed V1 of the movable arm 216. If Q1 is not greater than the first limit value, decision block 224 determines whether Q1 is lower than a second limit value. This second limit value may be the same limit value as used in the decision block 222 or a different, lower limit value. If Q1 is lower than this second limit value, block 248 increases the speed V1 of the movable arm 216. If Q1 is not lower than this second limit value, block 250 determines that V1 is kept constant.

FIG. 9aa shows an embodiment according to the invention wherein both a speed V1 of a movable arm 216 of an unloading device 214 and a speed V2 of a conveyor belt 8 can be controlled; the speed V2 can be controlled by means of driven rollers 258. A sensor 204 is arranged on the downstream side of conveyor belt 8.

The control diagram illustrated in FIG. 9ab shows how the system is controlled. In use, the block 220 uses the clock 202 and the sensor 204 to determine the number of birds which moves past the sensor 204 per time unit. This number is denoted by Q1. Then, the decision block 222 determines whether Q1 is greater than a first limit value. If so, block 252 is carried out, wherein V1 and V2 are reduced. If Q1 is not greater than the first limit value, decision block 224 is carried out, which determines whether Q1 is lower than a second limit value. If so, V1 and V2 are increased in accordance with block 254. If Q1 is not lower than the second limit value, block 256 is carried out, wherein V1 and V2 are kept constant.

FIG. 9ba shows an embodiment according to the invention which to a certain extent corresponds to FIG. 9aa. The embodiment comprises a unloading device 214 which comprises a movable arm 216 which can move through the holder 2 at a speed V1. An additional sensor 206 is positioned in the vicinity of the conveyor 13, the sensor 206 being constructed to measure the passage of the carriers 14 when they are guided past the sensor 206 by the conveyor 13.

In the control diagram shown in FIG. 9bb, the block 232 uses the clock 202 and the sensor 204 to calculate the number of birds which is guided past the sensor 204 by the conveyor belt 8 per time unit. This number is denoted by Q1. The sensor 206 and the clock 202 are used to calculate the number of carriers which is supplied by the conveyor per time unit. This number is denoted by Q2.

Then, the decision block 234 compares Q1 with Q2. If Q1 is greater than Q2, block 252 is carried out. In this block, in a corresponding way to that shown in FIG. 9aa, the speed V1 of the movable arm 216 is reduced. If Q1 is not greater than Q2, decision block 236 is carried out, which determines whether Q1 is lower than Q2. If Q1 is lower than Q2, block 254 increases the speed V1 of the movable arm 216. If Q1 is equal to Q2, block 256 keeps the speed V1 of the movable arm 216 constant.

A person skilled in the art will recognize that it is also possible to use an additional threshold value in the two comparisons, so that the speeds are only increased or reduced if Q1 and Q2 deviate from the limit values by more than the threshold value.

If Q1 is then within a tolerance range around Q2 which has a lower limit of Q2 minus the threshold value and an upper limit of Q2 plus the threshold value, block 256 is carried out, wherein the speed V1 is maintained.

FIG. 9ca once again shows an embodiment according to the invention. In this embodiment, a platform 208 has been positioned on the downstream side of the conveyor belt 8. Birds 29 which are delivered by the conveyor belt 8 but for which no empty carrier 14 is available can be placed onto this platform 208. The platform 208 functions as a buffer store. A sensor 210 is arranged at platform 208 for the purpose of counting birds 29 which are placed onto platform 208.

Furthermore, a sensor 218 which is suitable for counting the number of empty carriers 14 which moves past the sensor 218 is arranged on the downstream side of conveyor 13.

The control diagram illustrated in FIG. 9cb shows how the system is controlled. In use, the block 238 uses the clock 202 and the sensor 218 to determine the number of empty carriers 14 which moves past the sensor 218 per time unit. This number is denoted here by Q1. Furthermore, block 238 uses the clock 202 and the sensor 210 to determine a change in the number of birds which is present on the waiting stack. This change is expressed in a number of birds per time unit and is denoted here by Q2. The decision block 240 determines whether Q2 is greater than zero. If so, block 252 is carried out, wherein, in a corresponding manner to that shown in FIG. 9ba, the speed V1 of the movable arm 216 is reduced. If the size of the waiting stack does not change and Q2 is equal to zero, decision block 242 is carried out. This block determines whether Q1 is greater than zero. If so, block 254 is carried out, wherein the speed V1 of movable arm 216 is increased.

If the number of empty carriers Q1 per time unit is equal to zero, block 256 is carried out, wherein the speed V1 is maintained.

FIG. 9da once again shows an embodiment of the control wherein a sensor 212 which is suitable for measuring the number of birds 29 in the holder 2 is arranged in the holder 2.

In accordance with FIG. 9db, in use the number of birds which leaves the holder per time unit is determined using the sensor 212 and the clock 202. This number is denoted here by Q1. Since a bird 29 which is unloaded from the holder 2 and passes onto the conveyor belt 8 only arrives at the conveyor 13 a certain time later, it is necessary for the control of the conveyor belt 8 based on the measurements using sensors 212 to wait a certain time before the speed V2 of the conveyor belt 8 is controlled, in order to reduce fluctuations in the stream of poultry during the transfer of the poultry to conveyor 13 by conveyor belt 8. Therefore, block 260 waits for a time t1 during use before decision block 222 is carried out.

Decision block 222 determines whether Q1 is greater than a first limit value. If so, block 252 is carried out, wherein V2 is reduced. If Q1 is not greater than the first limit value, decision block 224 is carried out, which determines whether Q1 is lower than a second limit value. If so, block 254 increases the speed V2 of the conveyor belt 8. If Q1 is not lower than a second, low limit value, block 256 keeps Q2 constant.

FIG. 10a shows an arrangement according to the invention wherein two conveyor belts 8, 262 are positioned in series, with the conveyor belt 262 being positioned on the downstream side of the conveyor belt 8. The conveyor belt 262 is driven using rollers 258 which are controllable, so that the speed V3 of the conveyor belt 262 can be controlled. A sensor 204 which measures birds 29 which move past this sensor is arranged on the downstream side of the conveyor belt 8.

In accordance with FIG. 10b, in use the clock 202 and the sensor 204 are used to determine the number of birds Q1 which moves past the sensor 204 per time unit. Block 260 waits for a defined delay time t1. Then, the decision block 222 determines whether Q1 is greater than a first, high limit value. If so, block 264 reduces the speed V3. If Q1 is not greater than the first limit value, decision block 224 determines whether Q1 is lower than a second, low limit value. If so, block 266 increases the speed V3. If Q1 is not lower than the second limit value, block 268 determines that the speed V3 remains constant.

The delay time t1 ensures that birds 29 which move past sensor 204, at the moment at which they are delivered to the conveyor 13 by the conveyor belt 262, are delivered to the conveyor 13 uniformly as a result of the variable speed V3 of the conveyor belt 262.

FIG. 11a shows an embodiment according to the invention wherein a buffer storage member 271 is arranged on a downstream side of the conveyor belt 8, and wherein a second conveyor belt 270 is positioned in the vicinity of an exit 273 of the buffer storage member 271 and at its downstream end adjoins the conveyor 13. A sensor 272 which is constructed to measure the number of birds 29 which is located in the buffer storage member 271 is arranged in the buffer storage member 271. The conveyor belt 8 is driven by rollers 258, so that the speed V1 of the conveyor belt 8 can be controlled.

FIG. 11b shows the control of the system. In use, block 274 uses the sensor 272 to determine the number of birds P1 which is present in the buffer storage member 271. Decision block 276 determines whether the number P1 is greater than a first, high limit value. If so, block 252 reduces the speed V1 of the conveyor belt 8. If the number of birds is not greater than the first, high limit value, decision block 278 determines whether the number of birds is lower than a second, low limit value. If so, the speed V1 is increased in accordance with block 254. If the number of birds is not lower than the second limit value, block 256 keeps the speed V1 constant.

FIG. 12a shows an embodiment according to the invention wherein the buffer storage member 272 from FIG. 11a has been replaced by a buffer storage conveyor device 273. The buffer storage conveyor device 273 is positioned on the downstream side of the conveyor belt 8. The conveyor belt 8 is driven by rollers 258, in such a manner that the speed V1 of the conveyor belt 8 is controllable. Buffer storage conveyor device 273 conveys the birds 29 at a speed V2 from the conveyor device 8 to the conveyor device 270. The sensor 272 is arranged on the downstream side of the buffer storage conveyor device 273. The sensor 272 is suitable for measuring the number of birds which is present in the buffer storage conveyor device 273.

FIG. 12b shows the control for the system. In use, the block 274 uses the sensor 272 to measure the number of birds which is present in the buffer storage conveyor device 273. The decision block 276 determines whether the number of birds 29 is greater than a first, high limit value. If so, block 252 is carried out, wherein the speed V1 of conveyor belt 8 is reduced. If the number of birds is not greater than the first, high limit value, decision block 278 is carried out. This block determines whether the number of birds is lower than a second, low limit value. If so, block 254 is carried out, wherein the speed V1 of the conveyor belt 8 is increased. If the number of birds is not lower than the second limit value, block 256 is carried out, wherein the speed V1 of the conveyor belt 8 is kept constant.

A person skilled in the art will recognize that in this embodiment too it is possible to use a controllable unloading device or an unloader, so that not only can the speed V1 of the conveyor belt 8 be controlled, but also the speed with which the birds are unloaded from the holder 2.

FIG. 13a shows an embodiment according to the invention wherein two holders 2, each having two stacks 3, 4, are being unloaded simultaneously. Four unloading devices 214 are used to unload each of the compartments of the holders 2. Each unloading device 214 has a movable arm 296, 298, 300, 302, which can move into the holder 2. Four conveyor belts 280, 282, 284 and 286 are positioned in such a manner that they each adjoin the respective stacks 3, 4 of the respective holders 2. The downstream side of the conveyor belts 280, 282, 284 and 286 adjoins a collection and conveyor belt 9. On its downstream side, the collection and conveyor belt 9 ends at a conveyor 13 which guides carriers 14. The conveyor belts 280, 282, 284 and 286 are each driven by respective rollers 258, in such a manner that the respective conveying speeds V1, V2, V3 and V4 thereof can be controlled. The unloading devices 214 are likewise controllable, so that the respective speeds V5, V6, V7 and V8 of the movable arms 296, 298, 300 and 302 can be controlled. Respective sensors 288, 290, 292 and 294 are arranged on the downstream side of the conveyor belts 280, 282, 284 and 286. These sensors are suitable for measuring the number of birds which moves past the sensors.

FIG. 13b shows the control of the system. In use, clock 202 and sensors 288, 290, 292 and 294 are used to calculate the number of birds Q1, Q2, Q3 and Q4 which is transferred to the collection and conveyor belt 9 by the respective conveyor belts. Then, decision block 306 determines whether the total of the streams Q1 to Q4 inclusive is greater than a predetermined, first limit value. If so, block 310 reduces the speeds V1 to V8 inclusive. If the total stream is not greater than the first limit value, decision block 308 determines whether the total stream of poultry is lower than a second, low limit value. If so, block 312 increases the speeds V1 to V8 inclusive. If the total stream of birds is not lower than the second limit value, the respective speeds V1 to V8 inclusive are kept constant by block 314.

The invention claimed is:

1. A device for converting a stream of living poultry, which fluctuates over the course of time, into a stream of living poultry, which is substantially uniform over the course of time, in a slaughter line, the device comprising at least the following stations:
   an unloading station configured to unload the living poultry from at least one holder;
   a connecting station configured to connect the living poultry to carriers;
   a conveying station configured to convey the living poultry as a stream of living poultry from the unloading station to the connecting station, the conveying station comprising at least one conveyor device; and
   at least one control device constructed to control the number of living poultry that is transferred from the unloading station to the conveying station or from the conveying station to the connecting station per time unit, in order to reduce fluctuations in the stream of living poultry.

2. The device according to claim 1, wherein the poultry, in the unloading station, is unloaded from the at least one holder by at least one unloading device.

3. The device according to claim 2, wherein the control device is linked to the at least one unloading device in order to control a number of birds which is unloaded from the at least one holder per time unit.

4. The device according to claim 2, wherein a number of unloading devices are arranged in parallel.

5. The device according to claim 2, wherein the unloading station comprises a tilting device for tilting the at least one holder, wherein the poultry leaves the holder under the influence of the force of gravity.

6. The device according to claim 5, wherein the control device is constructed to control the tilting of the tilting device.

7. The device according to claim 2, wherein the at least one unloading device comprises an arm which can move into the at least one holder.

8. The device according to claim 7, wherein the control device is constructed to control the arm of the unloading device.

9. The device according to claim 7, wherein the arm comprises a first conveyor belt.

10. The device according to claim 2, wherein the unloading device comprises a second conveyor belt, which can be moved into a position above the poultry which is to be unloaded, and wherein the said second conveyor belt is constructed to unload the poultry from the holder.

11. The device according to claim 1, wherein the at least one conveyor device is constructed to convey the poultry at a conveying speed, the control device being linked to the at least one conveyor device and being constructed to control the conveying speed of the at least one conveyor device in order to reduce fluctuations in the stream of poultry.

12. The device according to claim 11, wherein the conveying station comprises a number of conveyor devices arranged in parallel.

13. The device according to claim 12, wherein a number of conveyor devices convey the poultry from the unloading station to a collection-conveyor device, and wherein the collection and conveyor device conveys the poultry to the connecting station at a speed.

14. The device according to claim 13, wherein the control device is constructed to control the number of birds which is transferred from the at least one conveyor device to the collection-conveyor device per time unit, in order to reduce fluctuations in the stream of poultry.

15. The device according to claim 11, wherein the conveying station comprises a number of conveyor devices connected in series.

16. The device according to claim 15, wherein the control device is constructed to control the number of birds which is transferred from a conveyor device to a subsequent conveyor device per time unit, in order to reduce fluctuations in the stream of poultry.

17. The device according to claim 1, wherein at least one first buffer storage member for the temporary storage of poultry is arranged downstream of the unloading station and upstream of the connecting station.

18. The device according to claim 17, wherein the control device is linked to the at least one buffer storage member in order to control a number of birds which is released from the at least one first buffer storage member per time unit.

19. The device according to claim 1, wherein a stunning station is arranged upstream of the connecting station.

20. The device according to claim 1, wherein a second buffer storage member, for temporarily storing birds which have been delivered to the connecting station and for which no carrier is available, is positioned in the connecting station.

21. The device according to claim 1, wherein the unloading station comprises at least one sensor which measures at least one parameter relating to the unloading, which parameter is preferably selected from a group of parameters which comprises:
  a number of birds which is unloaded from the holder per time unit,
  a weight of a total number of birds in the holder,
  a weight of at least one individual bird in the holder,
  a number of birds present in the holder, and
  a temperature of a bird,
  resulting in at least one measured value, the at least one measured value being fed to the control device in order to control the number of birds which is transferred from the unloading station to the conveying station or from the conveying station to the connecting station per time unit, in order to reduce fluctuations in the stream of poultry.

22. The device according to claim 21, wherein the said at least one sensor is linked to the control device, and wherein the control device is linked to the at least one conveyor device, and wherein the said measured values are fed to the control device in order to control the at least one conveyor device.

23. The device according to claim 21, wherein the said at least one sensor is linked to the control device, and wherein the control device is linked to the at least one unloading device, and wherein the said measured values are fed to the control device in order to control the at least one unloading device.

24. The device according to claim 21, wherein the said at least one sensor is linked to the control device, and wherein the control device is linked to the at least one first buffer storage member, and wherein the said measured values are fed to the control device in order to control the at least one first buffer storage member.

25. The device according to claim 21, wherein the said at least one sensor is preferably selected from a group which comprises:
  a pivotable body,
  a measuring instrument for measuring a weight,
  a measuring instrument for measuring infrared radiation, and
  an optical measuring instrument.

26. The device according to claim 21, wherein the at least one conveyor device extends over a defined distance, and wherein the at least one conveyor device has an upstream side and a downstream side, and wherein the at least one sensor is arranged on the downstream side of the at least one conveyor device.

27. The device according to claim 1, wherein the conveying station comprises at least one sensor which is constructed to measure at least one parameter relating to the conveying, which parameter is preferably selected from a group of parameters which comprises:
  a number of birds which passes a defined point on the conveyor device per time unit,
  a weight of the total number of birds on the at least one conveyor device,
  a weight of at least one individual bird on the at least one conveyor device,
  a duration of time between a bird leaving the unloading station and arriving at the connecting station,
  a conveying speed of a stream of poultry, and
  a number of birds which is present on the conveying member,
  resulting in at least one measured value, the at least one measured value being fed to the control device in order to control the number of birds which is transferred from the unloading station to the conveying station or from the conveying station to the connecting station per time unit, in order to reduce fluctuations in the stream of poultry.

28. The device according to claim 1, wherein the connecting station comprises at least one sensor which is constructed to measure at least one parameter relating to the connecting of the birds to the carrier, which at least one parameter is preferably selected from a group of parameters which comprises:
  a waiting time for a bird at the connecting station,
  a number of birds waiting at the connecting station,
  a number of birds which is delivered to the connecting station per time unit,
  a number of carriers which leaves the connecting station per time unit,
  a number of carriers which leaves the connecting station per time unit without a bird having been connected to them,
  a number of birds which is delivered to the connecting station per time unit without a carrier being available for them,
  a number of birds present at the connecting station for connection to a carrier, and
  a number of carriers which is approaching the connecting station per time unit,
  resulting in at least one measured value, the at least one measured value being fed to the control device in order to control the number of birds which is transferred from the unloading station to the conveying station or from the conveying station to the connecting station per time unit, in order to reduce fluctuations in the stream of poultry.

29. The device according to claim 1, wherein the at least one conveyor device is a conveyor belt.

30. The device according to claim 1, wherein the connecting station comprises a number of connecting lines.

31. The device according to claim 30, wherein a conveyor in part follows two different paths, a first path running along a connecting line while a second path does not run along a connecting line, and wherein the conveyor is constructed to enable carriers to follow the first or second path depending on a predetermined selection.

32. The device according to claim 1, wherein the device is configured so as to adjust the number of birds which is transferred to the conveying station by the unloading station or to the connecting station by the conveying station per time unit using minor changes or substantially continuously.

* * * * *